United States Patent
Lipp et al.

(10) Patent No.: US 10,127,720 B2
(45) Date of Patent: Nov. 13, 2018

(54) OBJECT MODELING IN MULTI-DIMENSIONAL SPACE

(71) Applicant: ENVIRONMENTAL SYSTEMS RESEARCH INSTITUTE, Redlands, CA (US)

(72) Inventors: Markus Lipp, Zurich (CH); Pascal Mueller, Zurich (CH)

(73) Assignee: ENVIRONMENTAL SYSTEMS RESEARCH INSTITUTE, Redlands, CA (US)

( * ) Notice: Subject to any disclaimer, the term of this patent is extended or adjusted under 35 U.S.C. 154(b) by 0 days.

(21) Appl. No.: 15/376,512

(22) Filed: Dec. 12, 2016

(65) Prior Publication Data

US 2017/0132838 A1    May 11, 2017

Related U.S. Application Data

(62) Division of application No. 13/999,720, filed on Mar. 17, 2014, now Pat. No. 9,542,779.

(Continued)

(51) Int. Cl.
- *G06T 17/20* (2006.01)
- *G06T 19/20* (2011.01)
- *G06T 17/30* (2006.01)

(52) U.S. Cl.
CPC .............. *G06T 17/20* (2013.01); *G06T 17/30* (2013.01); *G06T 19/20* (2013.01); *G06T 2219/2021* (2013.01)

(58) Field of Classification Search
USPC .................................................. 345/420, 423
See application file for complete search history.

(56) References Cited

U.S. PATENT DOCUMENTS 6,628,279 B1 *  9/2003  Schell ................. G06F 3/04845
                                                       345/420
6,741,248 B2 *  5/2004  Raskar ..................... G06T 15/00
                                                       345/420

(Continued)

OTHER PUBLICATIONS

Modify Edges on 3D Objects, Available on internet at: http://docs.autodesk.com/ ACD MAC/2013/ENU/filesAUGMac/GUID-6 F3 70A20-A8AD-43D6-8400-ABAB9 FE E65FO.html, 2013, 3 pages.

(Continued)

*Primary Examiner* — Kimbinh T Nguyen
(74) *Attorney, Agent, or Firm* — Kilpatrick Townsend & Stockton LLP

(57) ABSTRACT

Embodiments of the invention include a method inserting a new face in a polygonal mesh comprising receiving an input corresponding to: a polygonal mesh having a plurality of faces, a selection of a face ($f_m$) of the plurality of faces, a direction vector (d), a modified target plane ($p_m$), and a threshold angle θ. For each edge (e) of the selected face fm, the method further includes determining each adjacent face ($f_{adj}$) to selected face fm, and inserting a new face at edge e if no adjacent face exists or if $f_{adj}$ is substantially parallel to $p_m$ and within threshold θ. In some embodiments, the new face has a normal orthogonal to e and d.

20 Claims, 46 Drawing Sheets

Related U.S. Application Data

(60) Provisional application No. 61/798,015, filed on Mar. 15, 2013.

(56) References Cited

U.S. PATENT DOCUMENTS

| | | | | |
|---|---|---|---|---|
| 6,792,398 | B1* | 9/2004 | Handley | G06F 3/016 |
| | | | | 345/419 |
| 6,867,771 | B2* | 3/2005 | Kripac | G06T 17/10 |
| | | | | 345/420 |
| 6,982,710 | B2 | 1/2006 | Salomie | |
| 7,310,097 | B2* | 12/2007 | Smith | G06T 17/20 |
| | | | | 345/423 |
| 7,528,832 | B2* | 5/2009 | Smith | G06T 17/20 |
| | | | | 345/423 |
| 7,747,305 | B2 | 6/2010 | Dean et al. | |
| 7,893,937 | B2* | 2/2011 | Rosel | G06T 17/20 |
| | | | | 345/419 |
| 8,004,517 | B1 | 8/2011 | Edelsbrunner et al. | |
| 8,867,847 | B2 | 10/2014 | Silver et al. | |
| 9,001,123 | B1* | 4/2015 | Ames | G06T 17/205 |
| | | | | 345/419 |
| 9,171,396 | B2 | 10/2015 | Jenkins | |
| 9,292,970 | B2* | 3/2016 | Gary | G06T 17/205 |
| 9,542,779 | B2 | 1/2017 | Lipp et al. | |
| 2002/0130854 | A1 | 9/2002 | Perry et al. | |
| 2007/0216713 | A1* | 9/2007 | Kripac | G06L 17/10 |
| | | | | 345/678 |
| 2012/0092340 | A1 | 4/2012 | Sarnoff et al. | |
| 2014/0267253 | A1 | 9/2014 | Lipp et al. | |
| 2016/0196691 | A1* | 7/2016 | Crocker | G06T 17/205 |
| | | | | 345/423 |

OTHER PUBLICATIONS

Modify Vertices on 3D Objects, AutoCad 2013, Available on internet at:http://docs.autodesk.com/ACDMAC/2013/ENU/filesAUGMac/GUID-8C0128FC-8A7B-42137-99CE-A140915478B9.html, 2013, 2 pages.

Move, Rotate, and Scale Faces on 3D Solids and Surfaces, Available on internet at:http://docs.autodesk.com/ACDMAC/2013/ENU/filesAUGMac/GUID-88FEF70B-19A7-49A9-A729-4D153DE6953A.html, 2013, 2 pages.

U.S. Appl. No. 13/999,720, Non-Final Office Action dated May 5, 2016, 15 pages.

U.S. Appl. No. 13/999,720, Non-Final Office Action dated Nov. 25, 2015, 20 pages.

U.S. Appl. No. 13/999,720, Notice of Allowance dated Aug. 30, 2016, 5 pages.

Autodesk, Autocad, Available on internet at: http://www.autodesk.com/autocad, 2014, 5 pages.

Autodesk, Maya, Available on internet at: http://www.autodesk.com/maya, 2014, 5 pages.

Baumgart, Geometric Modeling for Computer Vision, PhD thesis, Stanford Artificial Intelligence Laboratory, Memo Aim 249, Computer Science Department Report No. Cs-463, Oct. 1, 1974, 150 pages.

Bernstein et al., Utting Holes in Holey Geometry: Topology Change for Arbitrary Surfaces, ACM Transactions on Graphics, vol. 32, No. 4, Jul. 2013, 11 pages.

Bokeloh et al., An Algebraic Model for Parameterized Shape Editing, ACM Transactions on Graphics, vol. 31, No. 4, Jul. 2012, pp. 78:1-78:10.

Bokeloh et al., Pattern-aware Shape Deformation Using Sliding Dockers, ACM Transactions on Graphics, vol. 30, Issue 6, Dec. 2011, pp. 123:1-123:10.

Botsch et al., Geometric Modeling Based on Polygonal Meshes, ACM SIGGRAPH courses, Aug. 2007, 188 pages.

Botsch et al., On Linear Variational Surface Deformation Methods, IEEE Transactions on Visualization and Computer Graphics, vol. 14, No. 1, Jan. 2008, 18 pages.

Bouaziz et al., Shape-up: Shaping Discrete Geometry with Projections, Computer Graphics Forum, vol. 31, No. 5, Aug. 2012, pp. 1657-1667.

Cabral et al., Structure Preserving Reshape for Textured Architectural Scenes, Computer Graphics Forum, vol. 28, No. 2, Apr. 2009, pp. 469-480.

Deng et al., Exploring Local Modifications for Constrained Meshes, Computer Graphics Forum, vol. 32, No. 2, May 2013, pp. 11-20.

Gal et al., iWIRES: An Analyze-and-edit Approach to Shape Manipulation, ACM Transactions on Graphics (TOG), vol. 28 Issue 3, Aug. 2009, pp. 33:1-33:10.

Habbecke et al., Linear Analysis of Nonlinear Constraints for Interactive Geometric Modeling, Computer Graphics Forum, vol. 31, No. 2, May 2012, pp. 641-650.

Havemann et al., Generative Mesh Modeling, PhD thesis, Technische Universitiit Braunschweig, Nov. 2005, 11 pages.

Hoffmann, On Local Deformations of Planar Quad-Meshes, International Congress on Mathematical Software, vol. 6327, 2010, pp. 167-169.

Kelly et al., Interactive Architectural Modeling with Procedural Extrusions, ACM Transactions on Graphics, vol. 30, No. 2, Apr. 2011, pp. 14:1-14:15.

Kobbelt et al., Interactive Multi-Resolution Modeling on Arbitrary Meshes, ACM SIGGRAPH Computer Graphics•, Jul. 24, 1998, pp. 105-114.

Kraevoy et al., Non-Homogeneous Resizing of Complex Models, ACM Transactions on Graphics (TOG), vol. 27 Issue 5, Dec. 10, 2008, pp. 111:1-111:9.

Trimble, Sketchup, Available on internet at: www.sketchup.com, 2013, 3 pages.

Vaxman, Modeling Polyhedral Meshes with Affine Maps, Camp. Graph. Forum, vol. 31, Issue 5, Aug. 7, 2012, pp. 1647-1656.

Yang et al., Shape Space Exploration of Constrained Meshes, ACM Transactions on Graphics (TOG), vol. 30 Issue 6, Dec. 12, 2011, pp. 124:1-124:12.

Zeleznik et al., Sketch: An Interface for Sketching 3D Scenes, Proceedings of SIGGRAPH '96, Aug. 1, 1996, pp. 163-170.

Zheng et al., Component-Wise Controllers for Structure-Preserving Shape Manipulation, Computer Graphics Forum, vol. 30, No. 2, Apr. 2011, pp. 563-572.

Zorin et al., Interactive Multiresolution Mesh Editing, SIGGRAPH '97 Proceedings of the 24th annual conference on Computer graphics and interactive techniques, Aug. 3, 1997, pp. 259-268.

\* cited by examiner

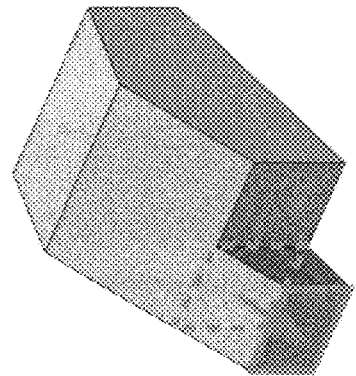
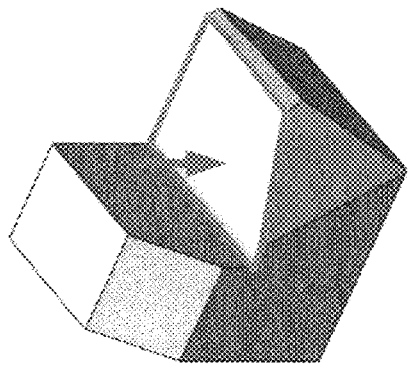
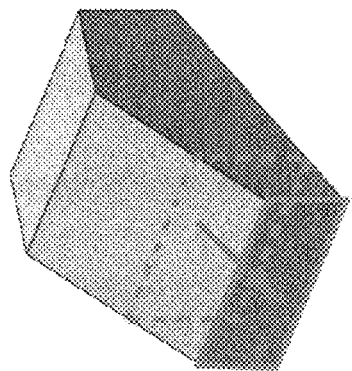
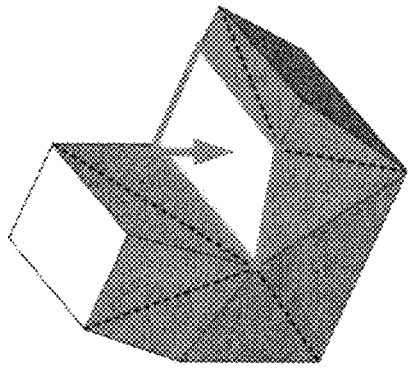
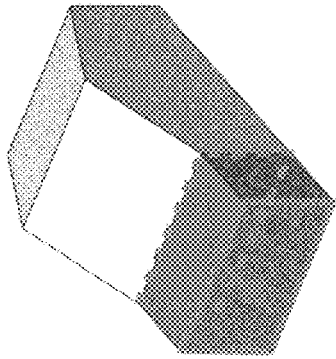
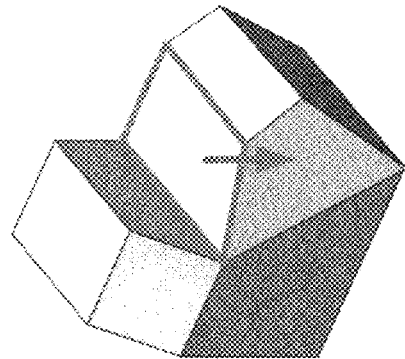
FIG. 1A
FIG. 1B

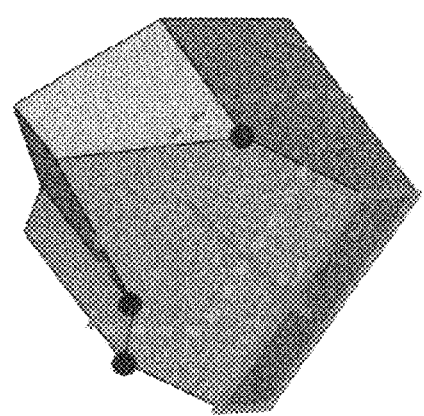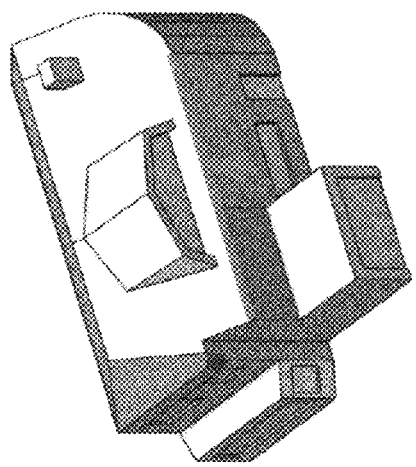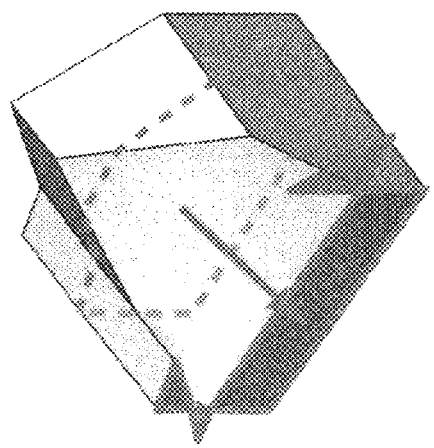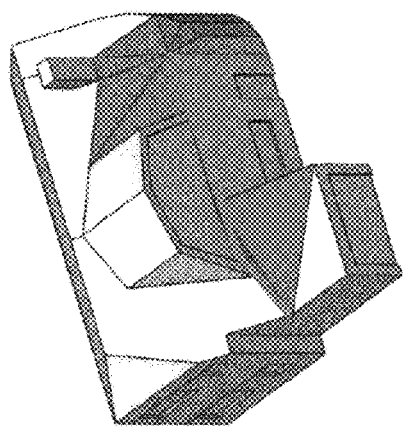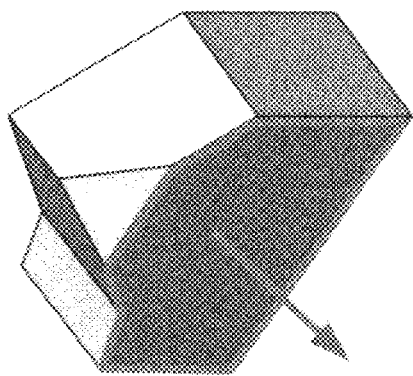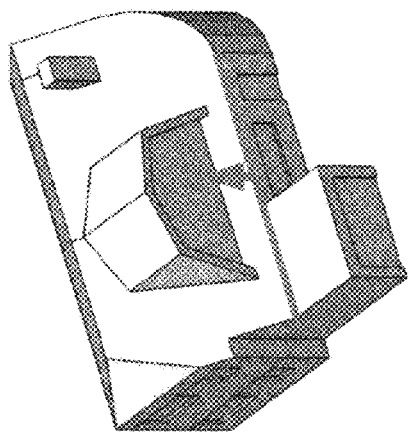
FIG. 1C
FIG. 1D

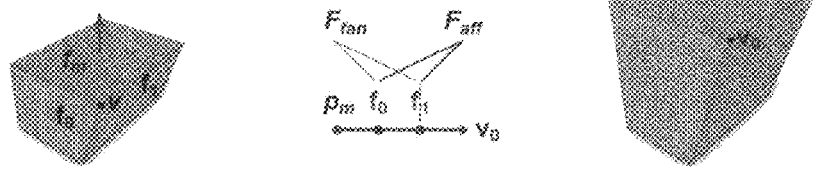
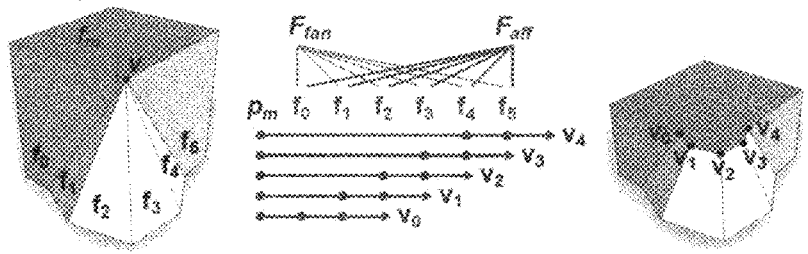
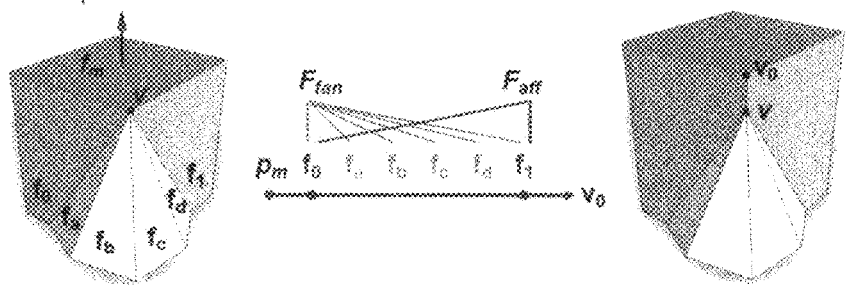
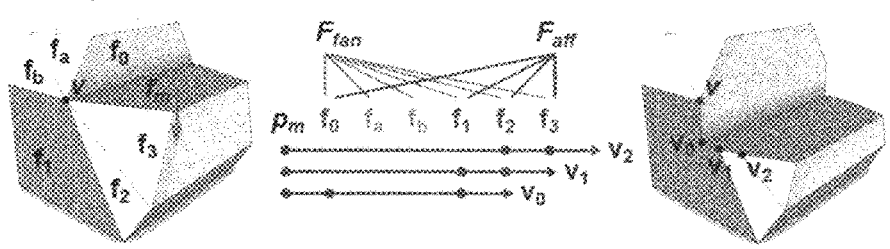
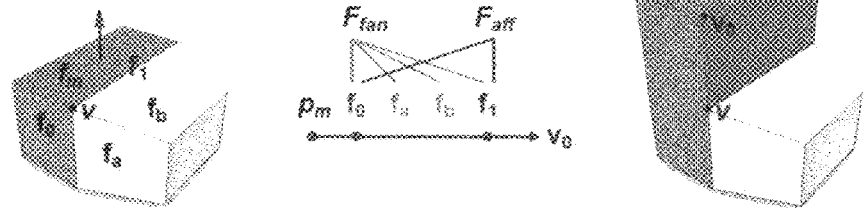
FIG. 5

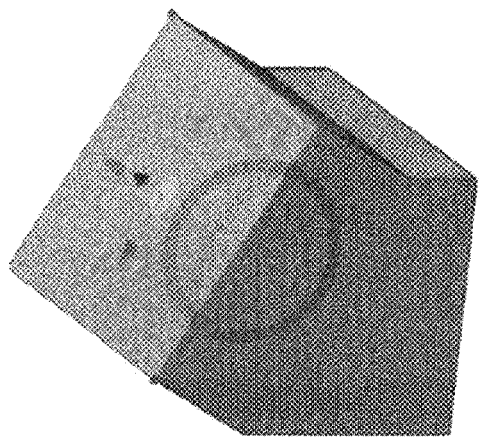
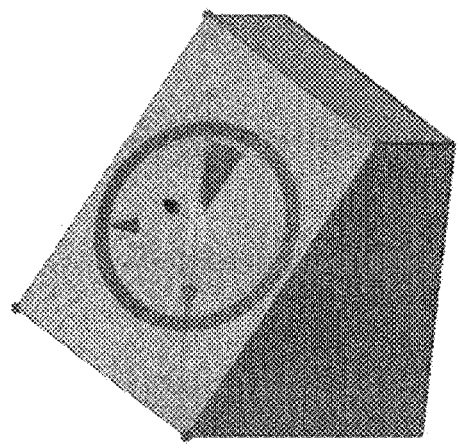
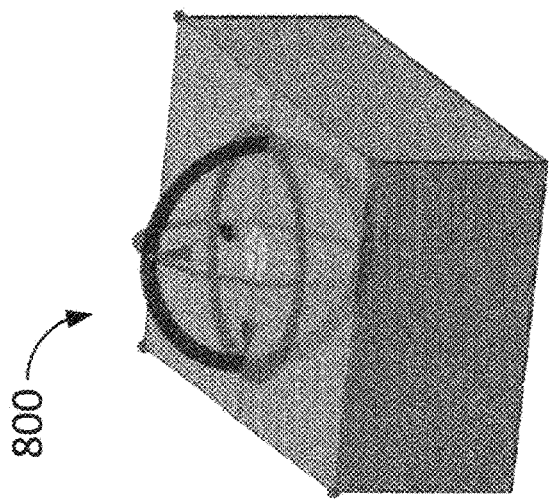
FIG. 8

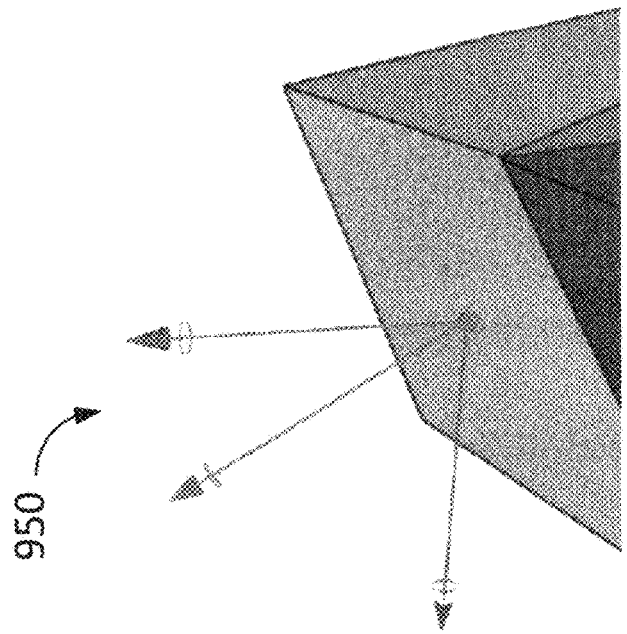
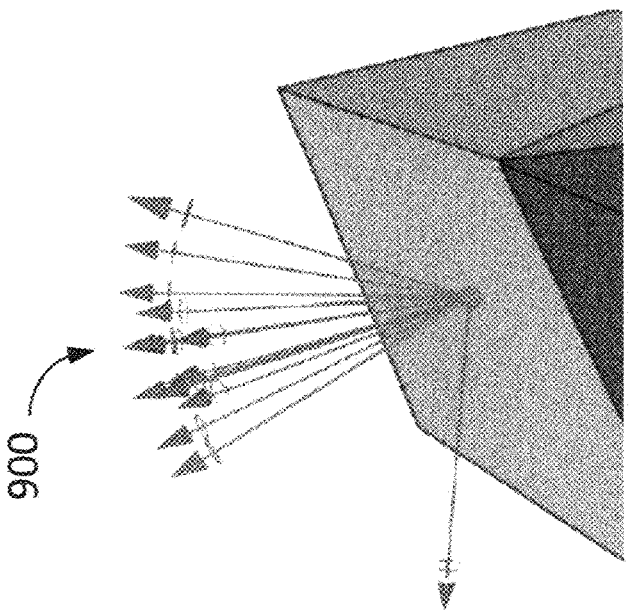
FIG. 9

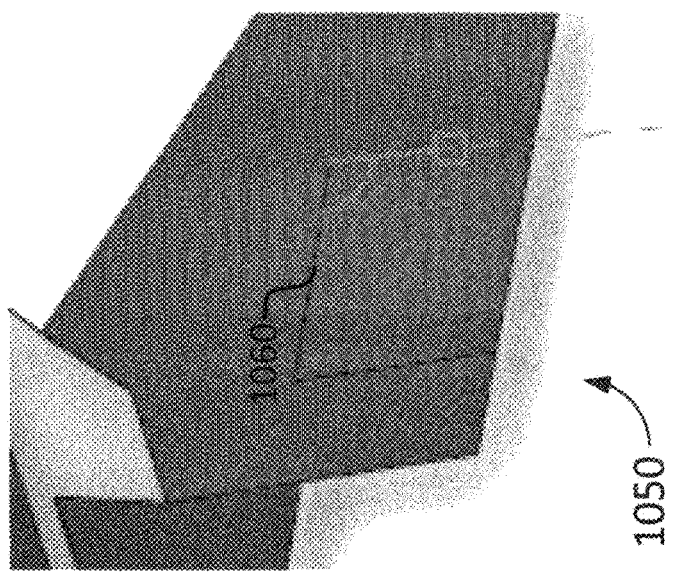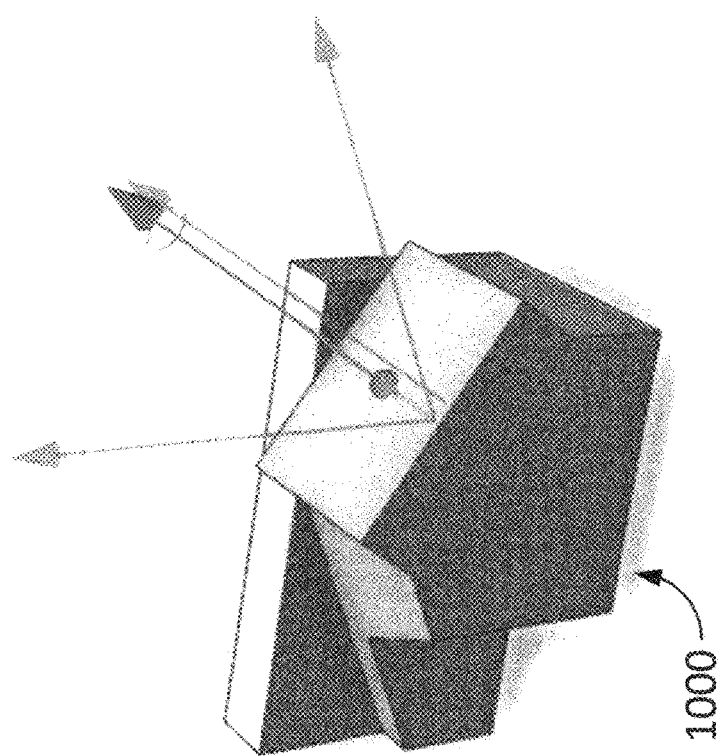
FIG. 10

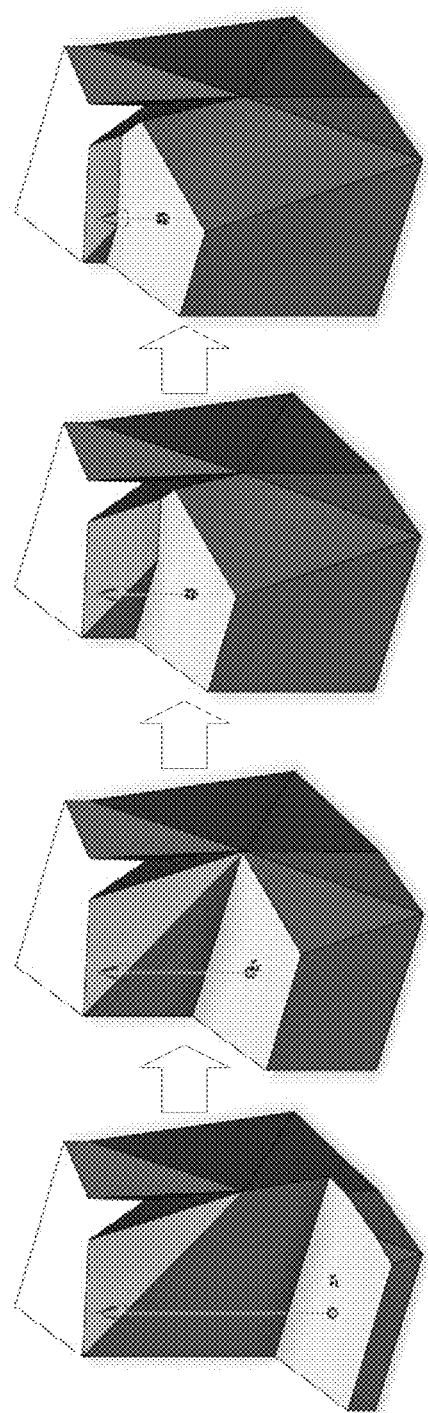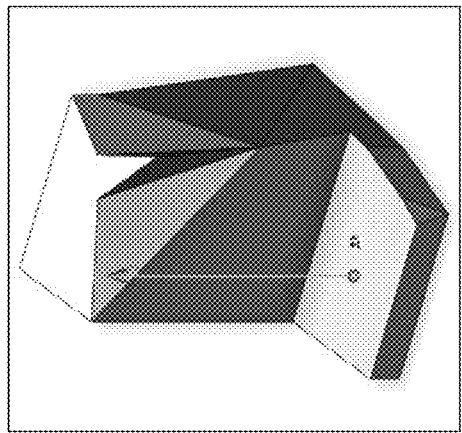
FIG. 26

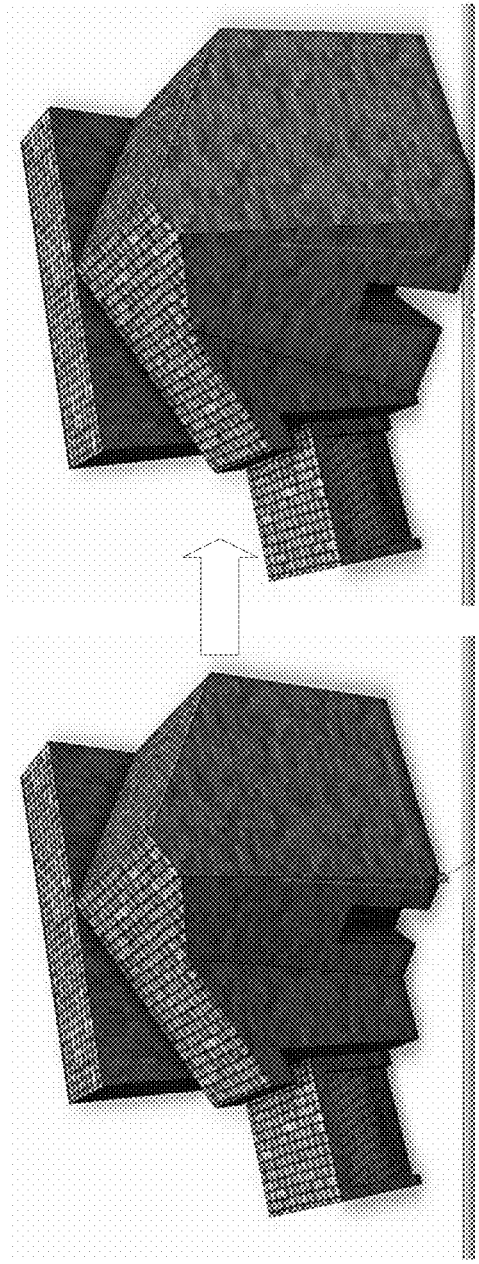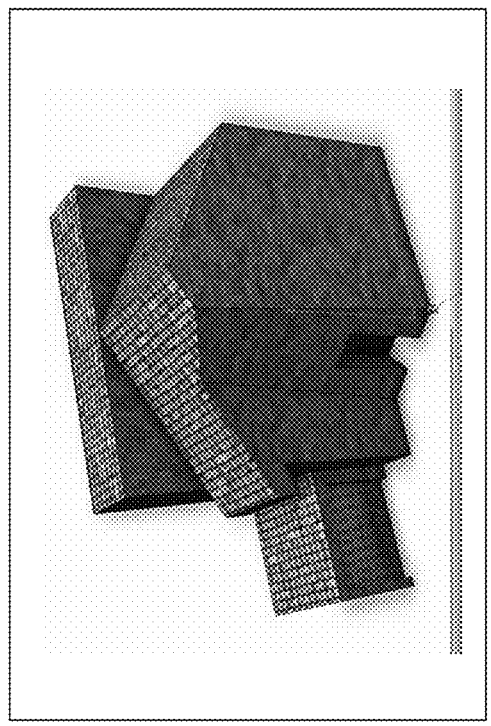
FIG. 34

OBJECT MODELING IN MULTI-DIMENSIONAL SPACE

CROSS-REFERENCES TO RELATED APPLICATIONS

This application claims priority to U.S. Provisional Patent Application No. 61/798,015, filed Mar. 15, 2013, and U.S. patent application Ser. No. 13/999,720 filed on Mar. 17, 2014, the entire contents of which are herein incorporated by reference in their entireties for all purposes.

BACKGROUND

Polygonal three-dimensional (3D) modeling tools have been in use for a number of years and despite continued improvements, 3D modeling tools have historically required users to be steeped in the technical aspects, procedures, and architectural tools associated with a particular modeling suite. Many times these procedures can be very inefficient, lengthy, and cumbersome, even to the most seasoned designers.

For example, PushPull tools are implemented in most modern commercial 3D modeling suites. Their purpose is to intuitively transform a face, edge, or vertex, and then to adapt the polygonal mesh locally. However, previous approaches have limitations: Some allow adjustments only when adjacent faces are orthogonal, others support slanted surfaces but never create new details. In many cases, self-intersections and edge-collapses during editing are either ignored or work only partially for solid geometry. There is a need for PushPull tools that are more intuitive for the user and can reduce the complexity for common modeling tasks to make for quicker and more efficient designs.

BRIEF SUMMARY

Certain embodiments of the invention include a computer-implemented method for inserting a new face in a polygonal mesh, the method comprising receiving input corresponding to a polygonal mesh having a plurality of faces, receiving an input corresponding to a selection of a face (fm) of the plurality of faces, receiving an input corresponding to a direction vector (d), receiving an input corresponding to a modified target plane (pm), and receiving an input corresponding to a threshold angle $\theta$. For each edge (e) of the selected face fm, the method further includes determining each adjacent face (fadj) to selected face fm; and inserting a new face at edge e if no adjacent face exists or if fadj is substantially parallel to pm and within threshold $\theta$. In some cases, the new face has a normal orthogonal to e and d with zero area. The embodiments shown herein depict polygonal meshes having planar faces, however meshes having non-planar faces are possible.

In some embodiments, a computer-implemented method of updating a polygonal mesh, the method including receiving input corresponding to a polygonal mesh having a plurality of faces, receiving an input corresponding to a selection of a face (fm) of the plurality of faces, wherein fm has a plurality of vertices, and receiving an input corresponding to a modified target plane (pm). For each vertex (v) of fm, the method further includes determining fan of faces (Ffan) connected to v, excluding fm, determining all affected faces (Faff) in Ffan, computing new vertices (Vnew), and replacing v with all points in Vnew. For each face fi in Faff, the method can include finding vertices Vsel to insert, determining a next face fn relative to fi in Ffan, determining a previous face fp relative to fi in Ffan, inserting the vertices Vsel after v in fi when fn is not in Faff, inserting the vertices Vsel before v in fi when fp is not in Faff, and otherwise, replacing v in fi with Vsel. In some implementations, determining all affected faces (Faff) in Ffan includes adding the first, last, and all faces intersecting pm to Faff. Computing new vertices (Vnew) can include intersecting every successive triple of faces in Faff to get the intersection points Vnew. In some cases, finding vertices Vsel to insert can include adding a first vertex of Vnew to Vsel when fi is the first face, adding the last vertex of Vnew to Vsel when fi is the last face, and otherwise, adding the previous vertex v(i−1) and the current vertex vi of Vnew to Vsel.

In further embodiments, a computer-program product for modifying a polygonal mesh includes receiving input corresponding to a polygonal mesh having a plurality of faces is provided. The computer-program product can be tangibly embodied in a non-transitory computer-readable storage medium includes instructions configured to cause a data processing system to receive an input corresponding to a selection of a face of the plurality of faces, receive an input corresponding to a direction vector, receive an input corresponding to a target plane, and receive an input corresponding to a threshold angle $\theta$, the threshold angle $\theta$ defining the maximum angle that a side can be extended without requiring an insertion of a new face. The computer-program product can further include instructions configured to cause the data processing system to extend the selected face towards the target plane based on the direction vector and the threshold angle. The selected face can have a plurality of edges. The process of extending the selected face can further include instructions that cause the data processing system to determine an adjacent face for each edge of the selected face, and at each edge, determine a new face needs to be inserted if no adjacent face exists or if the adjacent face is approximately parallel to the target plane within threshold angle $\theta$. The parameter $\theta$ can be used to decide if two planes are considered to be parallel, which in turn can be used to dictate whether an adjacent face can be extended toward a target plane or if a new face needs to be added. Parameter $\theta$ can range from 0° to 90°. In some of the embodiments shown, 60° is used as a threshold, which is a good threshold value that tends to result in the adjustment of existing adjacent faces rather than the creation and insertion of new faces. In other embodiments, 2° can be used as a threshold, which is a good threshold value that tends to result in new faces being created, rather than adjusting existing adjacent faces. If a new face is inserted at a particular edge, the computer program product can further include instructions that cause the processing system to insert a new face having two vertices of the particular edge only, and set a normal of the new face to a cross product of the particular edge's direction and the direction vector.

In certain embodiments, a computer-implemented system includes one or more processors and one or more non-transitory computer-readable storage mediums containing instructions configured to cause the one or more processors to perform operations including: receiving input corresponding to a polygonal mesh having a plurality of faces, receiving an input corresponding to a selection of a face (fm) of the plurality of faces, receiving an input corresponding to a direction vector (d), receiving an input corresponding to a modified target plane (pm), and receiving an input corresponding to a threshold angle $\theta$. For each edge (e) of the selected face fm, the method further includes determining each adjacent face (fadj) to selected face fm; and inserting a new face at edge e if no adjacent face exists or if fadj is substantially parallel to pm and within threshold θ. In some cases, the new face has a normal orthogonal to e and d with zero area. The embodiments shown herein depict polygonal meshes having planar faces, however meshes having non-planar faces are possible.

In some embodiments, a computer-implemented system includes one or more processors and one or more non-transitory computer-readable storage mediums containing instructions configured to cause the one or more processors to perform operations including receiving input corresponding to a polygonal mesh having a plurality of faces, receiving an input corresponding to a selection of a face (fm) of the plurality of faces, wherein fm has a plurality of vertices, and receiving an input corresponding to a modified target plane (pm). For each vertex (v) of fm, the method further includes determining fan of faces (Ffan) connected to v, excluding fin, determining all affected faces (Faff) in Ffan, computing new vertices (Vnew), and replacing v with all points in Vnew. For each face fi in Faff, the method can include finding vertices Vsel to insert, determining a next face fn relative to fi in Ffan, determining a previous face fp relative to fi in Ffan, inserting the vertices Vsel after v in fi when fn is not in Faff, inserting the vertices Vsel before v in fi when fp is not in Faff, and otherwise, replacing v in fi with Vsel. In some implementations, determining all affected faces (Faff) in Ffan includes adding the first, last, and all faces intersecting pm to Faff. Computing new vertices (Vnew) can include intersecting every successive triple of faces in Faff to get the intersection points Vnew. In some cases, finding vertices Vsel to insert can include adding a first vertex of Vnew to Vsel when fi is the first face, adding the last vertex of Vnew to Vsel when fi is the last face, and otherwise, adding the previous vertex v(i−1) and the current vertex vi of Vnew to Vsel.

BRIEF DESCRIPTION OF THE DRAWINGS

This application file contains one or more drawings executed in color. Copies of this patent or patent application publication with color drawing(s) will be provided by the Office upon request and payment of the necessary fee. Illustrative embodiments of the present invention are described in detail below with reference to the attached drawing figures:

FIG. 1A illustrates several possible results of a PushPull operation on a polygon face, according to certain embodiments of the invention.

FIG. 1B illustrates an example of how adjacent faces can be updated during a PushPull operation, according to certain embodiments of the invention.

FIG. 1C illustrates an example of how one or more edge collapses can be handled while maintaining a valid mesh during a PushPull operation, according to certain embodiments of the invention.

FIG. 1D illustrates an example showing the implementation of several features during a PushPull operation, according to certain embodiments of the invention.

FIG. 5 illustrates aspects of determining a new geometry resulting from a face modification, according to certain embodiments of the invention.

FIG. 8 illustrates a direct plane modification tool for controlling aspects of polygonal mesh modifications, according to certain embodiments of the invention.

FIG. 9 illustrates an example of a filtered and unfiltered choice for a direction vector in a mesh modification, according to certain embodiments of the invention.

FIG. 10 illustrates aspects of a polygon mesh modeling interface, according to certain embodiments of the invention.

FIG. 26 illustrates aspects of how faces adjacent to a selected plane are updated during face extrusions, according to certain embodiments of the invention.

FIG. 34 illustrates aspects of plane modification using an interface tool, according to certain embodiments of the invention.

DETAILED DESCRIPTION

Figure 2:
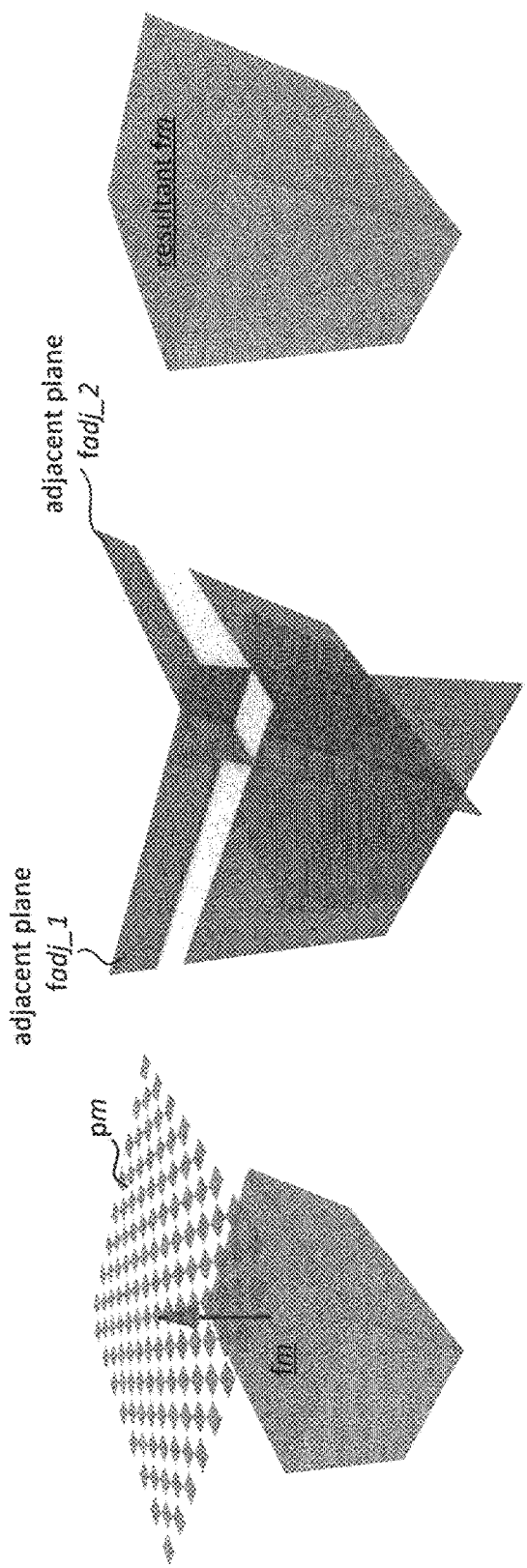
FIG. 2 illustrates a mesh modification method for adaptive face insertion, according to certain embodiments of the invention.

The present invention relates generally to object modeling in two and three-dimensional space using computer-aided design (CAD). More specifically, embodiments of the present invention relate to methods and systems of polygonal mesh modeling and modifications.

Certain standard PushPull tools are implemented in most modern commercial 3D modeling suites. Their purpose is to intuitively transform a face, edge, or vertex, and then to adapt the polygonal mesh locally. However, previous approaches have limitations: Some allow adjustments only when adjacent faces are orthogonal, others support slanted surfaces but never create new details. In many cases, self-intersections and edge-collapses during editing are either ignored or work only partially for solid geometry. There is a need for PushPull tools that are more intuitive for the user and can reduce the complexity for common modeling tasks to make for quicker and more efficient designs.

To overcome these limitations, a PushPull tool is provided for rapid polygonal modeling. In certain embodiments, methods are provided for rapid polygonal modeling that can include adaptive face insertion, adjacent face updates, edge collapse handling, and an intuitive user interface that automatically proposes useful drag directions. The PushPull methods reduce the complexity for common modeling tasks by up to an order of magnitude when compared to existing tools.

Introduction 3D models of plane-dominant man-made objects are widely used in areas such as architecture, engineering, and design. As such, tools that can enable the intuitive creation and editing of such models are vital. One popular and widespread class of tools utilize "Pushpull techniques." Variants of these are implemented in some commercial modeling suites and allow a user to transform a face or edge of a polygon (model) and automatically adapt the model locally, possibly inserting new faces and modifying adjacent ones in the process. However, three significant challenges of mesh adaption have been problematic in contemporary polygonal modeling suites and, until now, these challenges have not been met with effective and efficient solutions.

The first challenge is determining when new faces should be inserted when altering a polygon. Inserting new faces may be desirable to add additional details. However, a user may simply want to adjust the existing adjacent faces without inserting new ones. In some cases, adjusting a face may not be possible when, for example, an adjacent face is parallel to a transformed face. Thus, it can be difficult to determine when to add detail (e.g., new faces) and when to adjust existing adjacent faces, particularly with slanted faces.

FIG. 1A illustrates several possible results of a PushPull operation on a polygonal face, according to certain embodiments of the invention. The left figure illustrates how a new face can be inserted for all edges of a mesh modification using a PushPull operation. The middle figure illustrates a polygonal mesh modification without inserting a new face. The right figure illustrates how new faces can be adaptively added where needed using the methods described herein. New faces are shown in blue and modified adjacent faces are green.

The second challenge is determining how vertices and adjacent faces should be updated when altering a polygon. For example, moving one face can affect all the neighboring faces. Care must be taken to keep adjacent faces planar. This can be particularly challenging when the valence of a moved vertex is higher than three, which requires calculating and adding new vertices to neighboring faces, as shown in FIG. 1B.

FIG. 1B illustrates an example of how adjacent faces can be updated during a PushPull operation, according to certain embodiments of the invention. The left figure is the starting polygonal mesh showing a selected face identified by an orange outline and an arrow indicating the direction of the intended PushPull modification. The middle figure shows a degenerate result using other contemporary CAD tools. The right figure shows the result of using embodiments of the invention. Non-planar or self-intersecting faces are shown in red and edge collapses are indicated by blue dots. It can be clearly seen that the middle figure has significant problems with nearly all adjacent edges as contemporary CAD tools struggle to determine how adjacent faces should be updates and whether they should be kept planar or not. Nearly every single face could potentially change orientation (e.g., non-planar or self-intersecting) to accommodate the PushPull operation, making the calculation computationally intensive and likely unintuitive for the user. In contrast, the right figure keeps all adjacent edges planar with a much more simplified result using a more efficient and intuitive operation, with no non-planar edges or self-intersecting faces.

The third challenge is determining how edge or face collapses should be addressed. Moving a polygonal face can cause adjacent edges or faces to collapse on themselves. This must be addressed in order to maintain a valid mesh. One non-limiting example of this is shown in FIG. 1C.

FIG. 1C illustrates an example of how one or more edge collapses can be handled while maintaining a valid mesh during a PushPull operation, according to certain embodiments of the invention. The left figure is the starting polygonal mesh showing a selected face identified by an orange outline and an arrow indicating the intended direction of the PushPull modification. The middle figure shows a degenerate result using other contemporary CAD tools. The right figure shows the result of using embodiments of the invention. Non-planar or self-intersecting faces are shown in red and edge collapses are indicated by blue dots, and non-planar or self-intersecting faces are shown in red and edge collapses are indicated by blue dots. Again, the middle figure illustrates non-planarities and self-intersecting faces, making for a resulting polygonal mesh that is unintended, unintuitive, and computationally complex. In contrast, the right image illustrates efficient and intuitive extrapolation of the target face using edge collapses (indicated by blue dots).

FIG. 1D illustrates an example showing the implementation of several features during a PushPull operation, according to certain embodiments of the invention. The left figure is the starting polygonal mesh showing a selected line identified by an orange outline and an arrow indicating the intended direction of the PushPull modification. The middle figure shows a degenerate result using other contemporary CAD tools. The right figure shows the result of using embodiments of the invention. Again, the middle figure illustrates non-planarities and self-intersecting faces, making for a resulting polygonal mesh that is unintended, unintuitive, and computationally very complex. In contrast, the right image illustrates computationally efficient and intuitive extrapolation of the target face. These are only a few examples that help illustrate some of the advantages provided by various embodiments of the invention.

Thus, multiple challenges exist when a PushPull operation is performed on a face or an edge. Embodiments of the present invention provide a powerful, efficient, and novel solution for rapid modeling of polygonal objects and are the first systems and methods to provide solutions for all three of the challenges discussed above. The PushPull techniques described herein provide a generalization of common Push-Pull practices, supporting both existing and new editing operations, which is achieved by: (1) an Adaptive Face Insertion method that decides where to insert new faces based on angular thresholds between planes; (2) a Generalized Mesh Update Algorithm to calculate new vertex positions, handle adjacent faces, and efficiently update the local mesh topology; and (3) a Stepwise Modification approach to handle edge collapses without resorting to constructive solid geometry. Certain embodiments also include a PushPull User Interface that automatically proposes useful drag directions for an intuitive user experience and rapid modeling operations. It can be appreciated that the novel PushPull tools described herein can require up to an order of magnitude fewer mouse clicks (i.e., editing actions) compared to state-of-the-art modeling suites, which will be further addressed below.

Polygonal Mesh Modeling Tools and Techniques

One of the simplest approaches to handle a transformed face is extrusion, or by inserting a new face for every edge. Extensions include scaling, direction and offset parameters, as implemented in some contemporary software such as AutoCAD, SketchUp, Trimble, etc., which modify faces orthogonal to the move direction instead of inserting new ones. This enables dimension adjustments of orthogonal meshes, however does not support slanted ones. Procedural extrusions are typically based on weighted straight skeletons, essentially controlling the offsets of the extrusion along a path. For example, some contemporary mesh modeling tools (e.g., AutoCAD) implement a constrained move; instead of inserting new faces, the vertices of a moved face are constrained to lie on the adjacent faces, thus ensuring planarity. This enables adjusting slanted surfaces, but never creates new faces, and thus is not suitable to add detail. By employing boolean operations on solid objects, other mesh modelers support valence changes and edge collapse to some degree by performing boolean subtraction of the volume between the original and the transformed face from the model. However, this only works for water-tight meshes and can fail when the transformed face has self-intersections, for example, as shown in the middle of FIG. 1C.

Plane-Driven Face Modification

In this section, the mesh modification methods (hereinafter referred to as "PushPull++") that underlie the novel modeling tool techniques are discussed herein. Pushpull++ operates on arbitrary polygonal meshes, and in contrast to previous work, no watertight meshes or constructive solid geometry representations with boolean operations are required. In the following sections, core concepts are explained and how faces can be adaptively inserted. Second, embodiments of the local mesh update algorithm that computes the new geometry resulting from a push-or pull-operation are presented. Third, examples are shown and discussed that illustrate how self-intersections are prevented. Finally, various examples are provided that illustrate how the novel methods described herein method can be extended to work with simultaneous face modifications.

Embodiments of the invention include methods that use the most widely used polygonal mesh representation, i.e., the so-called face-vertex meshes, which consist of a simple list of vertices and a set of faces that point to their vertices. Hence, the input mesh M is represented by vertices $v \in V$ and planar faces $f \in F$ where a face f is defined as a list of counterclockwise oriented vertices $\{v_i, v_j, \ldots, v_k\}$ and a face normal $f \cdot \hat{n}$. For each two connected vertices in f, an edge e is defined as pair $\{v_i, v_j\}$. The mesh can be of arbitrary topology, e.g., it can contain boundaries or non-manifold edges.

Adaptive Face Insertion

One important concept of the mesh modification systems and methods described herein (i.e., PushPull++) includes the transformation of a selected face $f_m$ onto a user-defined target plane $p_m$, as depicted in FIG. 2. A first constraint is that all vertices on f have to lie on $p_m$. A second constraint is that these vertices need to be coplanar to the corresponding faces edge-adjacent to $f_m$. Thus, in a simple case, a new vertex position is computed by intersecting three planes, i.e., $p_m$ with the two adjacent face planes.

FIG. 2 illustrates a mesh modification method for adaptive face insertion, according to certain embodiments of the invention. The figure on the left depicts a polygon with a selected face $f_m$ and a target plane $p_m$. The face and target plane can be selected by a user or by an automated process, as would be appreciated by one of ordinary skill in the art. The middle figure illustrates how new vertex positions are computed by intersecting the adjacent face planes with $p_m$. The right figure illustrates the resulting mesh with modified face $f_m$.

As shown, the face planes edge-adjacent to $f_m$ are used to compute the new vertex positions. In certain instances, this could lead to degenerate cases, e.g., when a face plane is parallel to $p_m$ such that they cannot be intersected by virtue of their parallel relationship. To address this condition, embodiments of the invention adaptively determine if the planes of the adjacent faces (e.g., green faces in FIG. 3) can be used or if new faces have to be inserted (blue faces) by using an angle threshold θ. In the latter case, the user-defined direction vector $\vec{d}$ specifies the orientation of the new face. Note that only zero-area faces are inserted at this stage, i.e., the computation of the new vertices is further described regarding various embodiments of the mesh update algorithm.

Figure 3:
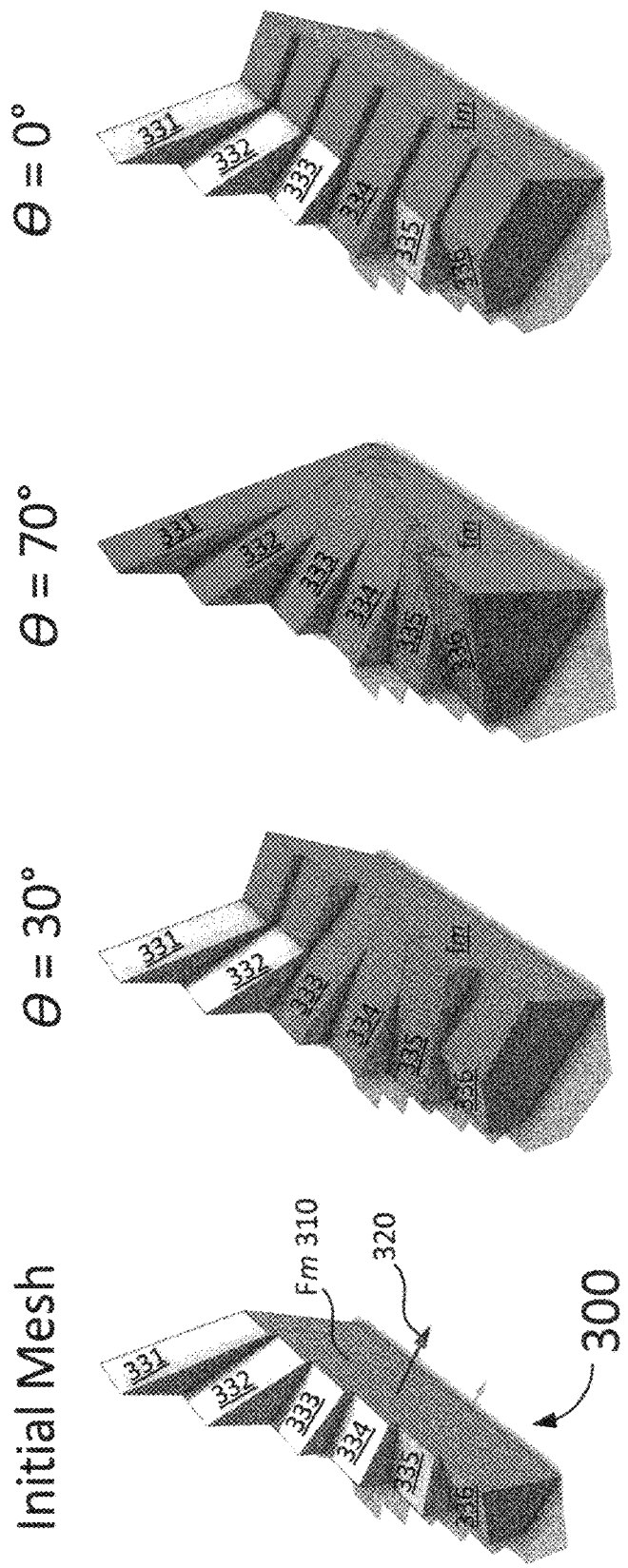
FIG. 3 illustrates a mesh modification method for adaptive face insertion using varying angle thresholds, according to certain embodiments of the invention.

FIG. 3 illustrates a mesh modification method for adaptive face insertion on a polygon 300 using varying angle thresholds, according to certain embodiments of the invention. The threshold angle is used to determine whether existing planes (green) can be used or if new faces have to be inserted (blue). The left figure illustrates an initial polygonal mesh 300 with face $f_m$ 310 selected for modification and the intended direction 320 of modification. Polygonal mesh 300 includes 6 ramps with varying slopes 331-336. The middle left figure illustrates a resulting mesh with an angle threshold θ of 30°. Slopes 333-335 are colored green because their respective slopes are shallow enough (i.e., less than or equal to 30°) such that a new face insertion is not required, and the existing planes are extended in direction 320. In contrast, slopes 331-332 and 336 are colored blue because their respective slopes are too steep (i.e., greater than 30°) such that new faces need to inserted. The middle right figure depicts a resulting mesh with an angle threshold of θ=70°. In this case, all of the slopes 331-336 are less than 70°, thus the existing planes can be extended without requiring new face insertions. The right figure illustrates the case where the angle threshold is θ is 0°. In this case, a traditional extrude operation results. Slopes 331-333 and 335-336 require new face insertions because their respective slopes are greater than 0°. Slope 334 had a 0° slope, so the existing plane can be extended without adding a new face.

The parameter θ can be used to decide if two planes are considered to be parallel, which in turn can be used to dictate whether an adjacent face can be extended toward a target plane or if a new face needs to be added. Parameter θ can range from 0° to 90°. In some of the embodiments shown, 60° is used as a threshold, which is a good threshold value that tends to result in the adjustment of existing adjacent faces rather than the creation and insertion of new faces. In other embodiments, 2° can be used as a threshold, which is a good threshold value that tends to result in new faces being created, rather than adjusting existing adjacent faces.

In some embodiments, angle thresholds can be represented by absolute values to account for negative and positive slopes. For example, polygon 300 has slopes with varying positive and negative angles. Thus, in the middle left case, slopes that are less than or equal to 30° and greater than or equal to −30° can be extended by using existing planes (green). In contrast, slopes that are greater than 30° or less than −30° require new faces to be inserted (blue).

Figure 4:
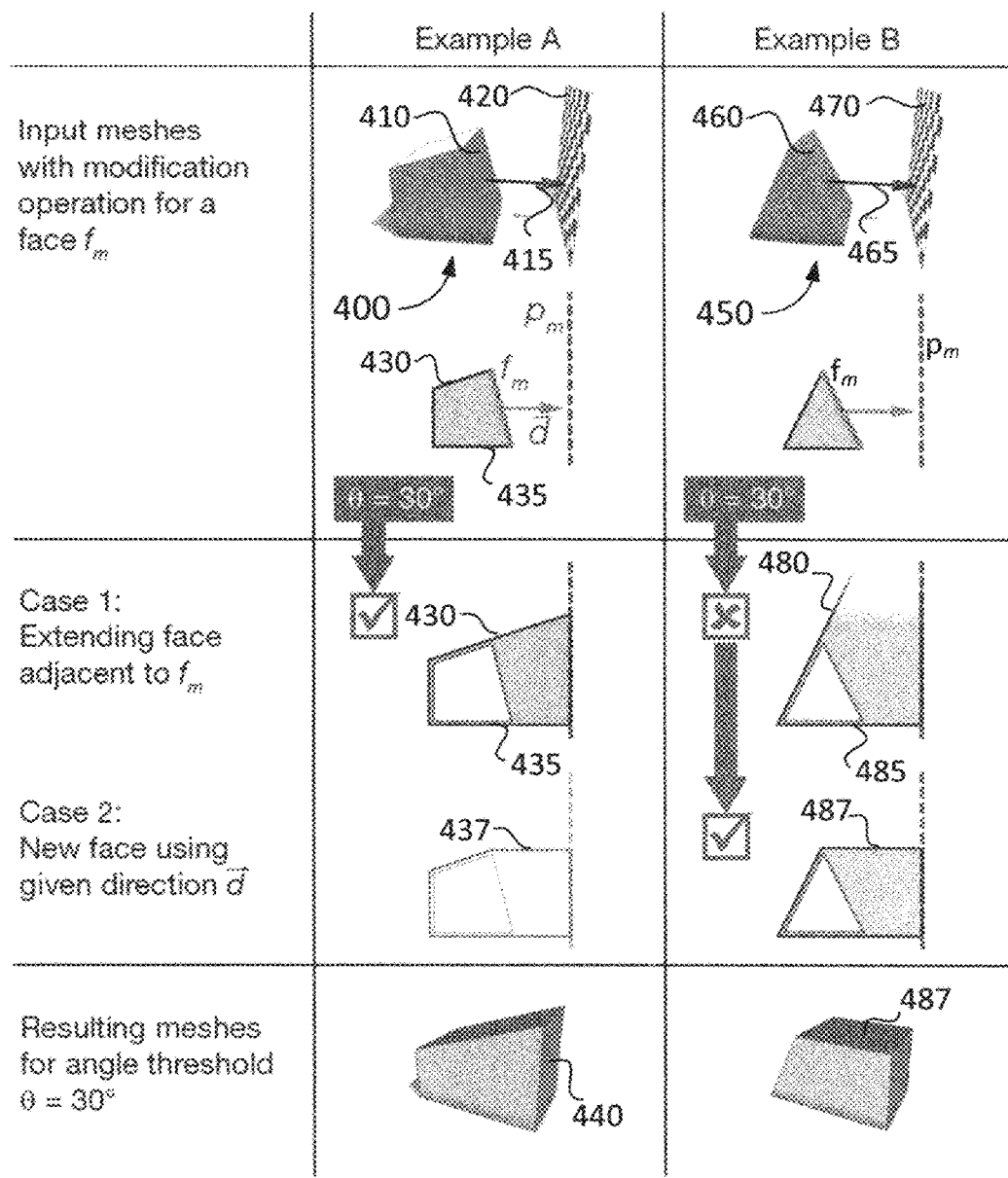
FIG. 4 illustrates two examples of polygonal meshes undergoing face modifications based on angle thresholds, according to certain embodiments of the invention.

Table 1 below illustrates aspects of a face insertion method, according to certain embodiments of the invention. At line 1, each edge of $f_m$ is looped over to get its adjacent face, $f_{adj}$, and then is checked to determine if a new face needs to be inserted. A new face is required if no adjacent face exists (i.e., mesh boundary) or if $f_{adj}$ is "approximately" parallel (within threshold 90°-θ) to $p_m$. To illustrate, Example B of FIG. 4 shows such a case where the angle between face plane and $p_m$ is too small. Note that (1) the function $L(\vec{v}_1, \vec{v}_2)$ always returns values smaller or equal than 90°, i.e., if $\vec{v}_1 \cdot \vec{v}_2$ is negative, the complementary angle is returned, (2) planes are specified in the Hessian normal form, i.e., $\hat{n}$ is the normal of a plane and d its distance to the origin, and (3) in the case of a non-manifold mesh, ambiguities may have to be addressed when determining $f_{adj}$. Therefore, when faced with multiple possibilities, the face most orthogonal to $f_m$ is selected, according to certain embodiments of the invention. In Line 4 and 5, the new face is inserted and consists of the two vertices of edge e only (later in the mesh update method section more vertices will be added) and set its normal to the cross product of the edge's direction and the user-defined direction vector $\vec{d}$. It should be noted that the term "approximately" parallel depends on the threshold θ and dictates how an adjacent side is treated. For example, an adjacent face that is truly parallel to a target plane will never intersect, thus a new plane insertion is required in order for intersection to occur. However, setting threshold θ allows a user (or automated process) to offset the decision threshold from parallel to a desired value that causes a new face insertion to occur. Thus, a high threshold tends to result in existing adjacent edges being extended toward the target plane without requiring a new face, and low thresholds tend to result in most adjacent faces requiring a new face insertion.

TABLE 1

SAMPLE METHOD FOR ADAPTIVE FACE INSERTION BASED ON ADJACENT FACES.
Method 1 - insertFaces($f_m$, $p_m$, $\vec{d}$, θ)

| | |
|---|---|
| 1. | for each edge e in $f_m$ do |
| 2. | $f_{adj}$ = get face adjacent to $f_m$ on e |
| 3. | if $\neg f_{adj}$ or $L(p_m \cdot \hat{n}, f_{adj} \cdot \hat{n}) < 90° - θ$ then |
| 4. | insert zero face $f_{new}$ at e in F |
| 5. | $f_{new} \hat{n}$ = normalize ($\vec{e} \times \vec{d}$) |

Figure 39:
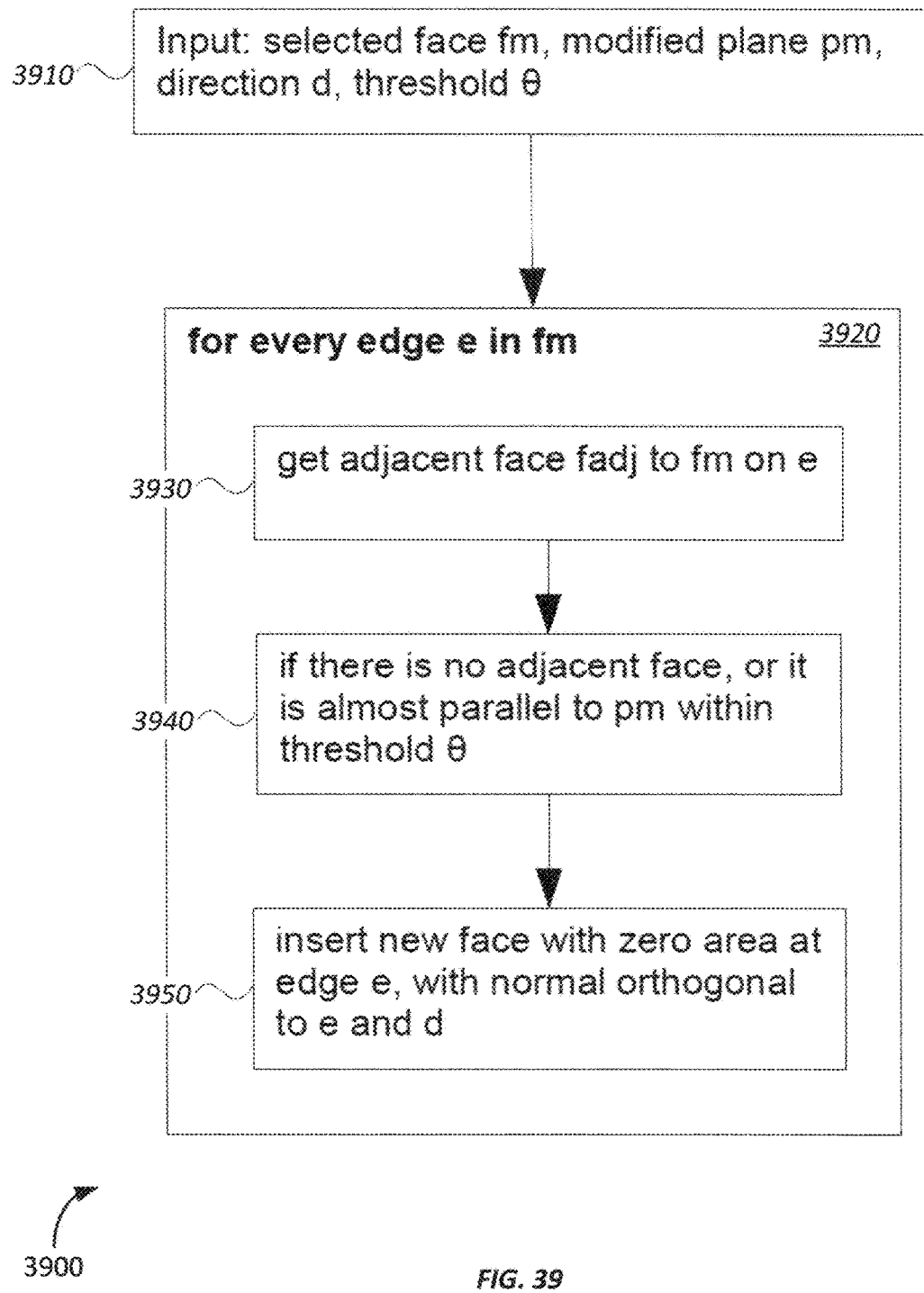
FIG. 39 is a simplified flow diagram illustrating aspects of a method for adaptive face insertion in a polygonal mesh modification, according to an embodiment of the invention.

FIG. 39 is a simplified flow diagram illustrating aspects of a method 3900 for adaptive face insertion in a polygonal mesh modification, according to certain embodiments of the invention. Method 3900 can be performed by processing logic that may comprise hardware (circuitry, dedicated logic, etc.), software (such as is run on a general purpose computing system or a dedicated machine), firmware (embedded software), or any combination thereof. In one embodiment, method 3900 can be performed by processor 3630 of FIG. 36, and more generally by various embodiments of the systems shown in FIGS. 36-37.

Referring to FIG. 39, method 3900 begins with receiving one or more inputs corresponding to: a polygonal mesh having a plurality of faces, a selection of a face ($f_m$) of the plurality of faces, a direction vector (d), a modified target plane ($p_m$), and a threshold angle θ (3910). For each edge (e) of the selected face fm (3920), method 3900 further includes determining each adjacent face ($f_{adj}$) to selected face fm (3930). If no adjacent face exists or if $f_{adj}$ is substantially parallel to $p_m$ and within threshold θ (3940), a new face is inserted at edge e, with normal orthogonal to e and d (3950). In some cases, the new face has zero area and can be updated to conform to a mesh modification by, e.g., method 4000 of FIG. 40.

It should be appreciated that the specific steps illustrated in FIG. 39 provide a particular method for adaptive face insertion in a polygonal mesh modification, according to certain embodiments of the present invention. Other sequences of steps may also be performed according in alternative embodiments. For example, alternative embodiments of the present invention may perform the steps outlined above in a different order. Moreover, the individual steps illustrated in FIG. 39 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 3900.

FIG. 4 illustrates two examples of polygonal meshes undergoing face modifications based on angle thresholds, according to certain embodiments of the invention. Both examples A and B depict a mesh with the intended face modification (i.e., selected face a direction vector $\vec{d}$) on the top row, two sample face insertion strategies on the middle rows, and the resulting meshes on the bottom row.

In Example A, a polygon mesh 400 includes a face $f_m$ 410 that is selected for modification, a target plane $p_m$ 420, and vector $\vec{d}$ 415. In case 1 (second row), the faces adjacent to $f_m$ 410 are extended to target plane 420 (i.e., faces 430, 435). The adjacent planes 430, 435 can extend to target plane 420 without inserting a new face because their respective angles are less than or equal to threshold angle θ=30°. In case 2 (third row), a new face 437 is inserted that corresponds to given direction vector $\vec{d}$ 415. The resulting mesh 440 utilizes case 1, as no new faces are required to be inserted to accommodate the threshold angle θ=30°.

In Example B, a polygon mesh 450 includes a face $f_m$ 460 that is selected for modification, a target plane $p_m$ 470, and vector $\vec{d}$ 465. In case 1 (second row), the faces adjacent to $f_m$ 460 are extended toward target plane 470 (i.e., faces 480, 485). However, face 480 has a 60° angle. Given the threshold angle θ=30°, adjacent face 480 cannot extend to target plane 470 without inserting a new face. In case 2 (third row), a new face 487 is inserted that corresponds to given direction vector $\vec{d}$ 465. The resulting mesh 440 utilizes case 2 since a new face is inserted to accommodate the threshold angle θ=30°.

Method for Mesh Update Algorithm

In some embodiments, a method for determining a new geometry resulting from a face modification can include locally updating a mesh by computing a new vertex positions for $f_m$ and updating the topology in its 1-neighborhood, i.e., its edge- and vertex-adjacent faces. Table 2 depicts one method of determining a new geometry. The non-limiting examples shown in FIG. 5 illustrate the implementation of these concepts.

FIG. 5 illustrates aspects of determining a new geometry resulting from a face modification, according to certain embodiments of the invention. The polygon meshes shown on the left are input meshes prior to modification. The middle line diagrams list the polygon faces around vertex v. The dots highlight which face planes are used for the intersection to compute the new vertices $v_i$, i.e., an arrow illustrates how three planes create one vertex. The polygon meshes shown on the right depict the resulting meshes. It should be noted that $f_i$ in Example G is a zero-area face inserted by the method described in Table 1.

TABLE 2

SAMPLE METHOD FOR UPDATING A POLYGONAL MESH
Method 2 - updateMesh($f_m$,, $p_m$)

| | |
|---|---|
| 1. | for each vertex v in $f_m$ do |
| 2. | # determine affected faces |
| 3. | $F_{fan}$ = get fan of ccw around v (without $f_m$) |
| 4. | $F_{aff}$ = θ |
| 5. | for each $f_i$ in $F_{fan}$ do |
| 6. | if i=0 ‖ i=last ‖ $f_i$ intersects $p_m$ then add $f_i$ to $F_{aff}$ |
| 7. | # compute new vertices |
| 8. | $V_{new}$ = θ |
| 9. | for each except last face $f_i$ in $F_{aff}$ do |
| 10. | add intersect(pm, p($f_i$ ), p($f_i$+1)) to V and $V_{new}$ |
| 11. | # update vertex indices of faces |
| 12. | replace v with $V_{new}$ in $f_m$ |
| 13. | for each face $f_i$ in $F_{aff}$ do |
| 14. | if i=0 then $V_{sel}$ = first vertex of $V_{new}$ |
| 15. | else if i=last then $V_{sel}$ = last vertex of $V_{new}$ |
| 16. | else $V_{sel}$ = vertices $v_{i-1}$ and $v_i$ of $V_{new}$ |
| 17. | $f_n$ = get next face to $f_i$ in $F_{fan}$ (modulo) |
| 18. | $J_p$ = get previous face to $f_i$ in $F_{fan}$ (modulo) |
| 19. | if $f_n \notin F_{aff}$ then insert $V_{sel}$ after v in $f_i$ |
| 20. | else if $f_p \notin F_{aff}$ then insert $V_{sel}$ before v in $f_i$ |
| 21. | else replace v with $V_{ins}$ in fi |

Example C depicts a simple modification case where the new position for a vertex v is computed by intersecting $p_m$ with its two adjacent faces. In more complex cases, such as Example D, vertex v has to be replaced with multiple vertices. In other words, as vertex v moves down from its initial position, it splits into five new vertices $f_0$-$f_4$. To address this issue, a set $F_{fan}$ is created, which contains the faces around v (sorted counterclockwise and without $f_m$). The new vertices can then be computed by intersecting $p_m$ with the face planes of each subsequent tuple in $F_{fan}$. However, in some cases not all faces in $F_{fan}$ might be affected by the modification, as shown in Examples E-G. Thus, in some embodiments, to compute the new vertices, the subset $F_{aff} \subseteq F_{fan}$ is used, which includes two faces edge-adjacent to $f_m$ and faces which are intersected by $p_m$. The new vertices $V_{new}$ are computed in Line 10 of method 2, where the intersection of $p_m$ with two face planes occurs. Note that (1) the function p(f) returns the plane coplanar with face f, and (2) the function intersect( ) also handles coplanar input planes by replacing one of them with an orthogonal plane through vertex v.

After the new vertices $V_{new}$ are computed, the modified face $f_m$ is updated by replacing v with all new vertices in $V_{new}$ (Line 12). Next, the affected faces around v are updated. Therefore, in Lines 14-16, we first determine which of the new vertices belong to an affected face and store them in $V_{sel}$. As shown in Example D, the faces which are edge-adjacent to $f_m$ (i.e. the first and last face in $F_{aff}$) need to update one vertex while the other affected faces require two new vertices.

In simple cases, such as Examples C or D, the initial vertex v in an affected face can now be replaced with the vertices in $V_{sel}$ (Line 21), according to certain embodiments of the invention. However, if all faces in $F_{fan}$ are not affected, then the initial vertex v is not removed since it is still used by the non-affected faces. Thus, the border between affected and non-affected faces is detected to ensure that the border edges are preserved. The face $f_0$ in Example E shows such a case where its next neighbor $f_a$ is not in $F_{aff}$. Hence, to update $f_a$, initial vertex v is not replaced with the new vertex; rather, initial v is kept and the new vertex is inserted after v in the face's counterclockwise ordered list of vertices (Line 19). Similarly, $f_i$ keeps v since it is adjacent to the non-affected face $f_d$. However, because the new vertex is on the other side of the border, it needs to be inserted before v (Line 20).

The same case is shown in face $f_1$ of Example F. In this case, the previous face $f_b$ is non-affected and therefore $f_1$ keeps v and inserts its new vertices $V_{sel}$ before v ($V_{sel}$ consists of two vertices since $f_1$ is not edge-adjacent to $f_m$, see previous paragraph). This method can also work in the case of zero-faces inserted (e.g., as shown by method of Table I), i.e., because a new vertex is added before or after both existing vertices each, the resulting face has valence 4. This is shown, for example, in Example G.

In some embodiments, texture coordinates can updated in the following manner: Every vertex v in every modified face f is projected onto the original plane of f, resulting in $v_p$. Mean-value coordinates of $v_p$ can then be used to extrapolate the texture coordinate. For new faces, the coordinates of the adjacent face can be copied and scaled to the same relative size, as would be appreciated by one of ordinary skill in the art with the benefit of this disclosure.

Figure 40:
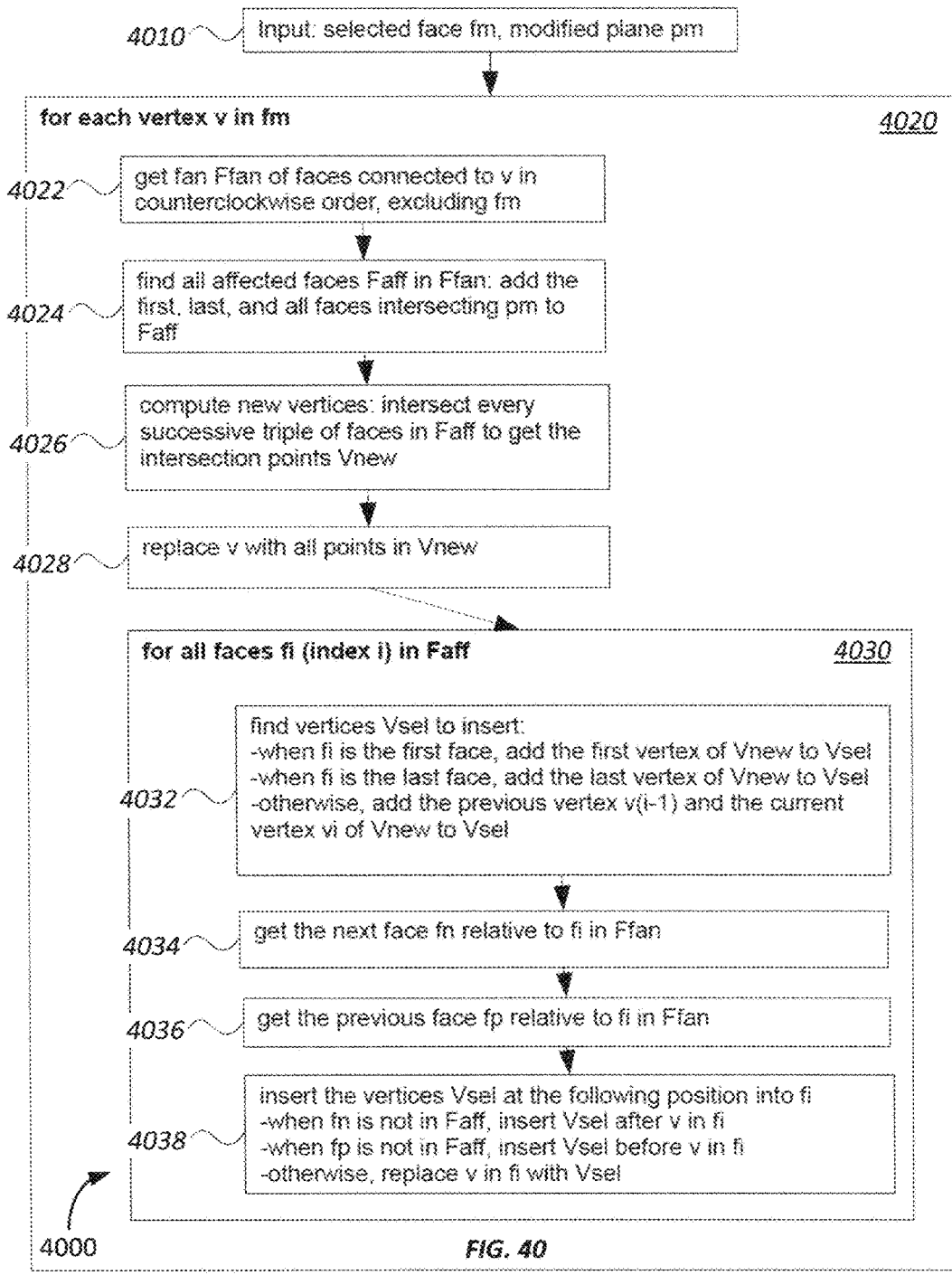
FIG. 40 is a simplified flow diagram illustrating aspects a method for updating a polygonal mesh after a mesh modification, according to certain embodiments of the invention.

FIG. 40 is a simplified flow diagram illustrating aspects of a method 4000 for updating a polygonal mesh after a mesh modification, according to certain embodiments of the invention. Method 4000 can be performed by processing logic that may comprise hardware (circuitry, dedicated logic, etc.), software (such as is run on a general purpose computing system or a dedicated machine), firmware (embedded software), or any combination thereof. In one embodiment, method 4000 can be performed by processor 3630 of FIG. 36, and more generally by various embodiments of the systems shown in FIGS. 36-37.

Referring to FIG. 40, method 4000 begins with receiving an input corresponding to a polygonal mesh having a plurality of faces, receiving an input corresponding to a selection of a face ($f_m$) of the plurality of faces, where $f_m$ has a plurality of vertices, and receiving an input corresponding to a modified target plane ($p_m$) (4010). At 4020, for each vertex (v) of $f_m$, method 4000 includes determining the fan of faces ($F_{fan}$) connected to v, excluding face $f_m$ (4020). At 4024, for each vertex (v) of $f_m$, all affected faces ($F_{aff}$) in $F_{fan}$ are determined. In some implementations, this includes adding the first, last, and all faces intersecting $p_m$ to $F_{aff}$. At 4026, for each vertex (v) of $f_m$, method 4000 includes computing new vertices ($V_{new}$). New vertices can be computed by intersecting every successive triple of faces in $F_{aff}$ to get the intersections points $V_{new}$. Vertex v is then replaced with all points in $V_{new}$ (4028).

At 4030, for all faces fi (index i) in Faff, method 4000 includes finding vertices $V_{sel}$ to insert (4032), determining a next face $f_n$ relative to $f_i$ in $F_{fan}$ (4034), determining a previous face $f_p$ relative to $f_i$ in $F_{fan}$ (4036), and inserting the vertices $V_{sel}$ after v in $f_i$ when $f_n$ is not in $F_{aff}$, inserting the vertices $V_{sel}$ before v in $f_i$ when $f_p$ is not in $F_{aff}$, and otherwise, replacing v in $f_i$ with $V_{sel}$ (4038). In certain embodiments, finding vertices $V_{sel}$ to insert can include adding the first vertex of $V_{new}$ to $V_{sel}$ when $f_i$ is the first face, adding the last vertex of $V_{new}$ to $V_{sel}$ when $f_i$ is the last face, and otherwise, adding the previous vertex v(i−1) and the current vertex $v_i$ of $v_{new}$ to $v_{sel}$.

It should be appreciated that the specific steps illustrated in FIG. 40 provide a particular method for a updating a polygonal mesh after a mesh modification, according to certain embodiments of the invention. Other sequences of steps may also be performed according in alternative embodiments. For example, alternative embodiments of the present invention may perform the steps outlined above in a different order. Moreover, the individual steps illustrated in FIG. 40 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 4000.

Managing Intersections with Stepwise Modification

Face modifications can sometimes lead to self-intersecting meshes, which can create unintended, awkward, and unintuitive results. Some non-limiting examples of face modifications with self-intersecting meshes are shown in the second row of FIG. 6. To prevent local self-intersections, a plane sweep approach is provided that iteratively identifies the next conflict event (Method 3 of Table 3) and consecutively applies the modification with corresponding intermediate planes until the user-given target plane $p_m$ is reached (Method 4 of Table 4). This iterative method is illustrated in the third row of FIG. 6.

Figure 6:
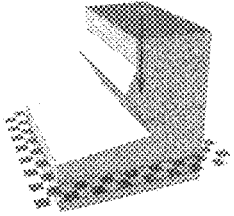
FIG. 6 illustrates a series of polygonal meshes undergoing step-wise iterative modifications to manage self-intersecting meshes, according to certain embodiments of the invention.

FIG. 6 illustrates a series of polygonal meshes undergoing step-wise iterative modifications to manage self-intersecting meshes, according to certain embodiments of the invention. The polygon meshes shown on the top row are input meshes prior to implementing a face modification operation. In the second row, face modifications are shown without using stepwise modifications, which result in self-intersections. The third row illustrates face modifications with stepwise modifications resulting in no self-intersecting meshes. This is performed by identifying conflict events (green dots) and applying step-by-step modifications with corresponding intermediate planes. The last row depicts the resulting polygonal mesh after undergoing the step-wise iterative modification.

One type of conflict event includes edges connected with $f_m$ that shrink to zero length as the face is modified in the direction of the user-defined vector, a illustrated in Example H. The event positions correspond to the vertices neighboring $f_m$ (Table 3, Line 2). Another type of conflict event occurs when a polygon mesh has collapsing edges on $f_m$ itself, as illustrated in Example I. Their positions can be found by intersecting planes of three consecutive faces adjacent to $f_m$ (Table 3, Line 3). Afterwards, in Line 4, the resulting set of events $V_{ev}$ can be reduced to only the events located between the start and end plane, e.g., in the case of a push operation the vertices above $p(f_m)$ and below $p_m$ are removed.

TABLE 3

METHOD FOR STEP-WISE MODIFICATION TO
AVOID SELF-INTERSECTING LINES
Method 3 getNextStep($f_m$, $p_m$)

| | |
|---|---|
| 1. | for each face $f_i$ edge-adjacent to $f_m$ do |
| 2. | add vertices in $f_i$ neighboring $f_m$ to $V_{ev}$ |
| 3. | add intersect(p($f_i\ominus1$),p($f_i$),p($f_i\oplus1$))to $V_{ev}$ |
| 4. | $V_{ev}$ = get all vertices in $V_{ev}$ between p($f_m$) and $p_m$ |
| 5. | if $V_{ev} = \emptyset$ then |
| 6. | p=$p_m$ |
| 7. | else if $p_m$ parallel to $f_m$ then |
| 8. | v = get vertex in $V_{ev}$ nearest to p($f_m$) |
| 9. | p = plane through v and parallel to $p_m$ |
| 10 | else |
| 11. | l = intersect (p($f_m$), $p_m$) |
| 12. | P = get all planes through line l and each $v_{ev}$ in $V_{ev}$ |
| 13. | p = plane in P most parallel with $f_m$ |
| 21. | return p |

If any events are remaining, the intermediate plane is determined by Lines 7-13 of Table 3. In the case where $p_m$ is parallel to $f_m$, the plane through the event nearest to p($f_m$) is returned. Otherwise, the planes are interpolated, as shown in Example J. Thus, a set P with planes through the intersection line l is constructed and the plane with the smallest angle to $f_m$ is returned. It should be noted that although the first event in Example J is not the nearest one, its plane has the smallest angle.

Figure 41:
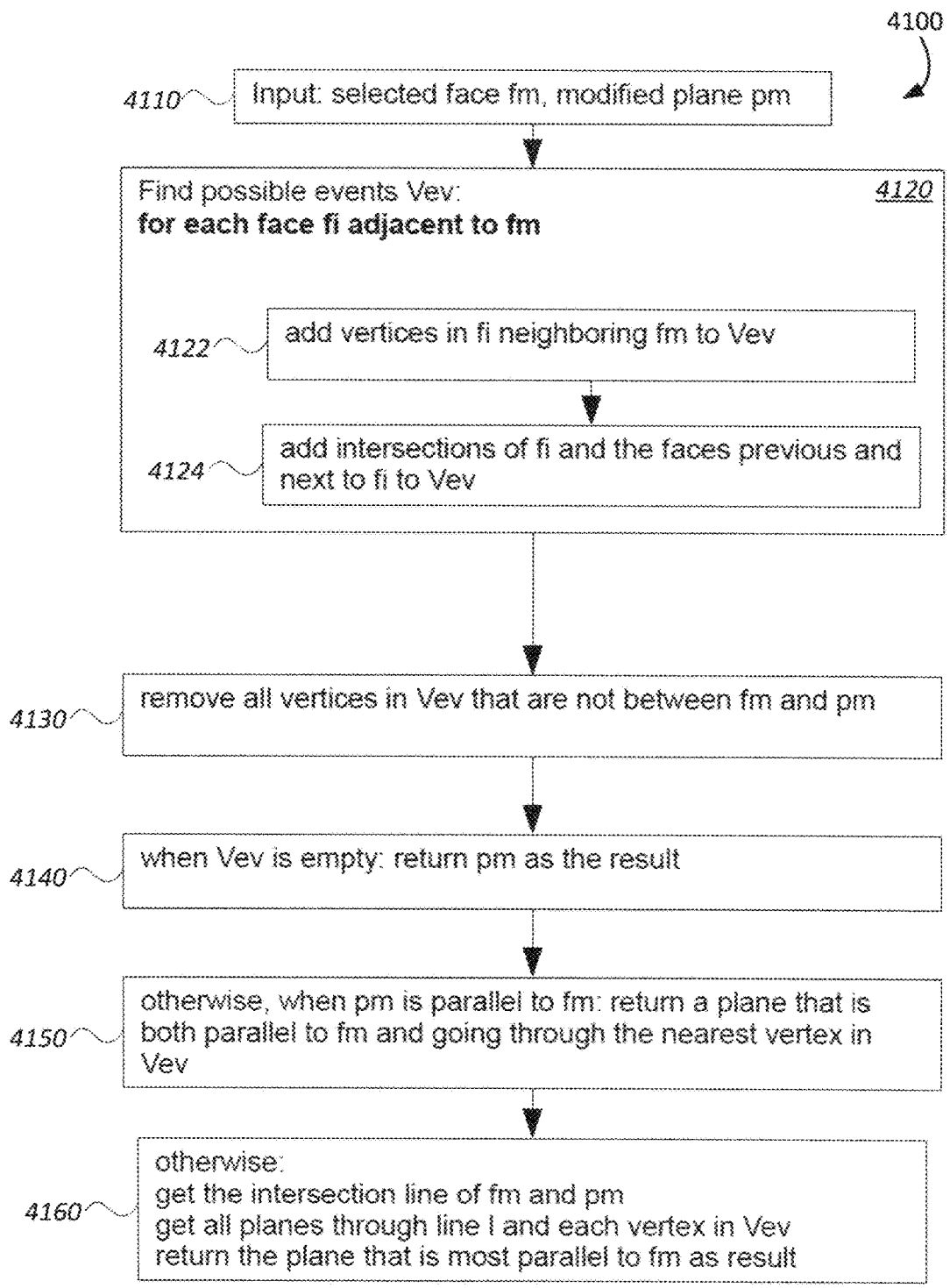
FIG. 41 illustrates a simplified flow diagram illustrating aspects of a method for preventing local self-intersections (conflict event) in polygonal mesh modifications, according to an embodiment of the invention.

FIG. 41 is a simplified flow chart illustrating aspects of a method 4100 for preventing local self-intersections (conflict event) in polygonal mesh modifications, according to certain embodiments of the invention. Method 4000 can be performed by processing logic that may comprise hardware (circuitry, dedicated logic, etc.), software (such as is run on a general purpose computing system or a dedicated machine), firmware (embedded software), or any combination thereof. In one embodiment, method 4100 can be performed by processor 3630 of FIG. 36, and more generally by various embodiments of the systems shown in FIGS. 36-37.

Referring to FIG. 41, method 4100 begins with receiving an input corresponding to a polygonal mesh having a plurality of faces, receiving an input corresponding to a selection of a face ($f_m$) of the plurality of faces, where $f_m$ has a plurality of vertices, and receiving an input corresponding to a modified target plane ($p_m$) (4110). To determine possible conflict events $V_{ev}$ (4120), for each face $f_i$ adjacent to $f_m$, method 4100 includes adding both vertices in $f_i$ neighboring $f_m$ to $V_{ev}$ (4122) and adding intersections of $f_i$ and the faces previous and next to $f_i$ are added to $V_{ev}$ (4124). At 4130 all vertices in $V_{ev}$ are removed that are not between $f_m$ and $p_m$ (4130). When $V_{ev}$ is empty, $p_m$ is returned as the result (4140). In cases where $p_m$ is parallel to $f_m$, method 4100 proceeds with returning a plane that is both parallel to $f_m$ and going through the nearest vertex in $V_{ev}$ (4150). In all other cases, method 4100 includes determining the intersection line of $f_m$ and $p_m$, determining all planes through line l and each vertex in $V_{ev}$, and returning the plane that is most parallel to $f_m$ as a result (4160).

It should be appreciated that the specific steps illustrated in FIG. 41 provide a particular method for preventing conflict events in polygonal mesh modifications, according to certain embodiments of the invention. Other sequences of steps may also be performed according in alternative embodiments. For example, alternative embodiments of the present invention may perform the steps outlined above in a different order. Moreover, the individual steps illustrated in FIG. 41 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 4100.

Method 4 of Table 4 describes the stepwise modification that continues until the applied target plane corresponds to the user input, or $f_m$ collapses. In each loop of the method, the face insertion needs to be applied anew and a local mesh cleanup within the 1-neighborhood of $f_m$ can be performed to, e.g., remove zero edges, zero faces or unused vertices. One example of inserting a new face is illustrated in event 3 of Example H.

TABLE 4

STEPWISE MODIFICATION TO MATCH
TARGET PLANE TO USER INPUT
Method 4 mainSingle($f_m$, $p_m$, $\vec{d}$, $\theta$)

| | |
|---|---|
| 1. | while $P_{tmp} \neq p_m$ and $f_m \in F$ do |
| 2. | insertFaces(fm, pm, $\vec{d}$, $\theta$) |
| 3. | $P_{tmp}$ = getNextStep($f_m$, $p_m$) |
| 4. | updateMesh($f_m$, $p_{tmp}$) |
| 5. | cleanupMesh($f_m$) |

Figure 42:
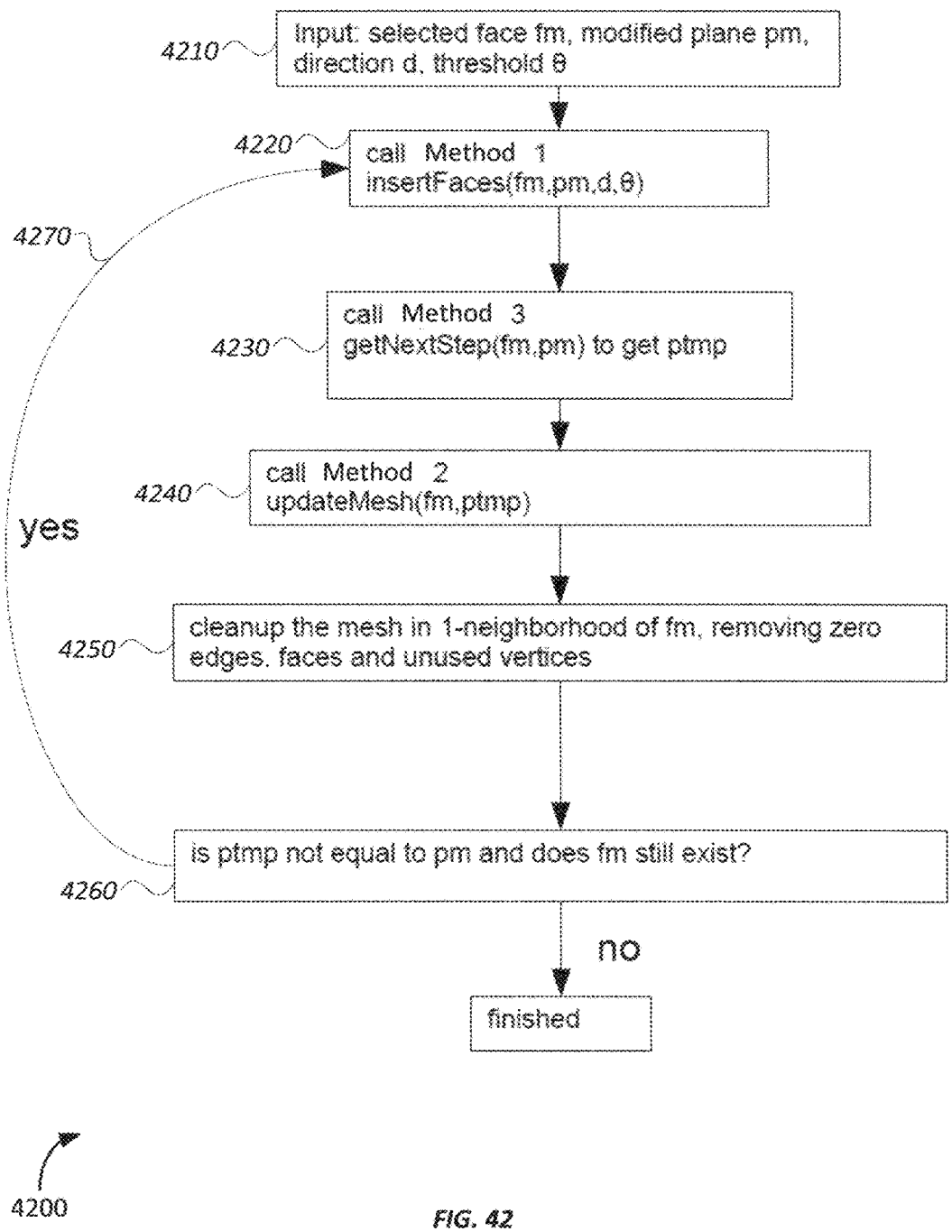
FIG. 42 is a simplified flow diagram illustrating aspects of a method for applying step-by-step modifications with corresponding intermediate planes in a polygonal mesh modification to avoid conflict events according to certain embodiments of the invention.

FIG. 42 is a simplified flowchart illustrating aspects of a method 4200 for applying step-by-step modifications with corresponding intermediate planes in a polygonal mesh modification to avoid conflict events, according to certain embodiments of the invention. Method 4200 can be performed by processing logic that may comprise hardware (circuitry, dedicated logic, etc.), software (such as is run on a general purpose computing system or a dedicated machine), firmware (embedded software), or any combination thereof. In one embodiment, method 4200 can be performed by processor 3630 of FIG. 36, and more generally by various embodiments of the systems shown in FIGS. 36-37.

Referring to FIG. 42, method 4200 begins with receiving an input corresponding to a polygonal mesh having a plurality of faces, receiving an input corresponding to a selection of a face ($f_m$) of the plurality of faces, where $f_m$ has a plurality of vertices, receiving an input corresponding to a modified target plane ($p_m$), direction d, and a threshold angle $\theta$ (4210). Method 4200 further includes applying inputs $f_m$, $p_m$, d, and threshold angle $\theta$ to method 3900 (FIG. 39) to adaptively insert a new polygonal face where appropriate (4220). Next, $p_m$ and $f_m$ are applied as inputs to method 4000 (FIG. 40) to determine temporary target plane $p_{tmp}$ (4230). At 4240, an updated mesh is determined using inputs $f_m$ and $p_{tmp}$ in method 4000 of FIG. 40. At 4250, areas of the polygonal mesh in the 1-neighborhood of $f_m$ are cleaned up, which includes removing zero edges, faces, and unused vertices. If $p_{tmp}$ is not equal to $p_m$ and if $f_m$ still exists (4260), method 4200 returns to method step 4220 (4270). Otherwise, method 4200 ends.

In some implementations, method 4200 applies inputs $f_m$, $p_m$, d, and threshold angle $\theta$, to method 1 (Table 1) to determine if a new face needs to be inserted, then calls method 3 (Table 3) to determine the next step in a step-by-step process using intermediate planes to avoid conflict events. The mesh is updated using method 2 (Table 2) with the new temporary target plane $p_{tmp}$ followed by a "clean up" process eliminating zero edges, faces, and unused vertices in the 1-neighborhood of $f_m$. Finally, if the temporary target plane is equal to target plane $p_m$, the method ends.

Otherwise, method 4200 loops back to method 1 to determine if the next face requires a new face insertion and continues in an iterative fashion, as shown, e.g., in Example H of FIG. 6.

It should be appreciated that the specific steps illustrated in FIG. 42 provide a particular method for applying step-by-step modifications with corresponding intermediate planes in a polygonal mesh modification to avoid conflict events, according to certain embodiments of the invention. Other sequences of steps may also be performed according in alternative embodiments. For example, alternative embodiments of the present invention may perform the steps outlined above in a different order. Moreover, the individual steps illustrated in FIG. 42 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 4200.

Simultaneous Modification of Multiple Faces

The polygonal mesh modifications discussed so far have focused on operations applied to a single face. However, embodiments of the invention enable push- and pull-operations on an edge or a vertex, which requires the simultaneous modification of multiple neighboring faces. In the following, the challenges with simultaneous modification and their solutions are discussed.

Figure 7:
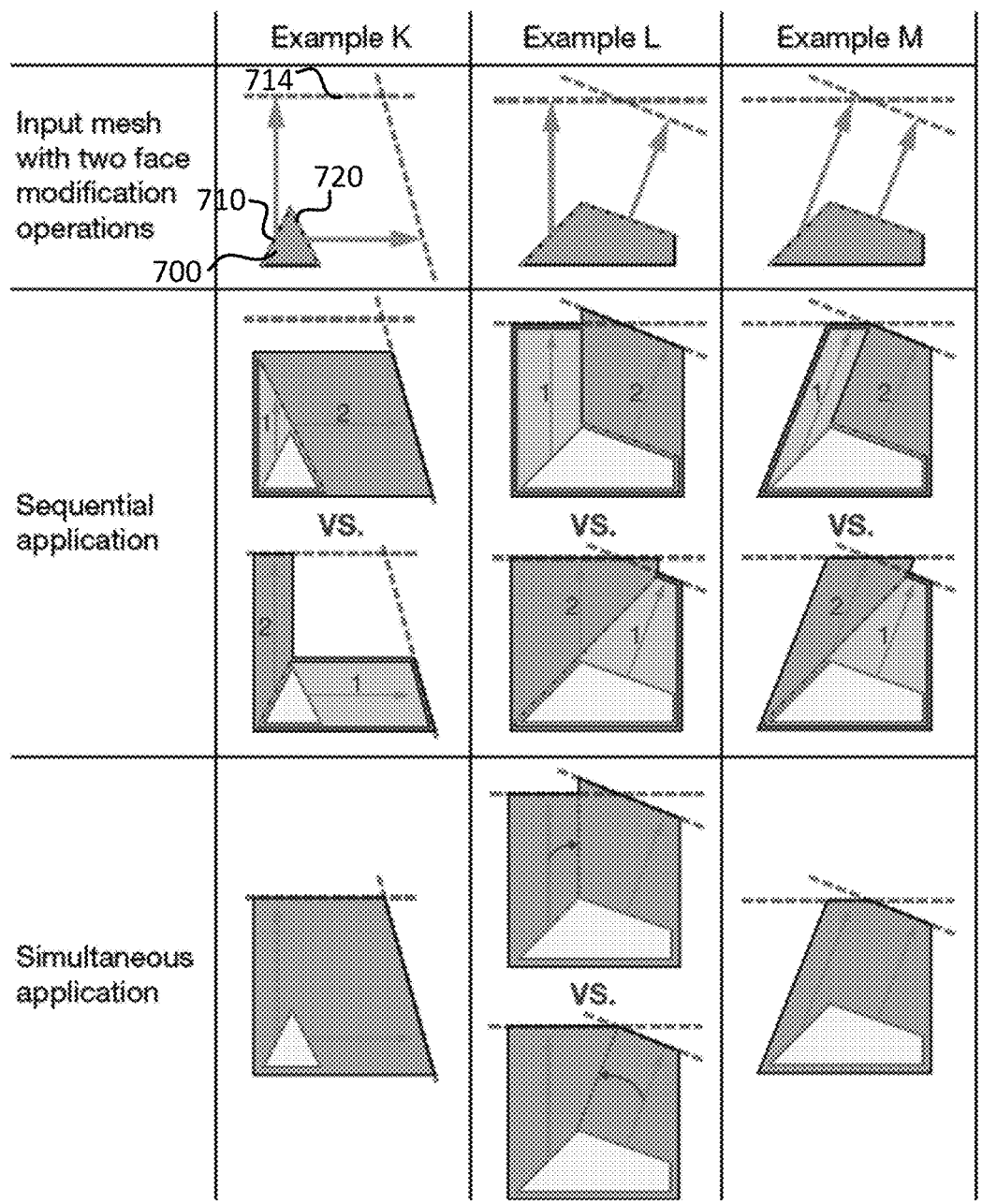
FIG. 7 illustrates several examples where two polygonal faces are modified simultaneously, according to certain embodiments of the invention.

FIG. 7 illustrates several examples where multiple polygonal faces are modified simultaneously, according to certain embodiments of the invention. The polygon meshes on the top row of Examples K-M are input meshes shown prior to implementing multiple simultaneous face modifications. Each polygon includes two vectors associated to two separate faces and corresponding target planes. The second row illustrates sequential applications of multiple face modifications. The third row illustrates simultaneous applications of multiple face modifications. Although only two modifications are shown in these examples, multiple modifications (e.g., 3 or more) can be performed simultaneously, as would be appreciated by one of ordinary skill in the art with the benefit of this disclosure.

The second row illustrates and exemplifies the notion that simultaneous modifications typically should not be serialized into two independent modifications unambiguously. Depending on the order of application, two different results can emerge. Example K illustrates how inconsistent face insertions can result in a face collapse. For example, modifying face 710 of polygonal mesh 700 prior to modifying face 720 results in a face collapse prior to reaching target plane 714. In contrast, modifying face 720 of polygonal mesh 700 prior to modifying face 710 does not result in a face collapse.

The third row depicts the simultaneous modification of multiple polygonal mesh faces. Example K shows a situation where no new face needs to be inserted, in contrast to Examples L and M. The latter has also identical directions. In the sequential case, the result depends on the application order and is therefore ambiguous. In the simultaneous case, the result is only ambiguous in Example L. Thus, simultaneous modifications with only one global direction are typically not ambiguous. Example L is ambiguous because a face insertion is performed with different $\vec{d}$ directions and it is undefined which $\vec{d}$ should construct the new face. As a consequence, a simultaneous modification can be limited to one global direction to eliminate ambiguity. Note that even with this limitation (i.e., one global direction on two faces) the sequential application is still ambiguous, however the resulting polygon is not. One example of this is shown in Example M.

To facilitate an unambiguous simultaneous modification, simple changes can be introduced into method 1 (Table 1) and method 3 (Table 3). First, an outer loop is added to each method, which iterates over each tuple $(f_m, p_m)$ in sets $F_m$ and $P_m$, which contain all modification faces and their corresponding target planes. Second, in Line 3 of method 1, we do not check the angle of $p_m$ against $f_{adj}$, but against its target plane in $P_m$ (if $f_{adj} \in F_m$). This ensures that the face insertion decision is consistent regardless of the order in $F_m$, i.e., only the angle between the two target planes determines if a face needs to be inserted on its edge. Third, method 3 is altered such that it returns a set of planes, i.e., for each $p_m$ in $P_m$ its next plane.

Finally, method 4 is replaced with method 5 (Table 5). In contrast to method 4, the main loop iterates until the modification face set $F_m$ is empty (decremented by Lines 6-8) and the subroutine calls operate on sets $F_m$ and $P_m$ instead of a single face with its target plane only.

TABLE 5

METHOD TO FACILITATE UNAMBIGUOUS
SIMULTANEOUS FACE MODIFICATIONS
Method 5 mainMultiple($F_m$,, $P_m$,, $\vec{d}$, θ)

| | |
|---|---|
| 1. | while $F_m \neq \emptyset$ do |
| 2. |    insertFaces($F_m, P_{pm}, \vec{d}$, θ) |
| 3. |    $P_{tmp}$ = getNextStep($F_m, P_m$) |
| 4. |    updateMesh($F_m, P_{tmp}$) |
| 5. |    cleanupMesh($f_m$) |
| 6. |    for each ($f_m, p_m, p_{tmp}$) in ($F_m, P_m, P_{tmp}$) do |
| 7. |      if $p_{pm} = p_m$ or $f_m, \notin F$ then |
| 8. |        remove $f_m$ in $F_m$ and pm in $P_m$ |

Figure 43:
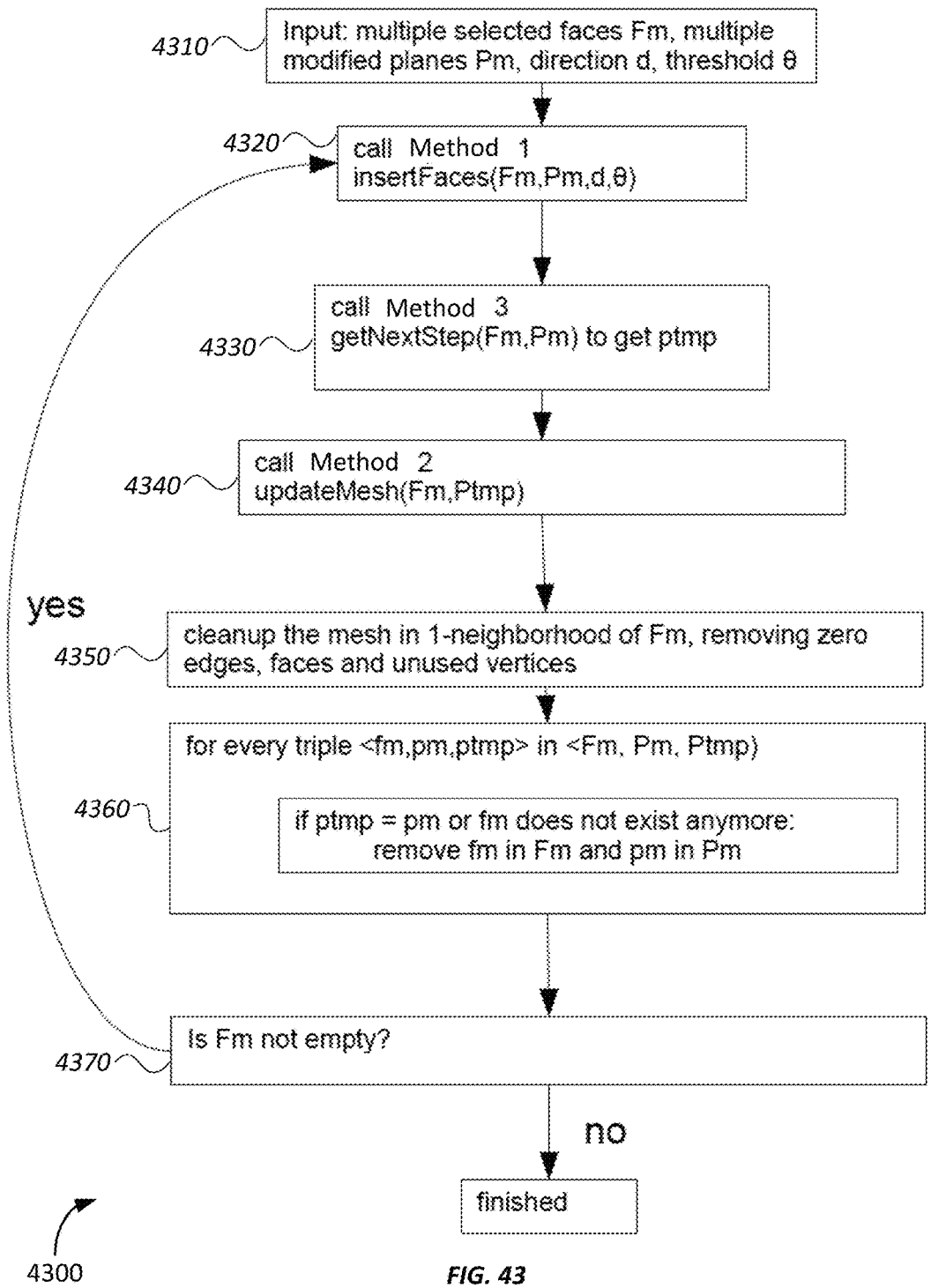
FIG. 43 illustrates a method for applying simultaneous mesh modifications, according to certain embodiments.

FIG. 43 illustrates a method 4300 for applying simultaneous mesh modifications, according to certain embodiments of the invention. Method 4300 can be performed by processing logic that may comprise hardware (circuitry, dedicated logic, etc.), software (such as is run on a general purpose computing system or a dedicated machine), firmware (embedded software), or any combination thereof. In one embodiment, method 4300 can be performed by processor 3630 of FIG. 36, and more generally by various embodiments of the systems shown in FIGS. 36-37.

Referring to FIG. 43, method 4300 begins with receiving an input corresponding to a polygonal mesh having a plurality of faces, receiving an input corresponding to a selection of a face ($f_m$) of the plurality of faces, where $f_m$ has a plurality of vertices, receiving an input corresponding to multiple modified target planes ($p_m$), direction d, and threshold angle θ (4310).

At 4320, inputs $f_m$, $p_m$, d, and threshold angle θ are applied to method 3900 (FIG. 39) to determine if a new face insertion is required. At 4330, $p_m$ and $f_m$ are applied as inputs to method 4000 (FIG. 40) to determine temporary target plane(s) $p_{tmp}$ (4230), similar to the embodiments shown in FIG. 6. At 4240, an updated mesh is determined using inputs $f_m$ and $p_{tmp}$ in method 4000 of FIG. 40. Areas of the polygonal mesh in the 1-neighborhood of $f_m$ are cleaned up, which includes removing zero edges, faces, and unused vertices (4250). For every triple $<f_m, p_m, p_{tmp}>$ in $<Fm, Pm, Ptmp>$, if $p_{tmp} = p_m$ or $f_m$ does not exist anymore, then $f_m$ is removed in Fm and $p_m$ is removed in Pm (4360). If Fm is not empty, then method 4300 returns to 4320 (i.e., new face insertion decision), otherwise method 4300 ends.

In some embodiments, method 4300 applies inputs $f_m$, $p_m$, d, and threshold angle θ, to method 1 (Table 1) to determine if a new face needs to be inserted, then calls method 3 (Table 3) to determine the next step in a step-by-step process using intermediate planes to avoid conflict events. The mesh is updated using method 2 (Table 2) with the new temporary target plane $p_{tmp}$ followed by a "clean up" process eliminating zero edges, faces, and unused vertices in the 1-neighborhood of $f_m$. Finally, if the temporary target plane is equal to target plane $p_m$, the method ends. Otherwise, method 4200 loops back to method 1 to determine if the next face requires a new face insertion and continues in an iterative fashion, as shown, e.g., in Example H of FIG. 6.

It should be appreciated that the specific steps illustrated in FIG. 43 provide a particular method for applying simultaneous mesh modifications, according to certain embodiments of the invention. Other sequences of steps may also be performed according in alternative embodiments. For example, alternative embodiments of the present invention may perform the steps outlined above in a different order. Moreover, the individual steps illustrated in FIG. 43 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 4300.

The PushPull++ Tool

The powerful, efficient, and novel mesh modification tools described herein can be implemented manually, by automation, or a hybrid thereof. In some implementations, the parameters $f_m$, $p_m$, $\vec{d}$, and θ can be mapped directly to user interface elements to make for a simple and intuitive modification interface.

FIG. 8 illustrates a direct plane modification tool 800 for controlling aspects of polygonal mesh modifications, according to certain embodiments of the invention. When a face $f_m$ is selected, a 3D interface tool can be provided. This tool can have three orthogonal arrows or other symbol representing direction. Moving the arrows in a particular direction defines the direction $\vec{d}$. The 3D tool can also include three circles, which allow a user to specify the orientation of the target plane $p_m$. Threshold angle θ can be specified with a settings slider or other suitable controlling apparatus. Setting an appropriate θ value can depend primarily on the modeling task. To model new geometry, a low threshold of about 30° is preferable, as this often leads to newly created faces. When deforming existing geometry, a higher threshold of about 60° may be better suited, because existing faces will more likely be used instead of creating new faces. Any threshold value can be used and those of skill in the art will understand the associated design benefits and tradeoffs.

While the 3D tool described above provides full control for polygonal mesh modifications, it can be difficult get a desired result because the many degrees of freedom and the face plane snapping behavior may not intuitively map to the output. For example, if no new faces need to be inserted, changes in $\vec{d}$ might have no impact. For example, a drag along the target plane does not impact the resulting model. Therefore, certain embodiments of the invention introduce methods to automatically find suitable parameters and propose useful directions.

Figure 37:
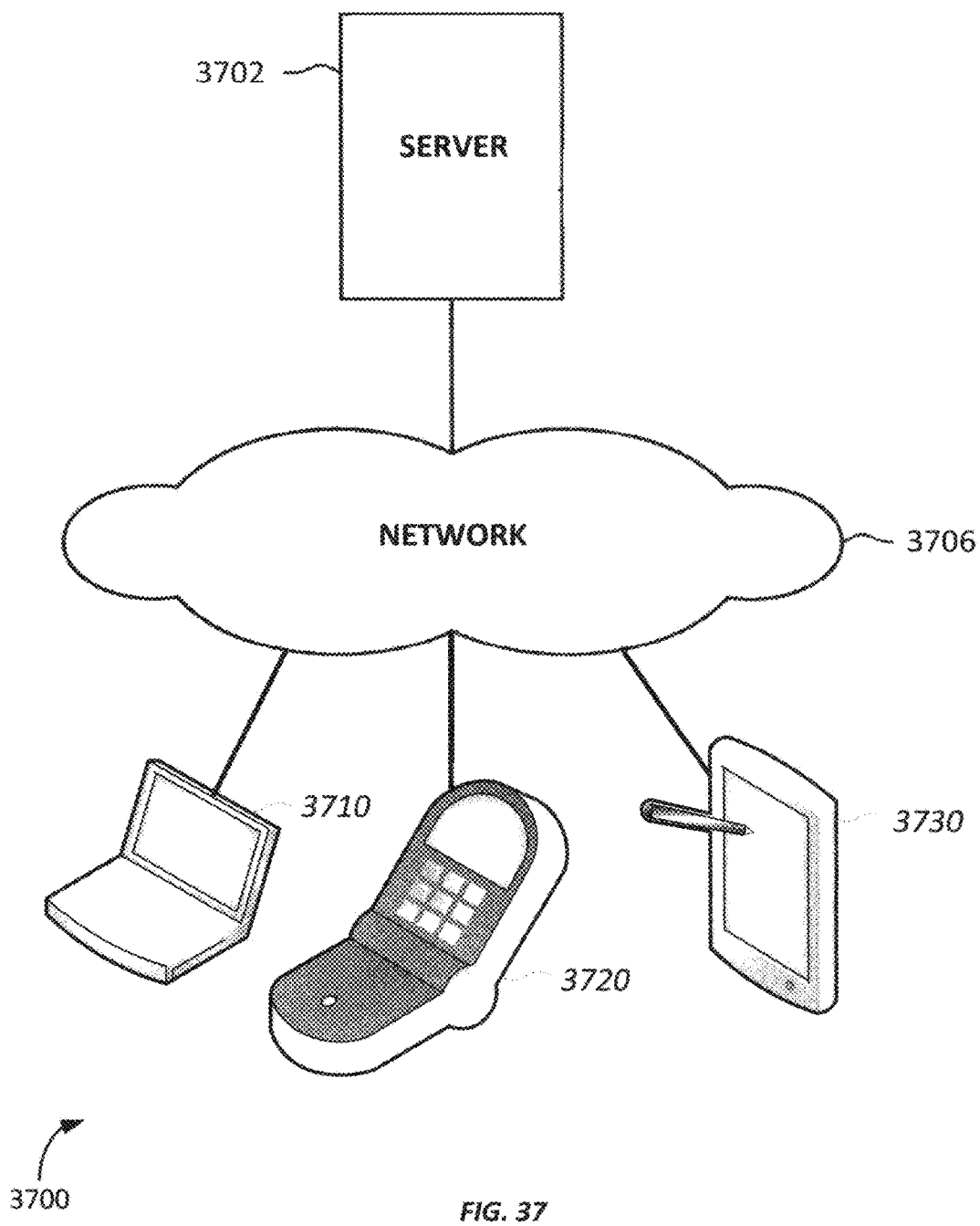
FIG. 37 depicts a simplified diagram of a distributed system for providing a system and method for performing PushPull operations in a mesh modeling application, according to an embodiment of the invention.
Figure 38:
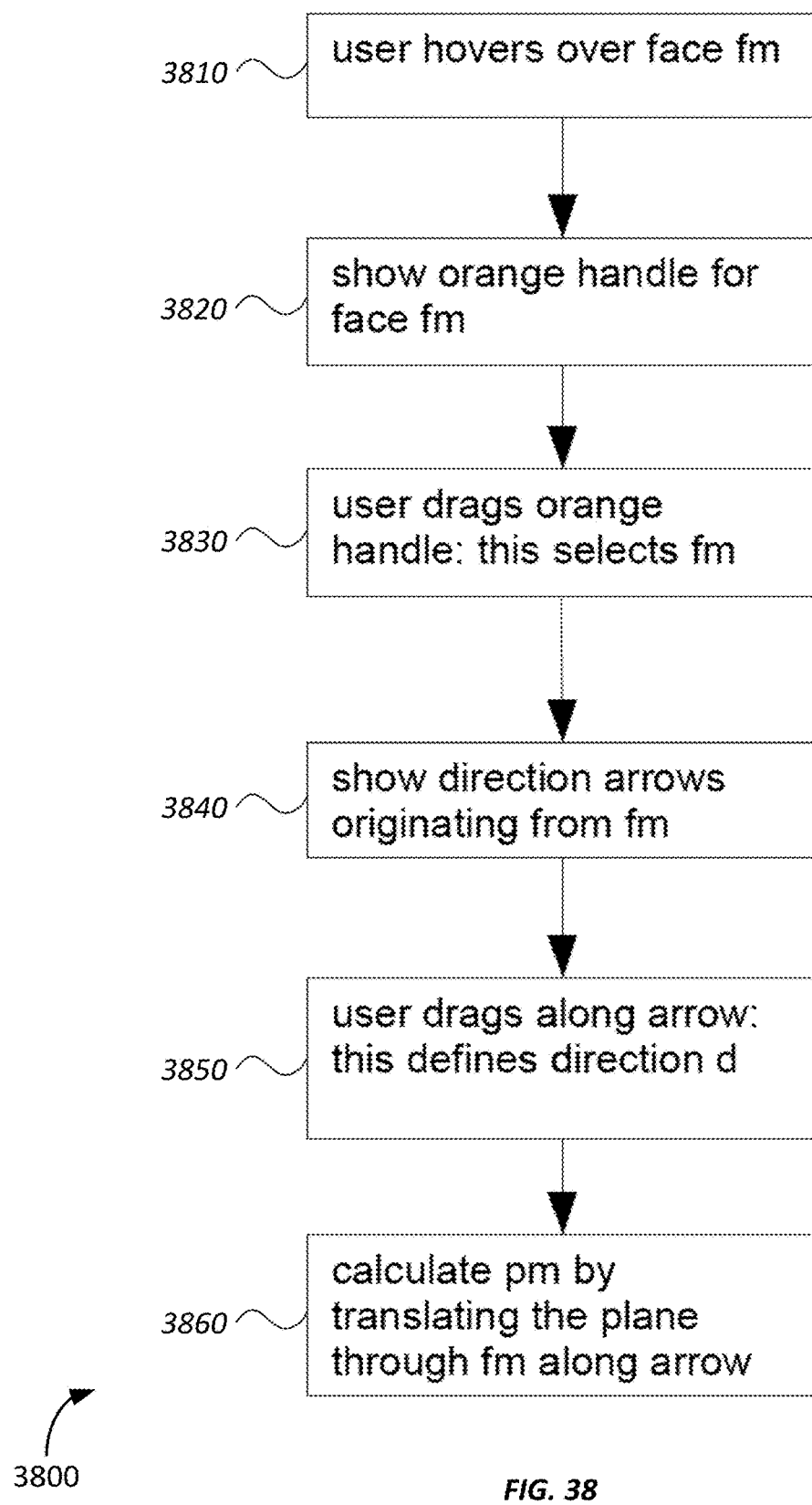
FIG. 38 is a simplified flow diagram illustrating a method for using a graphical user interface (GUI) to perform a mesh modification, according to certain embodiments of the invention.

FIG. 38 is a simplified flow diagram illustrating a method 3800 for using a graphical user interface (GUI) to perform a mesh modification, according to certain embodiments of the invention. Method 3800 can be performed by processing logic that may comprise hardware (circuitry, dedicated logic, etc.), software (such as is run on a general purpose computing system or a dedicated machine), firmware (embedded software), or any combination thereof. In one embodiment, method 3800 can be performed by using the direct modification tool 800 of FIG. 8 and implemented on, e.g., embodiments of the systems shown in FIGS. 36-37.

Referring to FIG. 38, using modification tool 800, in response to a user hovering (positioning) tool 800 over face $f_m$ (3810), a handle is generated on face $f_m$ for user control (3820). The handle can be represented in any suitable color, shape, size, or configuration. The user can select or "grab" the handle and drag it (3830), which selects the desired face $f_m$ for modification. At 3840, tool 800 displays direction arrows originating from $f_m$, similar to the arrows shown in FIGS. 8-10. At 3850, direction vector d is defined by the direction that a user drags the selected direction arrow. At 3860, $p_m$ is calculated by translating the plane through $f_m$ along the direction arrow (3860).

It should be appreciated that the specific steps illustrated in FIG. 38 provide a particular method of using a GUI to perform a mesh modification, according to certain embodiments of the present invention. Other sequences of steps may also be performed according in alternative embodiments. For example, alternative embodiments of the present invention may perform the steps outlined above in a different order. Moreover, the individual steps illustrated in FIG. 38 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 3800.

Finding Useful Parameters

In some embodiments, planes can be defined using the three-axis tool discussed above. Alternatively, planes can be calculated from component drag operations. For instance, when a push- or pull-operation is performed on a face, the target plane can be simply offset by the drag distance. To rotate planes, the user can drag edges or vertices. When an edge is dragged, the adjacent faces can be tilted.

Directions

Depending on the modeling task and component type, different directions can be useful. Possible directions for faces include, in one particular order of priority: the face normal $\hat{n}$, the vector $\vec{n}_{proj}$ which is $\hat{n}$ projected to the horizontal plane, the world coordinate axis $\vec{a}_y$, and the set $D_{adj}$ of directions along adjacent faces, which includes averages between them. When moving an edge, $\vec{a}_y$, $\vec{a}_x$, $\vec{a}_z$ and its set of adjacent directions $D_{adj}$ can be used. For vertices, $\vec{a}_y$, $\vec{a}_x$, $z_x$ as well as $D_{adj}$ containing the directions of the adjacent edges can be used. For the angle threshold θ, 60° can be used for all directions in $D_{adj}$, because they are typically used to adjust meshes, and 2° for the other directions. Those of ordinary skill in the art would appreciate the appropriate settings, variations, orders of priority for directions, etc.

FIG. 9 illustrates an example of a filtered 950 and unfiltered 900 choice for a direction vector in a mesh modification, according to certain embodiments of the invention. The normal to the selected face is shown in orange, adjacent directions $D_{adj}$ are blue, global axes and the horizontally projected normal are green. The figure on the left depicts an example that proposes multiple directions for a face, which can be daunting for the uninitiated and can create a cluttered result. Moreover, some directions may result in creating the same mesh. Hence, to present the user with more useful and/or intuitive directions, the possibilities can be intelligently filtered.

In some embodiments, the first step includes analyzing the potential outcome of method 1 (Table 1) for each possible direction vector. In case multiple directions create the same output, i.e., no new faces are inserted or zero faces with identical normals are generated, the direction with the highest priority is used. Second, as there can be many directions in $D_{adj}$, k-means clustering with a dot product distance function can be used to filter them.

Finally, starting with the highest priority, the directions can be added as arrows displayed to the user, provided that no direction is already in this set with an angle below a predetermined threshold (e.g., 10°), or the maximum number of directions is reached (e.g., 5). Other thresholds or maximum directions can be used. When there are similar directions with different thresholds during filtering, both directions are kept and displayed next to each other. A reduced set of possible directions is shown in the figure on the right in FIG. 9.

Plane Equations

When an edge or a vertex is dragged, multiple faces can be modified simultaneously. To determine the target plane $p_m$, for every adjacent face $f_{adj}$, the vertex of in $f_{adj}$ furthest away from the edge can be constrained to not move. Doing this allows the calculation of new plane equations. If $\vec{e}$ is the edge direction, $v_e$ a vertex of e, then the new plane is given by $p_n$=normalize (normalize $((v_e+\vec{d})-v_f))\times \vec{e}$) with distance d=$p_n \cdot v_f$. Using a hotkey, for example, a user can also restrict the modification to only one of the adjacent faces, allowing quick modeling of dormer windows. For vertex moves, all adjacent faces can be tilted in a similar fashion to the edge move tool. For an adjacent face f, given the vertex position v, the new plane can be calculated with $p_n$=normalize ((v+$\vec{d}$)-$v_f$))×=normalize (v-$v_f$)×f·n̂). Alternatively, instead of using the vertex furthest away, the vertex with the highest height coordinate can be used as $v_f$.

PushPull++ User Interface

Exemplary embodiments of a Polygon Mesh Modeling (PushPull++) user interface are based on the useful parameters found in the previous section, combined with polyline drawing and polygon splitting, enabling comprehensive mesh modeling with a single tool.

FIG. 10 illustrates aspects of a polygon mesh modeling interface, according to certain embodiments of the invention. While hovering over a mesh 1000, a small sphere handle can be shown to highlight the mesh component located under the cursor for the user's convenience. In some implementations, when the user drags the sphere, the component is selected, which defines $f_m$. Useful directions d are calculated as previously discussed and shown as blue arrows. While dragging, the arrow nearest to the mouse is selected and highlighted. In some cases, switching between arrows is disabled when the move amount is very small or in the negative direction for improved control.

In some implementations, polyline drawing can be used to split and create polygons, as shown in the right FIG. 1050 of FIG. 10. For example, clicking on the mesh outside of a sphere handle inserts a vertex and starts a polyline drawing operation 1060. In an exemplary embodiment, every click can add a new vertex to the polyline, snapping guides can be shown to increase precision, and existing faces can be automatically split when intersected by the polyline using a face loop finding algorithm. The operation can stop either after a split or when the polyline is closed to form a polygon. For convenience, a rectangle drawing mode can also be made available with a hotkey. To allow starting a polyline under a sphere handle, handles can be configured to disappear when the input device (e.g., computer mouse, touch sensor, etc.) remains stationary for longer than a predetermined period of time (e.g., three seconds).

Performance Characteristics and Advantages

Figure 11:
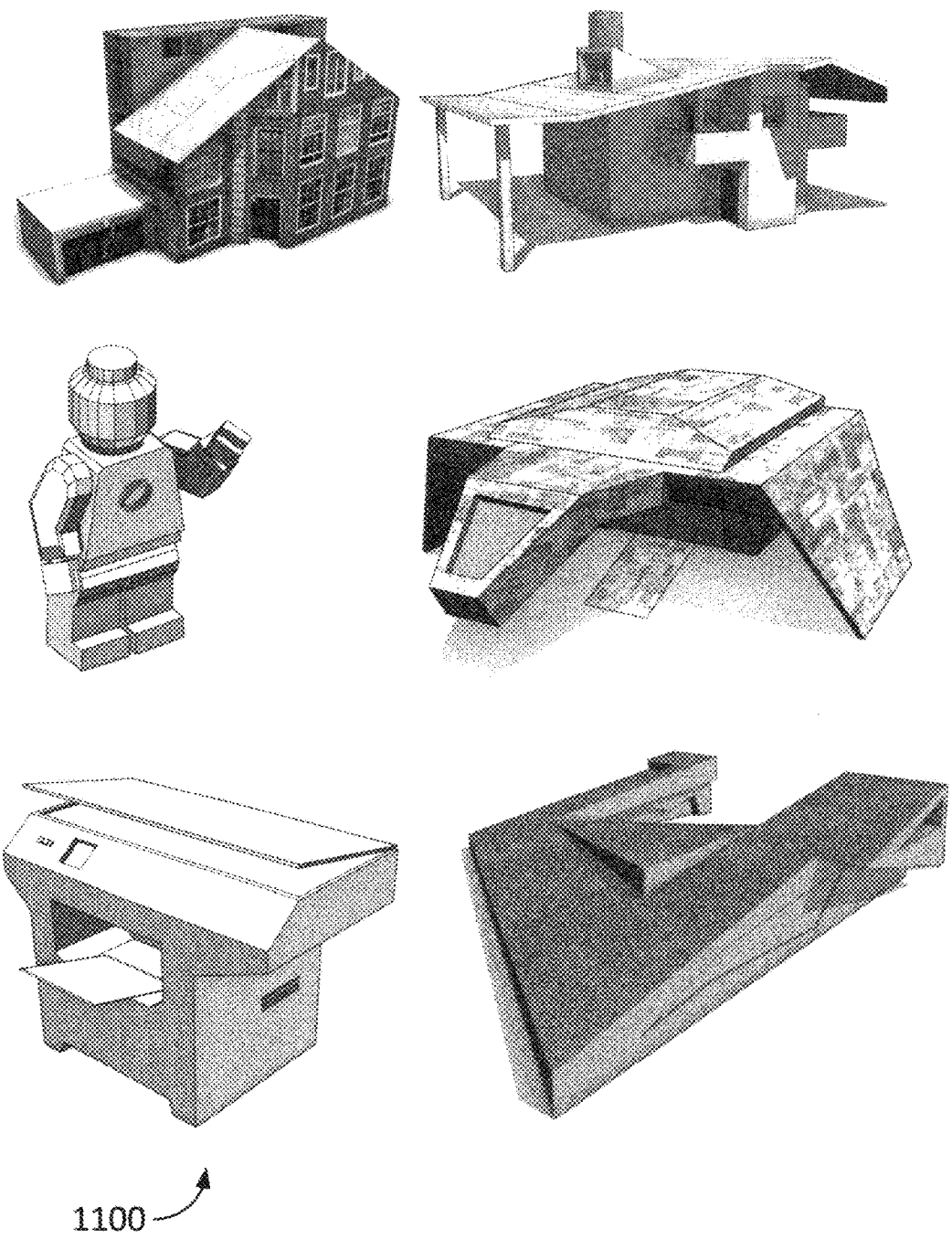
FIG. 11 depicts several examples of polygons that were created and manipulated using embodiments of the PushPull aspects described herein.

In some embodiments, the methods and tools (e.g., PushPull++) described herein can be implemented in Java and combined with standard 3D features like camera control, basic transformations, and texture assignments. Any modern programming language (e.g. C++, C#, VisualBasic) or platform (PC, Smartphone, Tablet) could be used to implement the various methods and embodiments described herein, as would be appreciated by one of ordinary skill in the art. FIG. 11 depicts several examples of polygons 1100 that were created and manipulated using embodiments of the PushPull++ aspects described herein. These results were created in 5 to 15 minutes using the PushPull++ tool combined with texturing and standard transformations.

Figure 12A:
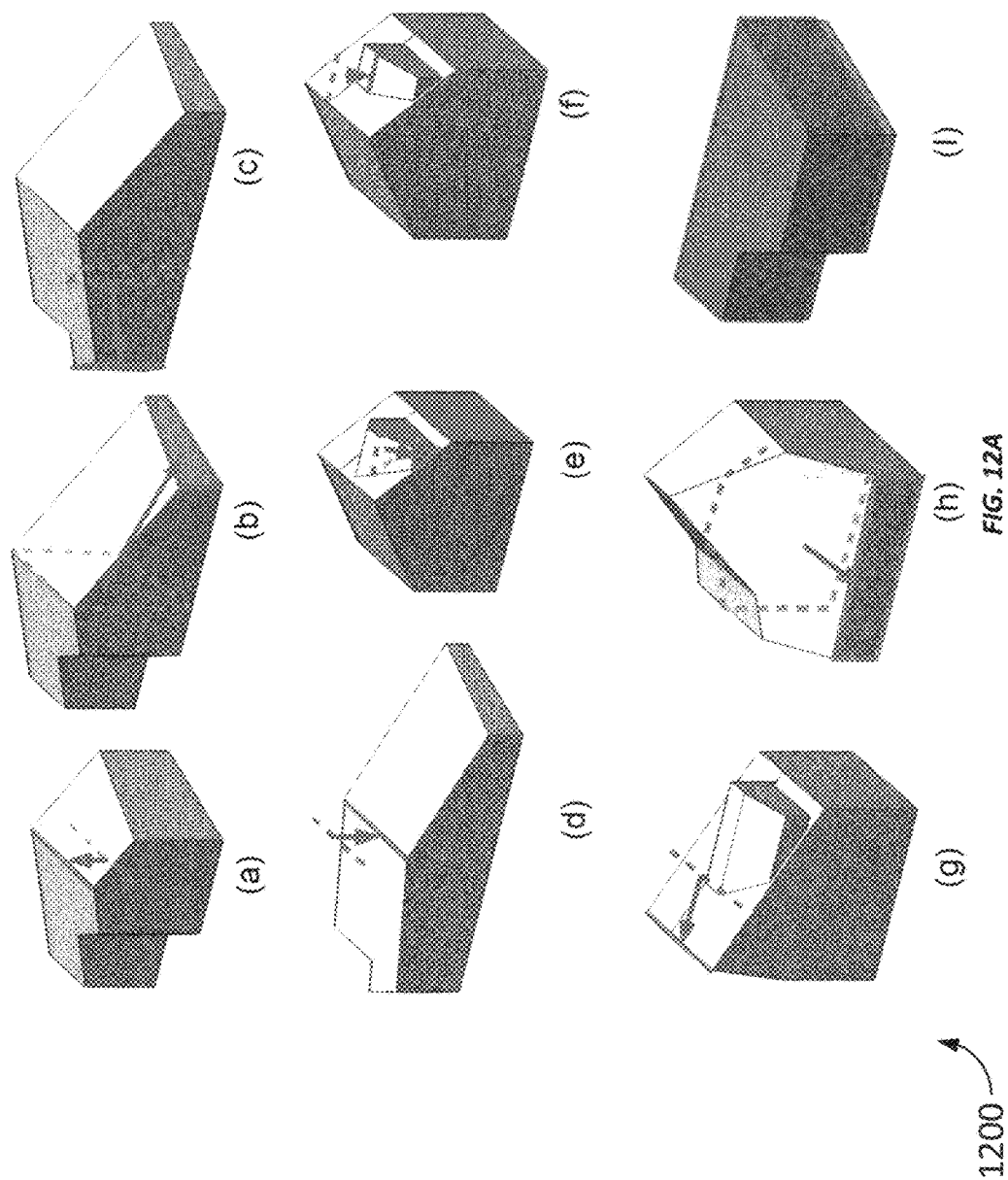
FIG. 12A illustrates editing examples used for evaluating embodiments of the invention against competing mesh modeling suites.
Figure 12B:
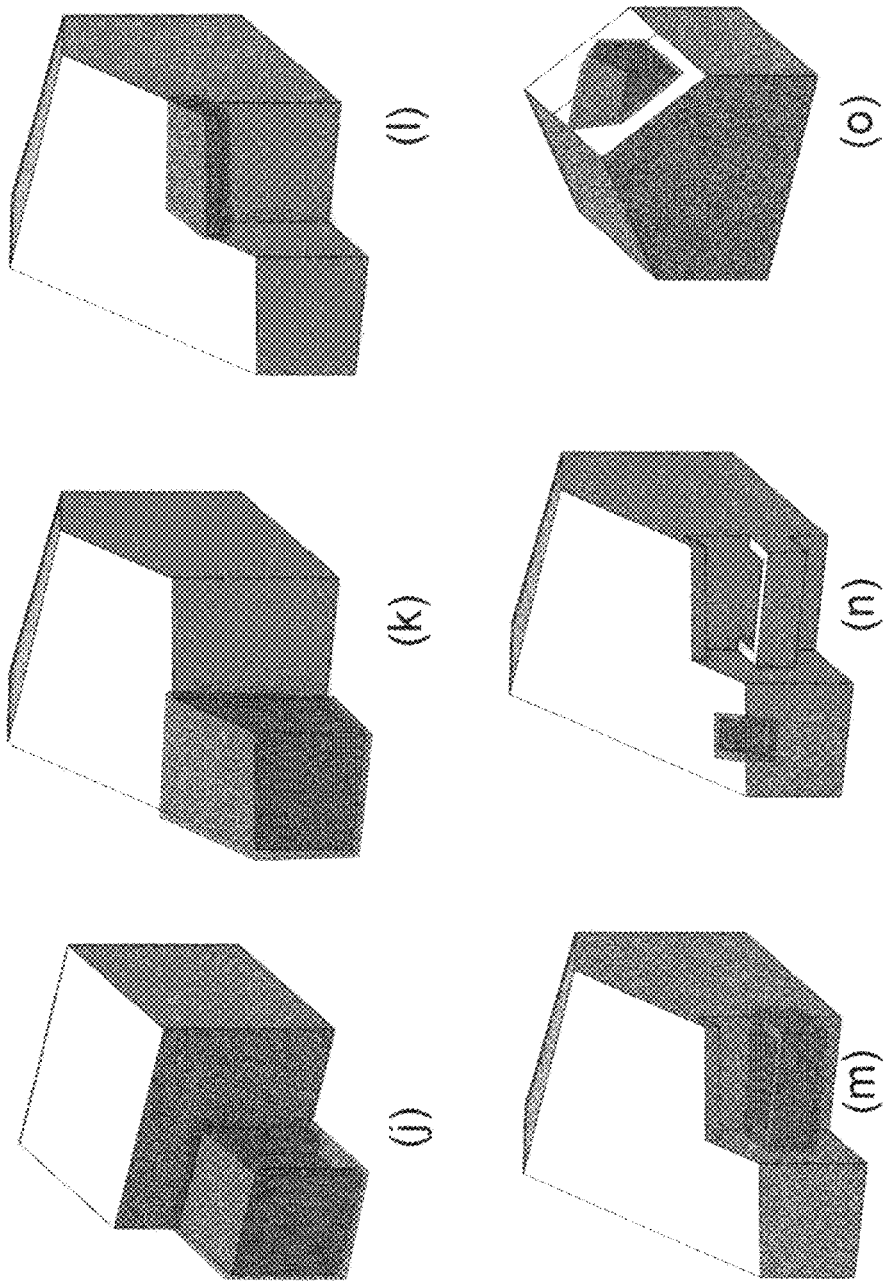
FIG. 12B illustrates editing examples used for evaluating embodiments of the invention against competing mesh modeling suites.

Embodiments of the mesh modeling PushPull++ methods described herein were compared against other contemporary mesh modeling tools to illustrate some of the many advantages and improvements over the competition, which includes AutoCAD [Autodesk 2014a], SketchUp [Trimble 2013], and Maya [Autodesk 2014b]. FIGS. 12A-B illustrate editing examples 1200 used for evaluating embodiments of the invention described herein against the competing mesh modeling suites. The orange arrow indicates moved components, while the blue areas indicate added details. Comparisons and evaluations were made for every modeling step shown in FIG. 12. Two metrics were employed: The first metric includes the minimum amount of mouse and keyboard interactions (clicks or drags) required by expert users for those modeling steps. In each case, camera controls were ignored. This metric compares the efficiency of each entire software package. The second metric involved an attempt to eliminate the influence of the user interface as much as possible and just measure the effect of the modeling operations. Therefore, only interactions directly causing a change in the geometry or drawing planes were counted. Tool changes, menu clicks, selections and camera controls were ignored. To determine those interaction counts, one expert user per software package performed the modeling steps shown in FIG. 12. The user had unrestricted time to find a modeling approach with the minimum amount of interactions, and was allowed to use all tools provided by the software. The best effort was recorded and all interactions were counted. The results are shown in Table 6, which illustrates the average minimum number total clicks (left columns) and geometry changing interactions (right columns) required by expert users to complete the steps in FIG. 12 across each mesh modeling suite relative to an embodiment of the present invention.

TABLE 6

PERFORMANCE COMPARISON BETWEEN MESH MODELING SUITES

| Op. | PushPull++ | | AutoCAD | | SketchUp | | Maya | |
|-----|------------|---|---------|---|----------|---|------|---|
| a | 1 | 1 | 5 | 1 | 17 | 8 | 17 | 4 |
| b | 1 | 1 | 5 | 1 | 14 | 6 | 36 | 5 |
| c | 1 | 1 | 5 | 1 | 15 | 7 | 14 | 5 |
| d | 1 | 1 | 5 | 1 | 24 | 10 | 26 | 7 |
| e | 1 | 1 | 7 | 1 | 12 | 5 | 15 | 6 |
| f | 1 | 1 | 5 | 1 | 10 | 3 | 10 | 3 |
| g | 1 | 1 | 4 | 1 | 11 | 3 | 8 | 3 |
| h | 1 | 1 | 14 | 2 | 24 | 13 | 26 | 8 |
| i | 3 | 2 | 20 | 3 | 5 | 2 | 6 | 2 |
| j | 7 | 4 | 16 | 4 | 10 | 4 | 48 | 14 |
| k | 4 | 1 | 17 | 3 | 27 | 7 | 26 | 8 |
| l | 3 | 1 | 22 | 6 | 33 | 10 | 9 | 4 |
| m | 9 | 4 | 43 | 9 | 31 | 11 | 54 | 18 |
| n | 9 | 4 | 28 | 7 | 24 | 7 | 66 | 21 |
| o | 8 | 5 | 33 | 7 | 28 | 8 | 21 | 7 |
| rel. | 1 | 1 | 5.5 | 1.7 | 10.5 | 5.3 | 12.4 | 4.6 |

One important observation from Table 6 is that embodiments of the present invention (e.g., PushPull++) allows all adjustment operations (a-h) steps with just one mouse drag, enabling direct interactive adjustments. AutoCAD requires additional clicks for selection and setup, as well as one geometry changing interaction. This is because these operations essentially degenerate to a constrained move, always following existing faces. The other tools require much higher click counts, because they do not have a mechanism to maintain planarity. Essentially the user has to fix non-planar faces manually with low level transform tools and snapping.

In examples (i) and (j), low counts for PushPull++ are shown. These polygons require extrusions and splitting. Such splits are more involved in AutoCAD due to the solid modeling nature and they always require an imprint step. Maya only has a line split, and thus requires many more steps in example 0. In the complex modeling steps (k-o), PushPull++ shows significant improvements in efficiency over the other modeling tools due, in part, to the adaptive face insertion, as it allows adding details to meshes with slanted surfaces efficiently. Such steps have to be emulated in AutoCAD with boolean operations and global plane splits, in Sketchup with manual inference-bases constructions, and in Maya with manual vertex movements. The last row in the Table 6 shows the averaged metrics relative to PushPull++. AutoCAD falls significantly behind for total clicks (5.5), and SketchUp and Maya perform five to ten times worse.

Several non-limiting embodiments of the invention have been introduced using aspects of the PushPull++ tool described herein to demonstrate rapid modeling of plane-dominant objects. These embodiments have been empirically shown to significantly outperform commercial state-of-the-art tools, especially when objects contain slanted surfaces. Embodiments of PushPull++ employ new local and efficient methods with novel components that include at least (1) adaptive face insertions based on threshold values and directions, (2) updating adjacent faces to keep planarity and possibly change vertex valences, and (3) edge collapses are handled with an efficient stepwise method without requiring boolean operations, among other novel aspects.

Polygonal Mesh Editing Utilizing Embodiments of the Invention

The PushPull++ tools described herein overcome many of the challenges in mesh editing faced by previous tools. The following examples are designed to illustrate how these common challenges are overcome. In each case, new faces are inserted adaptively and are shown in blue, adjacent faces are adjusted intuitively and are shown in green, and edge collapses will collapse at locations marked by dark blue spheres. An interface tool (e.g., plane modification tool 800) can be used to select one or more planes to manipulate and move in one or more desired directions.

Examples of Adaptive Face Insertions

Figure 13:
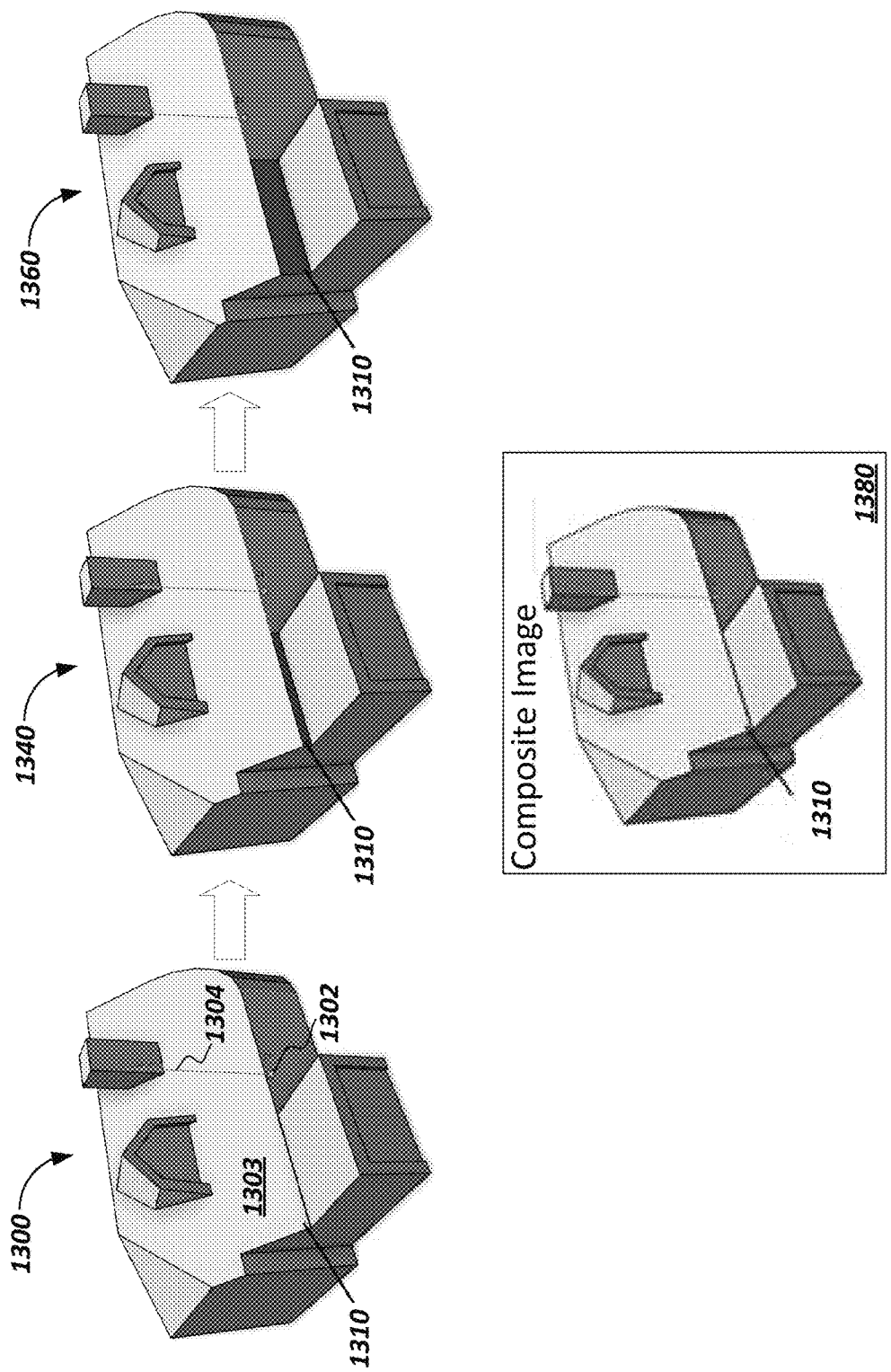
FIG. 13 illustrates an example of a face insertion in a polygonal mesh, according to certain embodiments of the invention.

FIG. 13 illustrates an example of a face insertion 1310 in a polygonal mesh 1300, according to certain embodiments of the invention. The sequence of events (e.g., adjustments, insertions, etc.) shown across meshes 1300-1360 illustrate the insertion of a new face 1210 in an incremental representation. It should be noted that insertions or other implementations are not typically performed in a step-wise manner and are usually smooth and precise with a high degree of resolution. Polygonal mesh 1380 illustrates the new face insertion as a composite image to provide another way to visualize this function. In particular, selecting point 1302 moves plane 1303 it in the direction of arrow 1304 causing the new face insertion 1510.

Figure 14:
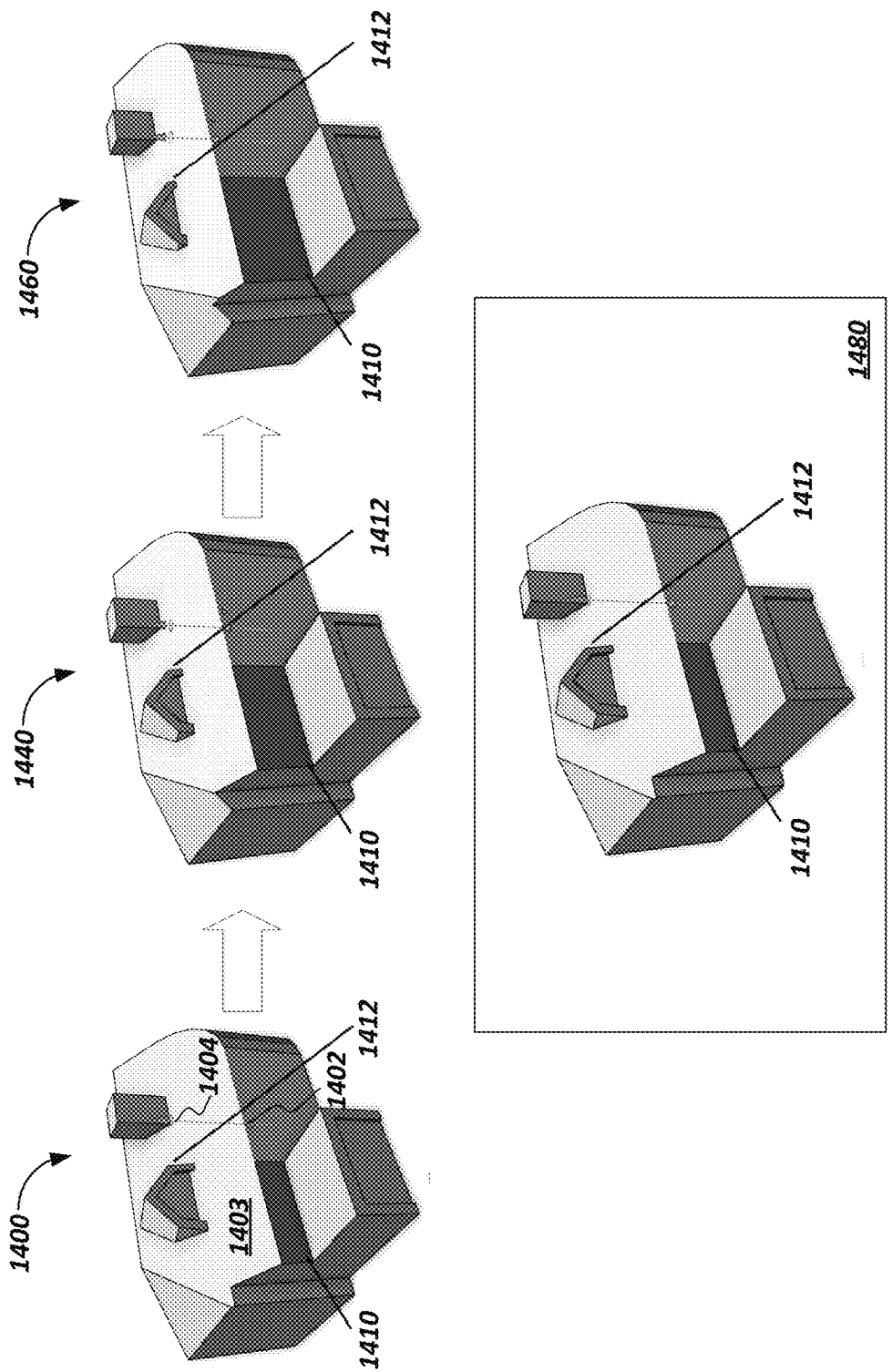
FIG. 14 illustrates an example of various intuitive adjacent face adjustments that occur as the result of a face insertion, according to certain embodiments of the invention.

As new faces are inserted, adjacent faces are adjusted intuitively. FIG. 14 illustrates an example of various intuitive adjacent face adjustments 1412 that occur as the result of a face insertion 1410, according to certain embodiments of the invention. The sequence of events shown across meshes 1400-1460 illustrate how intuitive adjustments 1412 are made to faces adjacent to the modified plane 1403 in response to a face insertion 1410. Polygonal mesh 1480 illustrates the new face insertion in a composite image. In particular, selecting point 1402 moves plane 1403 it in the direction of arrow 1404 causing the adjustments 1512 to the adjacent planes of plane 1403.

Figure 15:
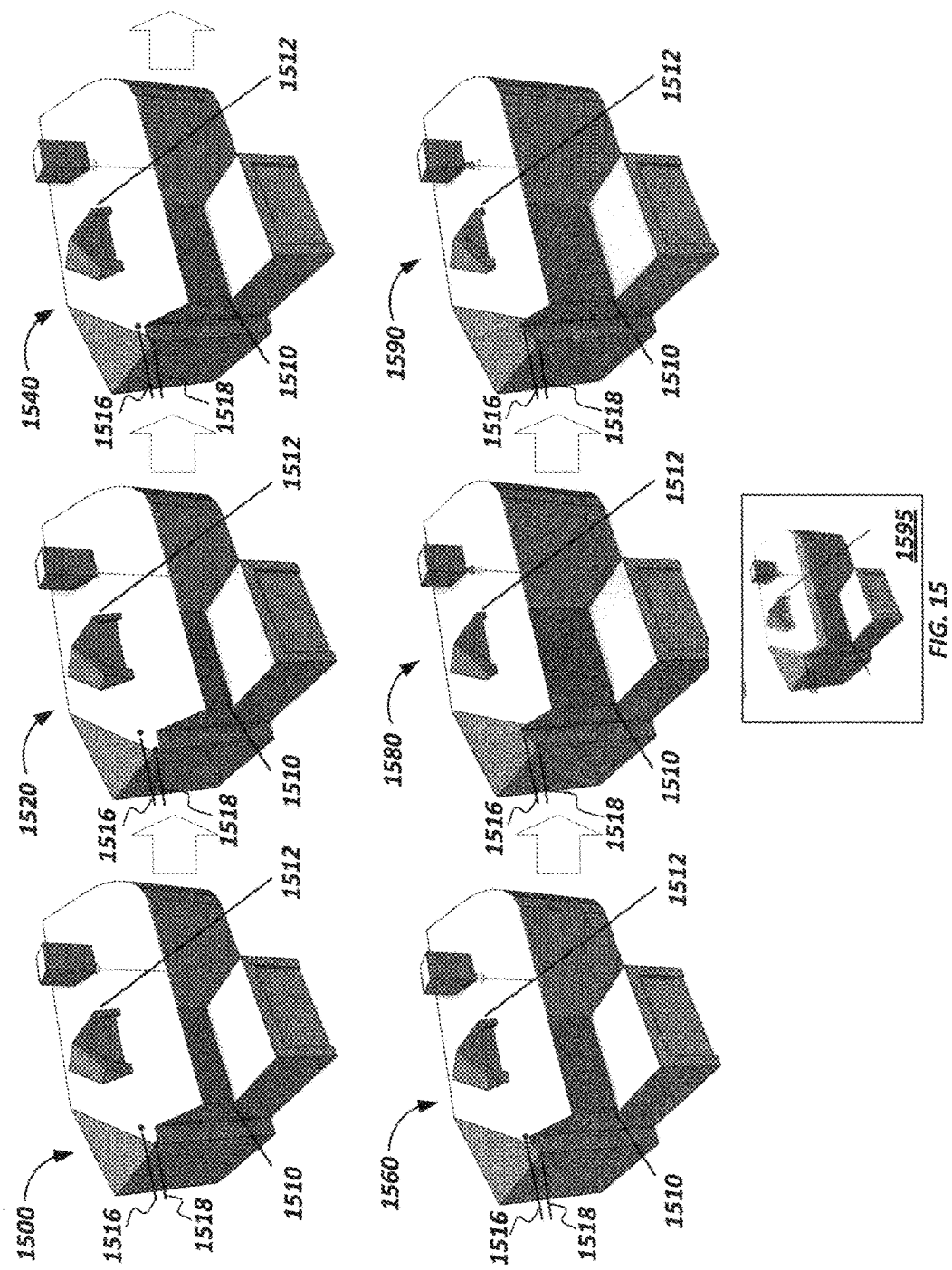
FIG. 15 illustrates an example of two edge collapses that occur as the result of a face insertion, according to certain embodiments of the invention.

In some cases, as new faces are inserted, some edges may collapse. FIG. 15 illustrates an example of two edge collapses that occur as the result of a face insertion 1510, according to certain embodiments of the invention. The sequence of events shown across meshes 1500-1590 illustrate edge collapses at nodes 1516 and 1518. Polygonal mesh 1595 illustrates the edge collapses in a composite image. In particular, point 1502 selects the edge of plane 1503 and moves it in the direction of arrow 1504 causing the edge collapses at points 1516 and 1518.

Figure 16:
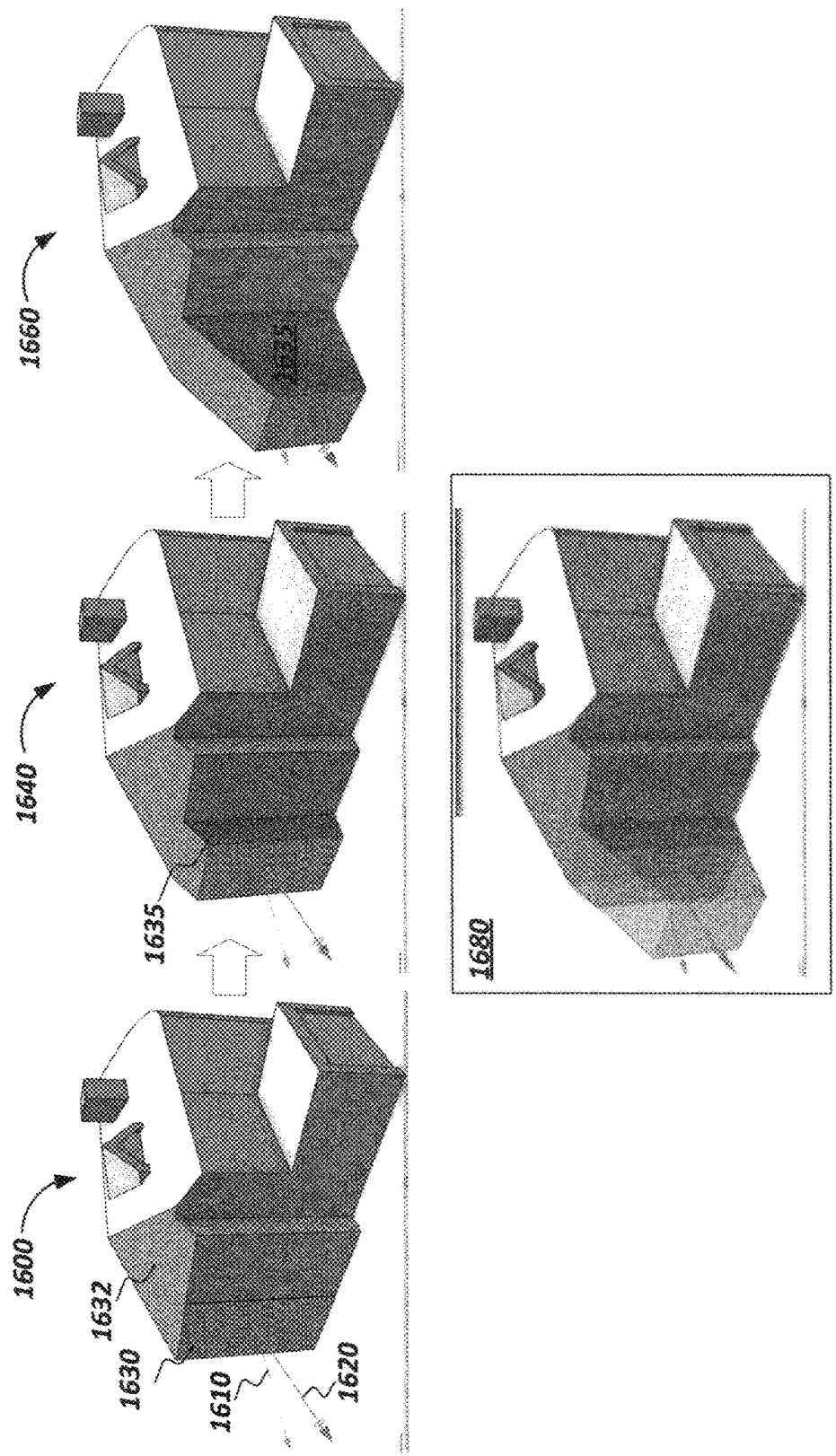
FIG. 16 illustrates aspects mesh editing using PushPull operations to add new faces, adjust adjacent faces, and collapse edges where appropriate, according to certain embodiments of the invention.
Figure 17:
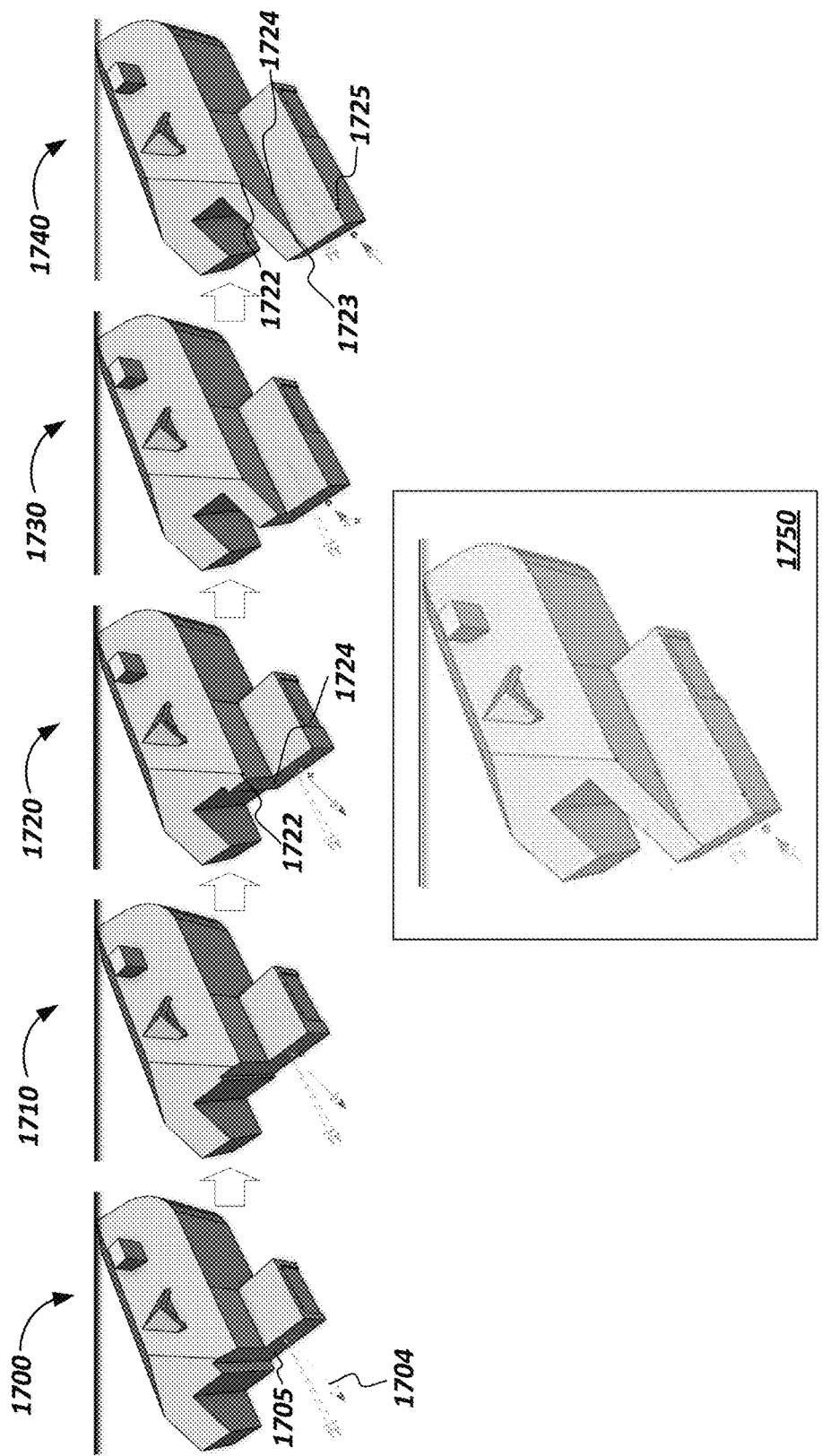
FIG. 17 illustrates aspects mesh editing using PushPull operations to add new faces, adjust adjacent faces, and collapse edges where appropriate, according to certain embodiments of the invention.

FIGS. 16 and 17 illustrate two additional example edits using aspects of PushPull++ to add new faces, adjust adjacent faces, and collapse edges where appropriate, according to certain embodiments of the invention. FIG. 16 depicts a sequence of events across meshes 1600-1660 to illustrate the extension of plane 1630 in the direction of arrow 1620, which causes a new face insertion 1635 (blue) and adjustments to adjacent plane 1632 (green). Polygonal mesh 1680 illustrates the face insertion and adjacent face adjustments in a composite image. Arrow 1610 depicts the normal of plane 1630. FIG. 17 depicts a sequence of events across meshes 1700-1740 to illustrate the extension (i.e., extrusion) of plane 1705 in the direction of arrow 1704, which does not cause a new face insertion, as the adjacent planes are able to accommodate the modification because, for example, the angle threshold may be a higher than the required angle of modification. Edge collapses 1722-1725 occur as the result of the face modification. Polygonal mesh 1750 illustrates the adjacent face adjustments and edge collapses in a composite image.

In some embodiments, adaptive face insertions can be configured by a threshold to determine if adjacent faces are extended or inserted in polygonal mesh modifications.

Figure 18:
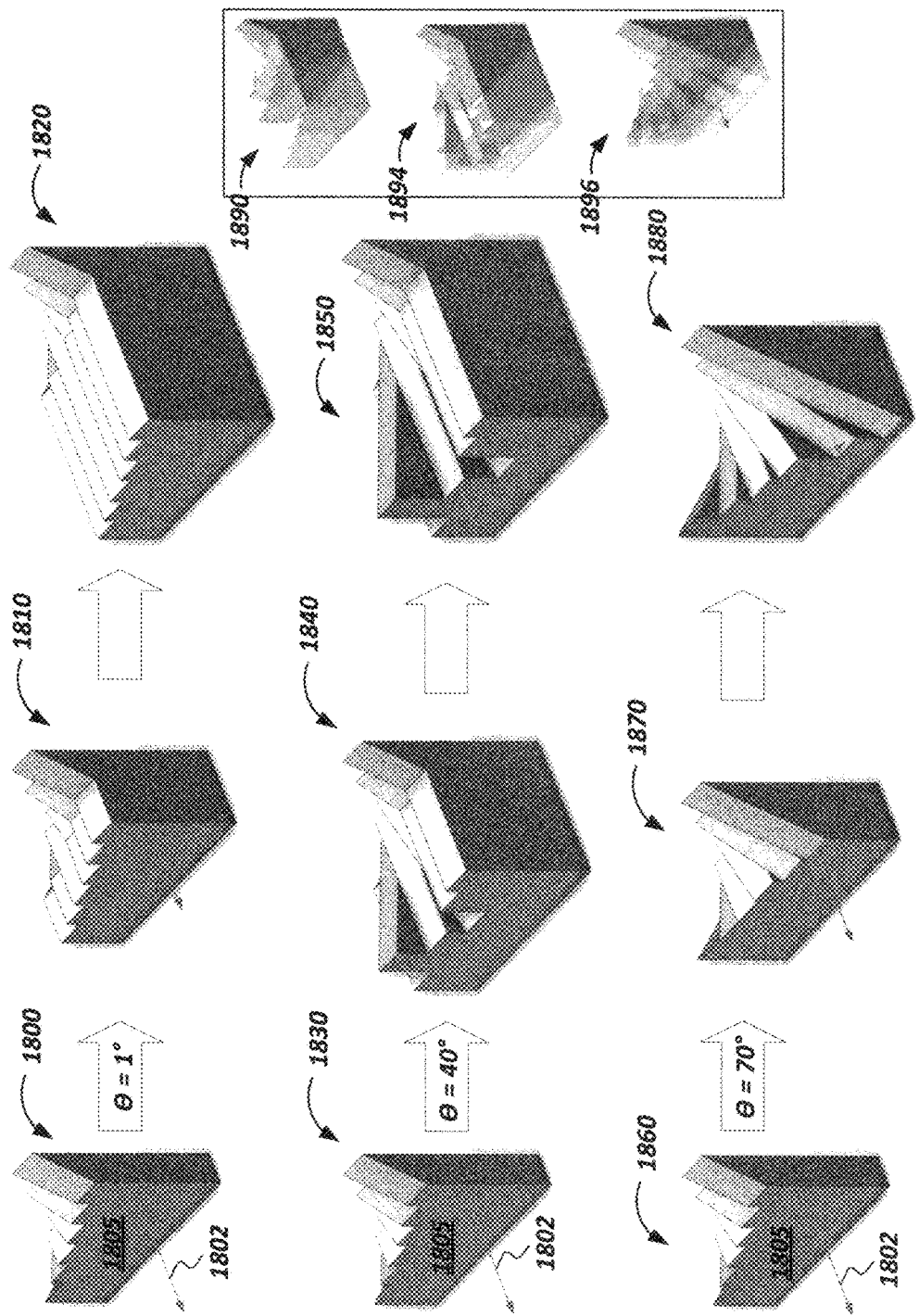
FIG. 18 illustrates aspects of various adaptive face insertions and varying angle thresholds, according to certain embodiments of the invention.
Figure 19:
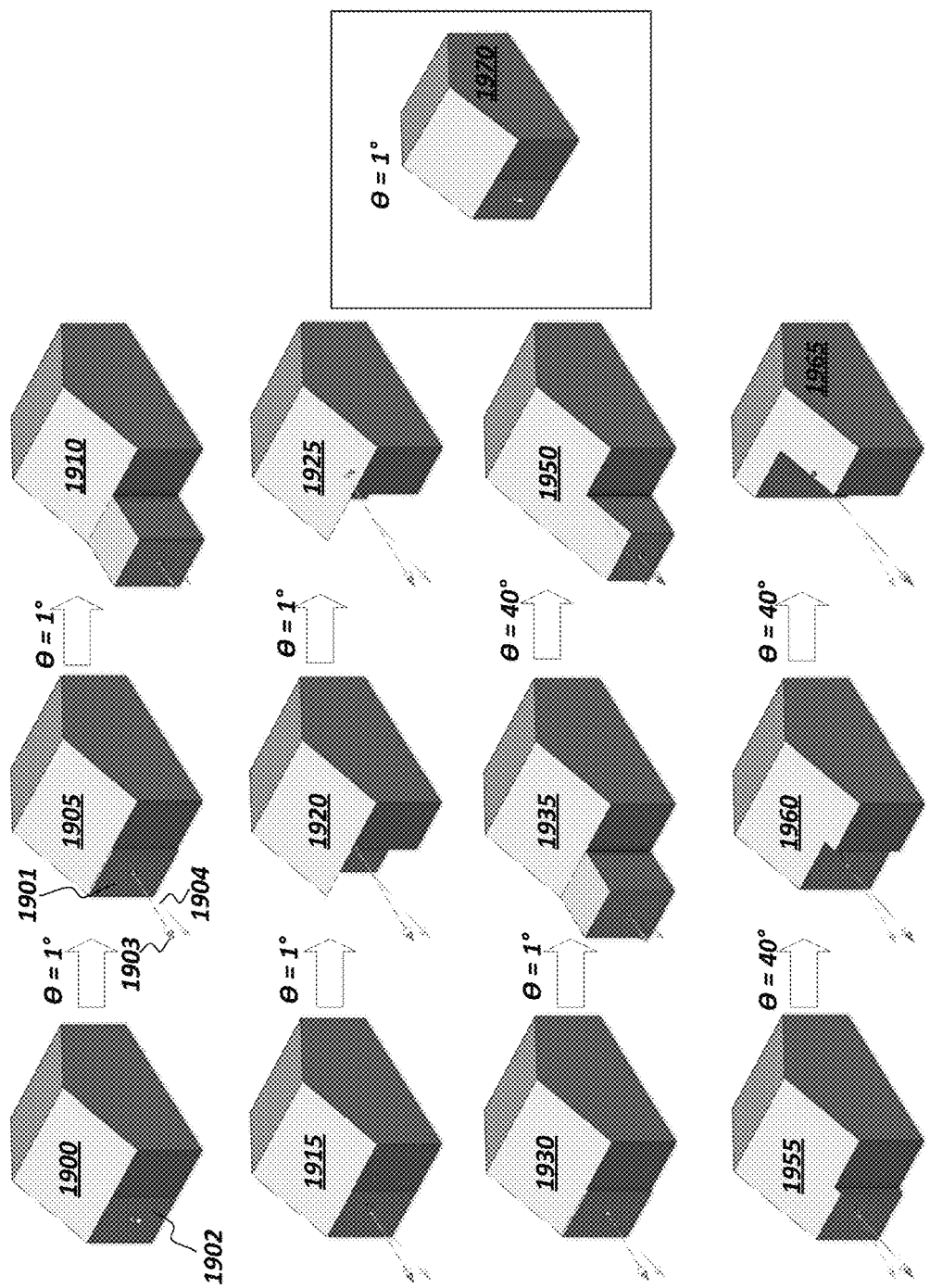
FIG. 19 illustrates aspects of various adaptive face insertions and varying angle thresholds, according to certain embodiments of the invention.

FIGS. 18 and 19 illustrate aspects of various adaptive face insertions and varying angle thresholds, according to certain embodiments of the invention. In FIG. 18, the sequence of events across meshes 1800-1820 illustrate the extension of a plane 1805 in the direction of arrow 1802 with an angle threshold at 1°. Planes adjacent to plane 1805 has an angle greater 1°, which causes new planes to be inserted in every case. Meshes 1830-1850 and 1860-1880 show the same modification to plane 1805 at the threshold angle of 40° and 70°, respectively. Polygonal meshes 1890, 1894, 1896 illustrate these mesh modifications in composite images.

In FIG. 19, the sequence of events across meshes 1900-1935 illustrate the extension of a plane 1901 in the direction of arrow 1904 with an angle threshold at 1°. Planes adjacent to plane 1901 have an angle greater 1°, which causes a new plane to be inserted, as shown. The normal to plane 1901 is shown by green arrow 1903. Meshes 1950-1965 show a similar modification to plane 1902 at the threshold angle of 40°. Polygonal mesh 1970 illustrates the mesh modifications 1900-1935 in a composite image 1970.

Figure 20:
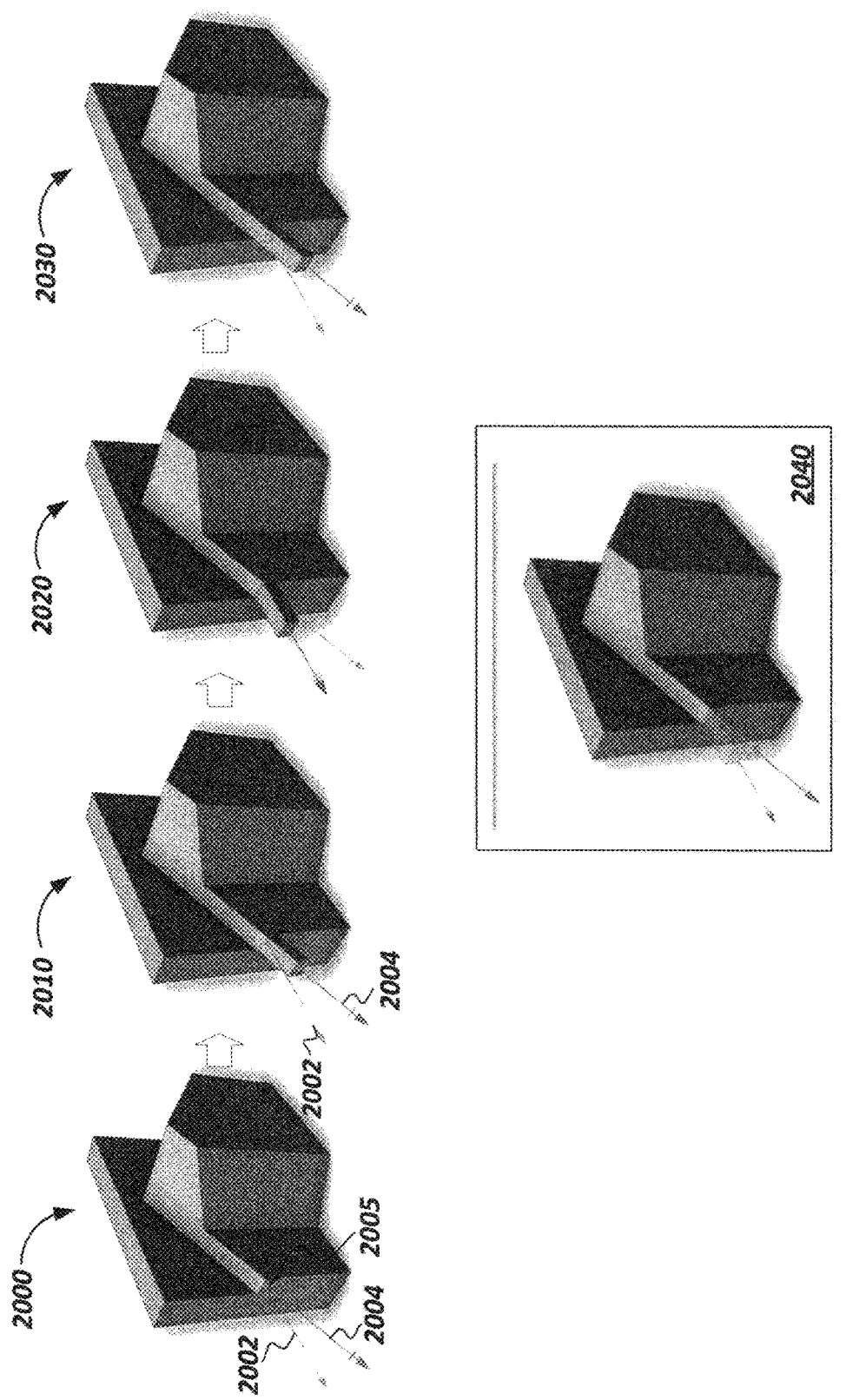
FIG. 20 illustrates aspects of mesh modifications in alternate directions, according to certain embodiments of the invention.

FIG. 20 illustrates aspects of mesh modifications in alternate directions, according to certain embodiments of the invention. Multiple extrusion directions can be suggested by the PushPull++ interface, which can provide extrusion options constrained by an angle threshold or any suitable criteria that would be appreciated by one of ordinary skill in the art with the benefit of this disclosure. In FIG. 20, meshes 2000-2010 illustrate an extrusion of face 2005 in the direction of arrow 2002. Meshes 2020-2030 illustrate an extrusion of face 2005 in the direction of arrow 2004. It should be noted that faces and planes have been used interchangeably throughout the examples in this reference, however not all faces are planes. For example, some faces could be curved. The many embodiments and permutations described herein can be applied to any face, regardless of their planarity. Polygonal mesh 2040 illustrates the mesh modifications 2000-2030 in a composite image 2040.

Figure 21:
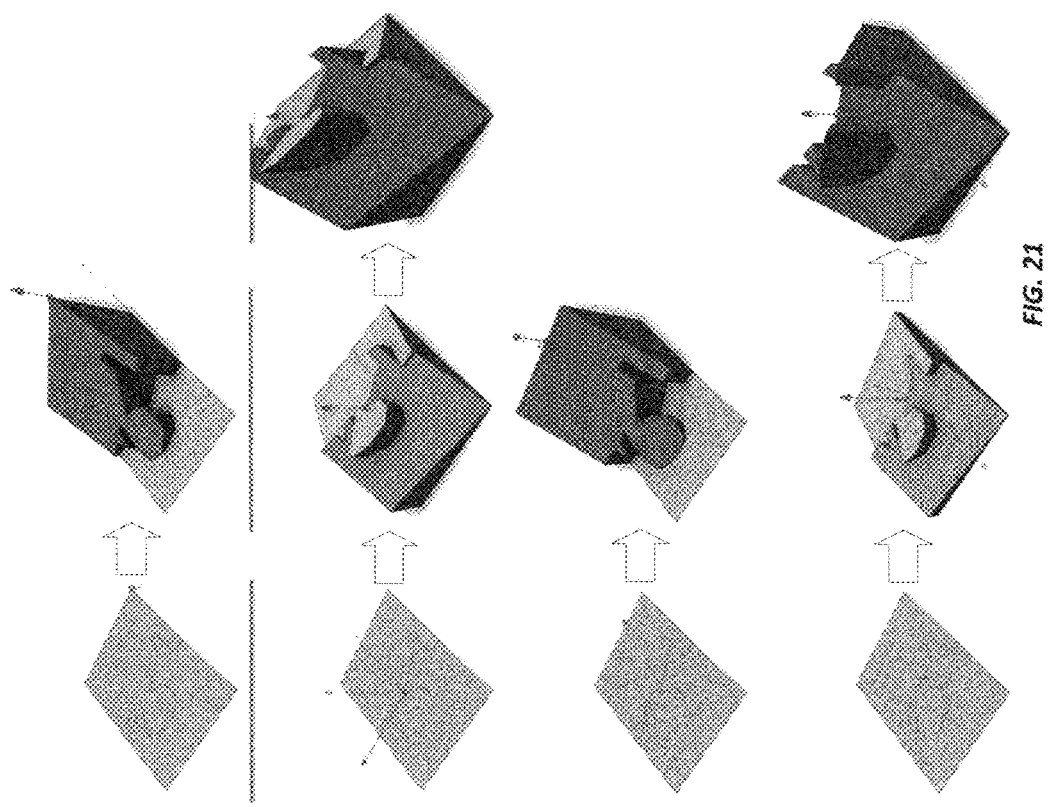
FIG. 21 illustrates aspects of mesh modification in alternative directions for a polygon with complex geometry, according to certain embodiments of the invention.
Figure 22:
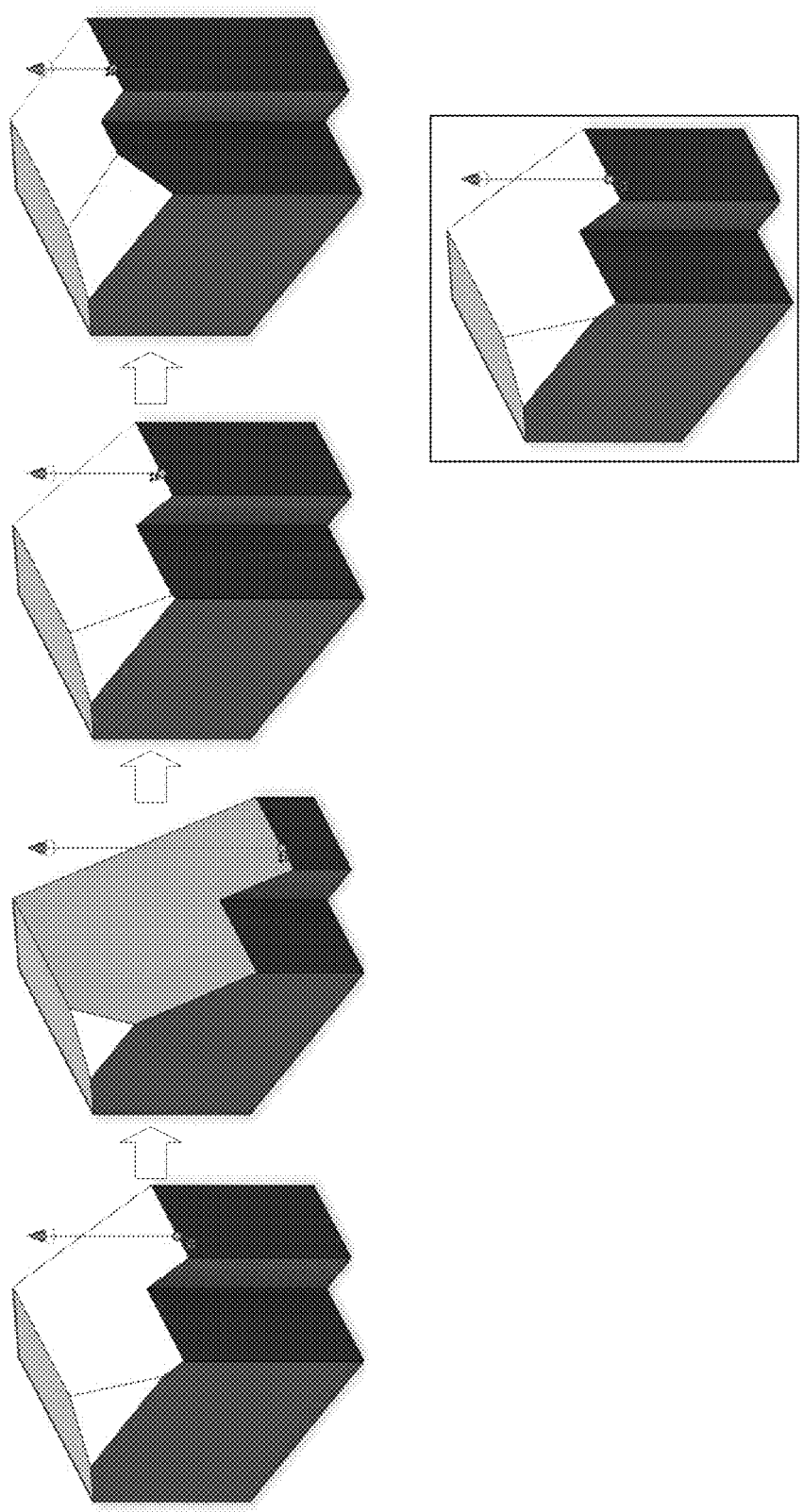
FIG. 22 illustrates aspects of how faces adjacent to a selected plane are updated during face extrusions, according to certain embodiments of the invention.
Figure 23:
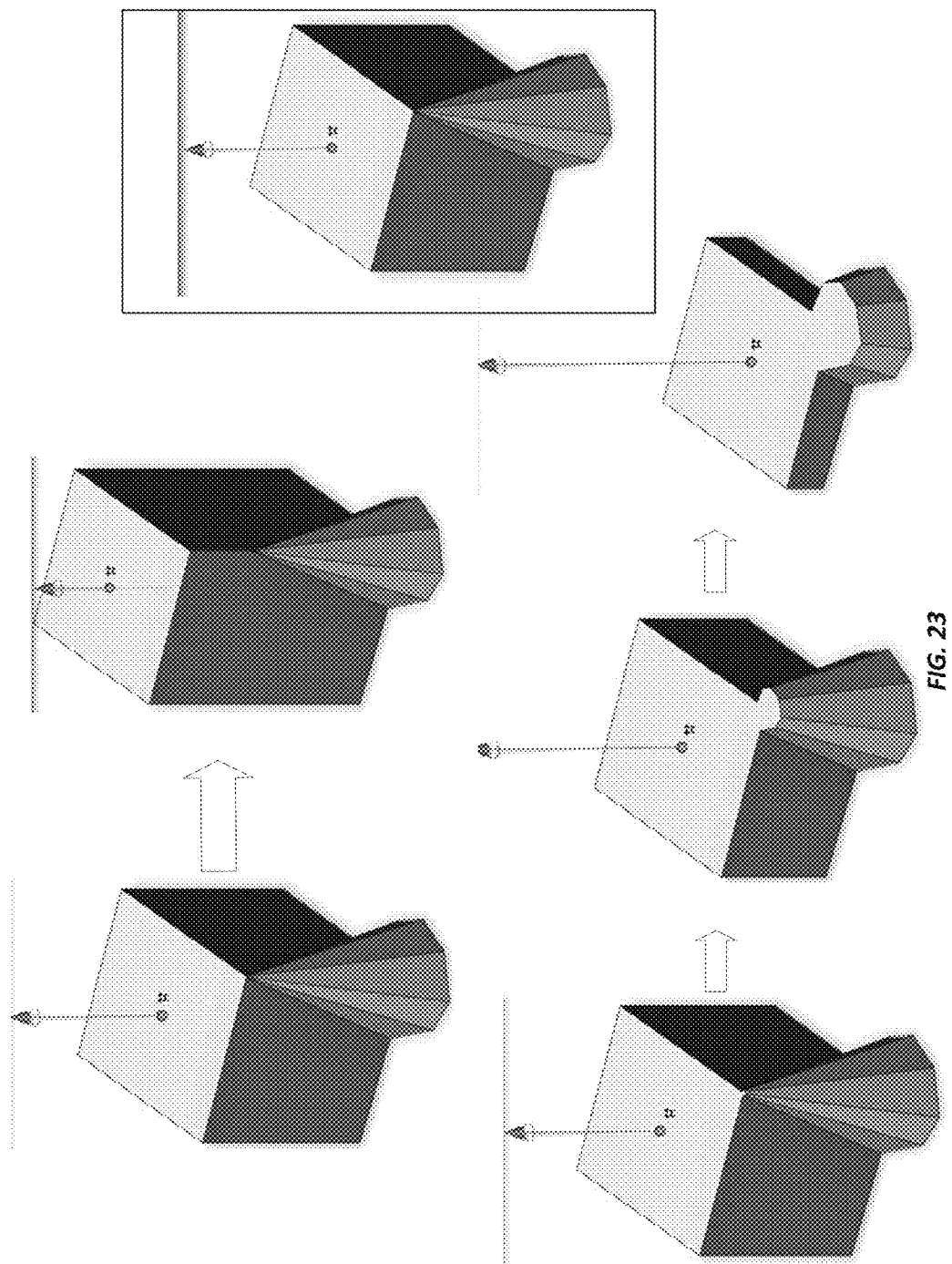
FIG. 23 illustrates aspects of how faces adjacent to a selected plane are updated during face extrusions, according to certain embodiments of the invention.
Figure 24:
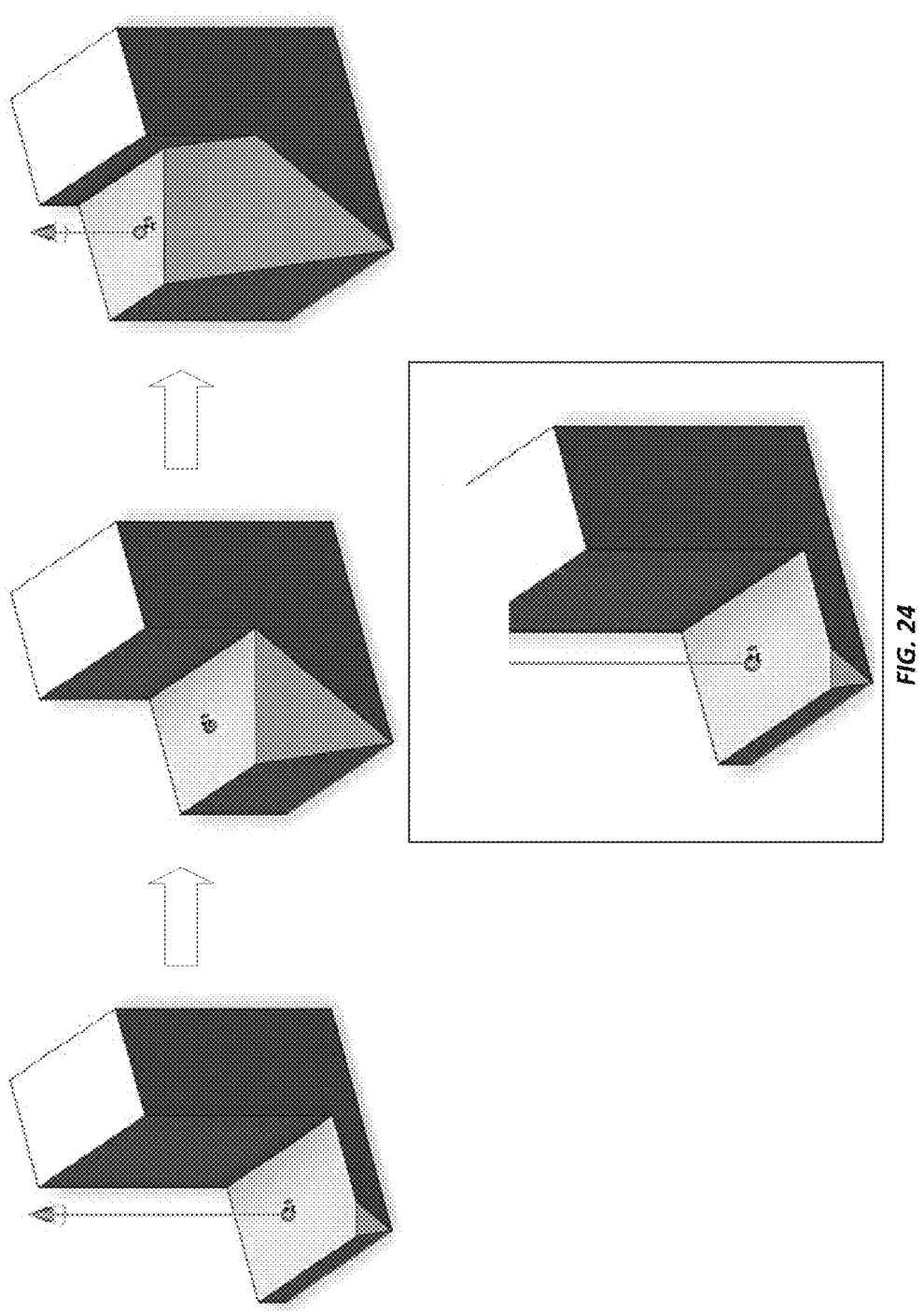
FIG. 24 illustrates aspects of how faces adjacent to a selected plane are updated during face extrusions, according to certain embodiments of the invention.
Figure 25:
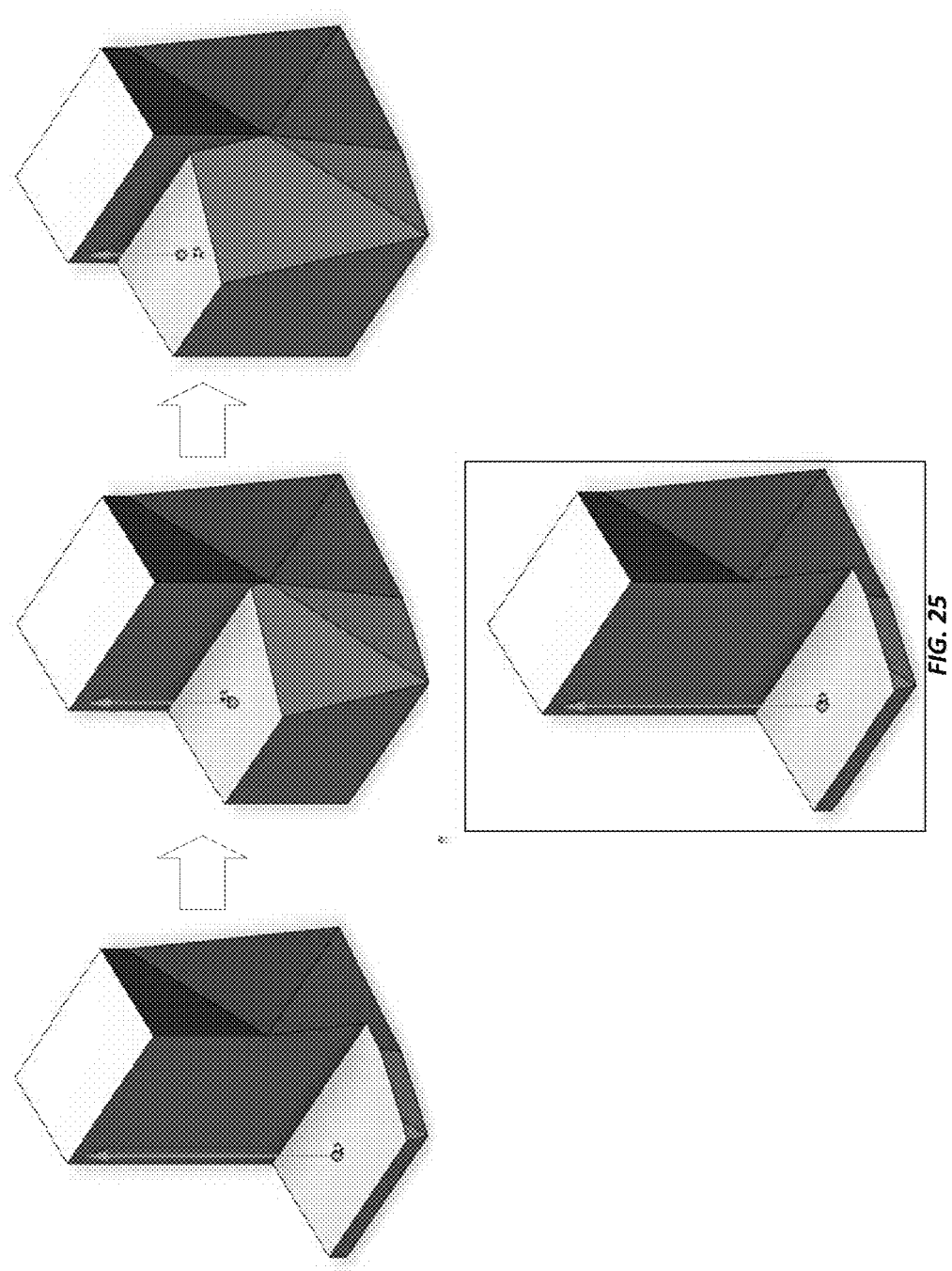
FIG. 25 illustrates aspects of how faces adjacent to a selected plane are updated during face extrusions, according to certain embodiments of the invention.
Figure 27:
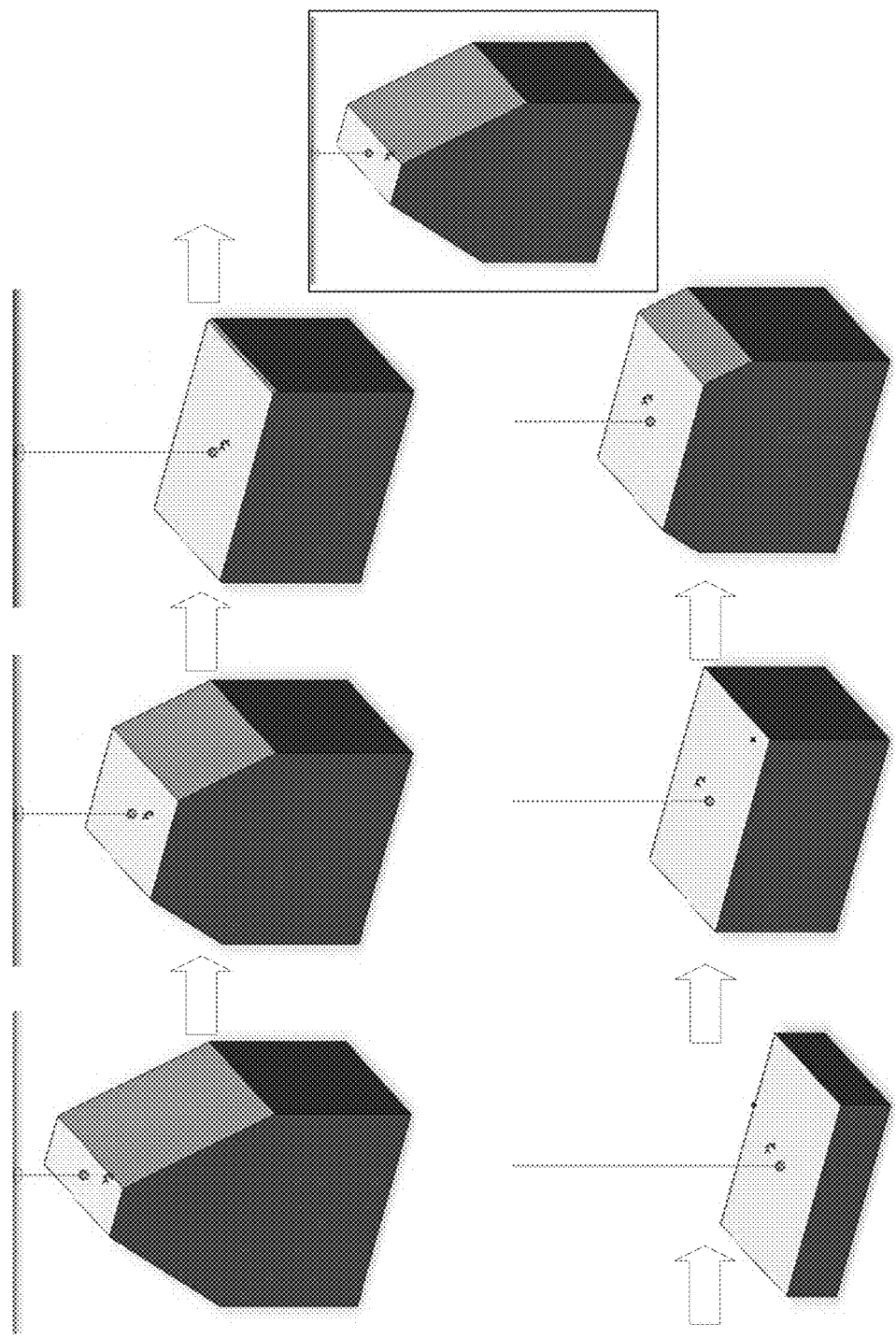
FIG. 27 illustrates aspects of stepwise modifications for edge collapses, according to certain embodiments of the invention.
Figure 28:
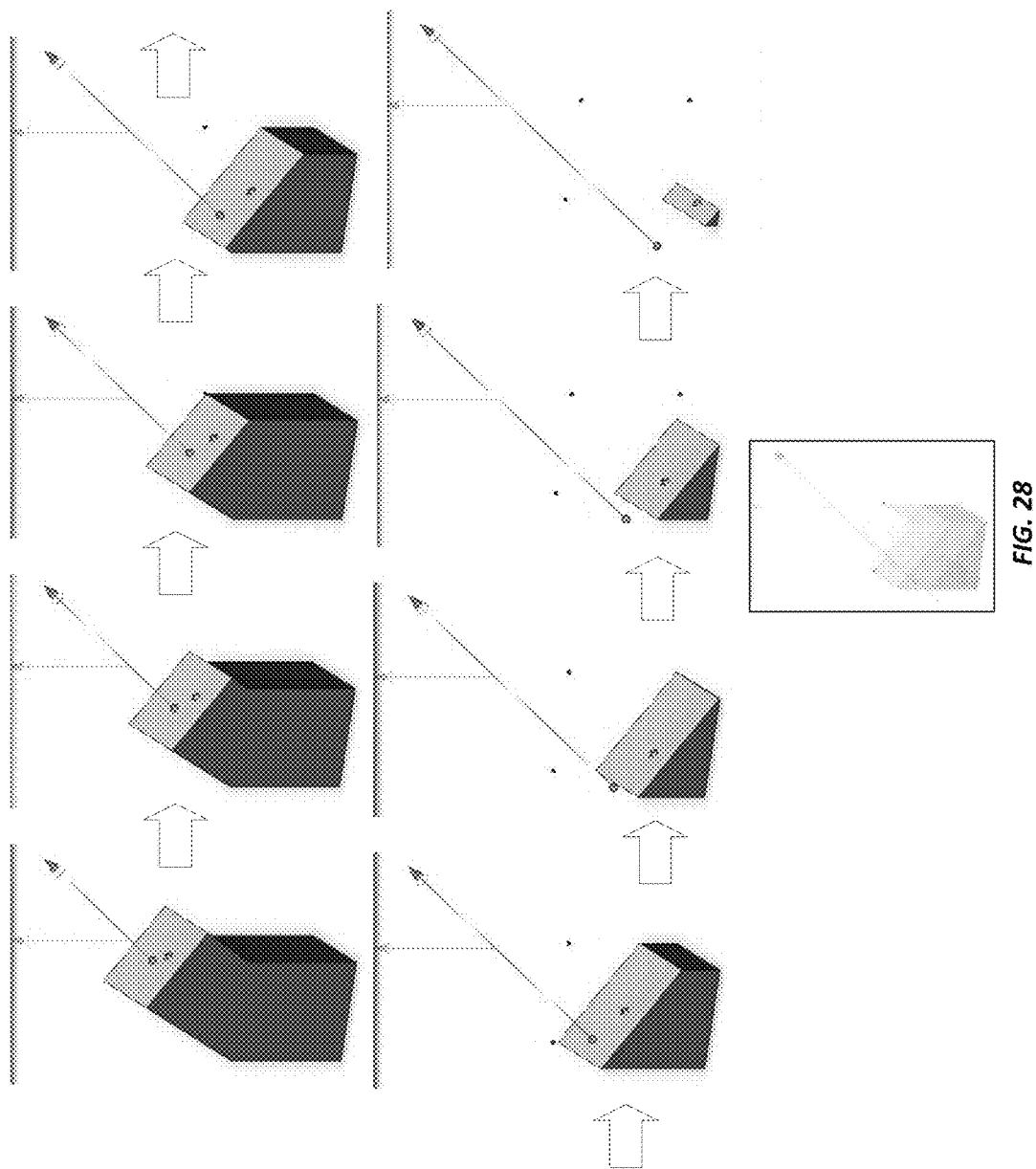
FIG. 28 illustrates aspects of stepwise modifications for edge collapses, according to certain embodiments of the invention.
Figure 29:
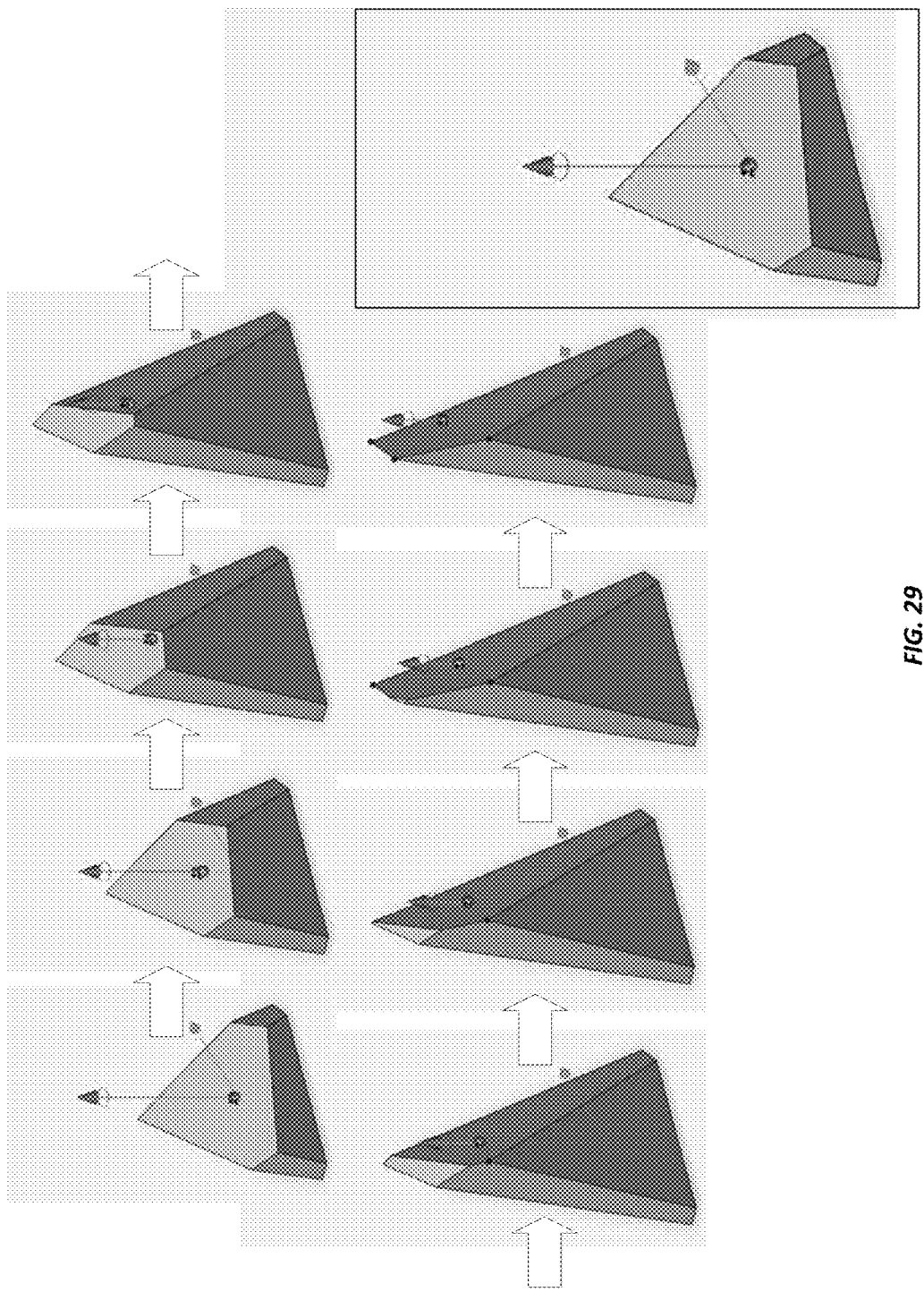
FIG. 29 illustrates aspects of stepwise modifications for edge collapses, according to certain embodiments of the invention.
Figure 30:
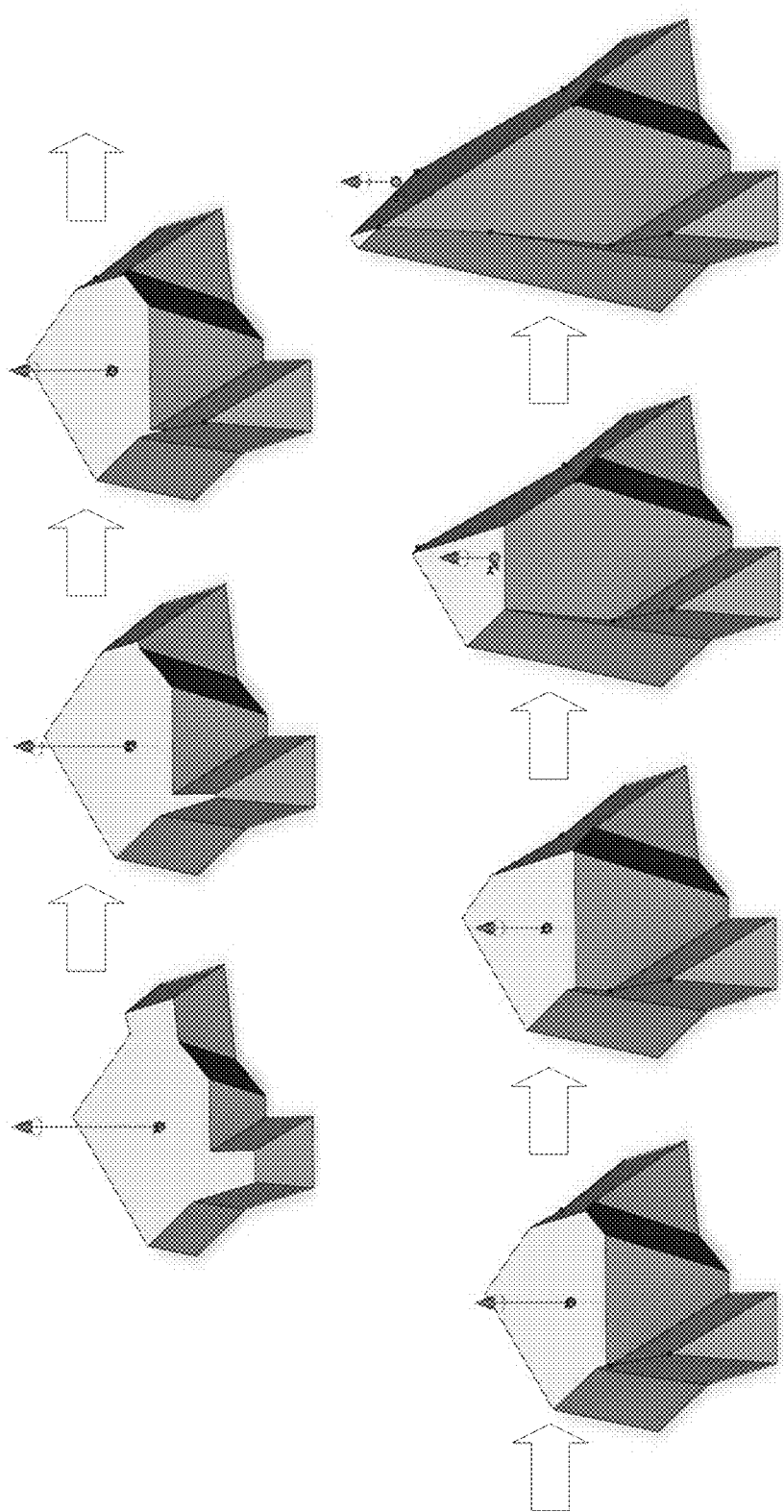
FIG. 30 illustrates aspects of stepwise modifications for edge collapses, according to certain embodiments of the invention.
Figure 31:
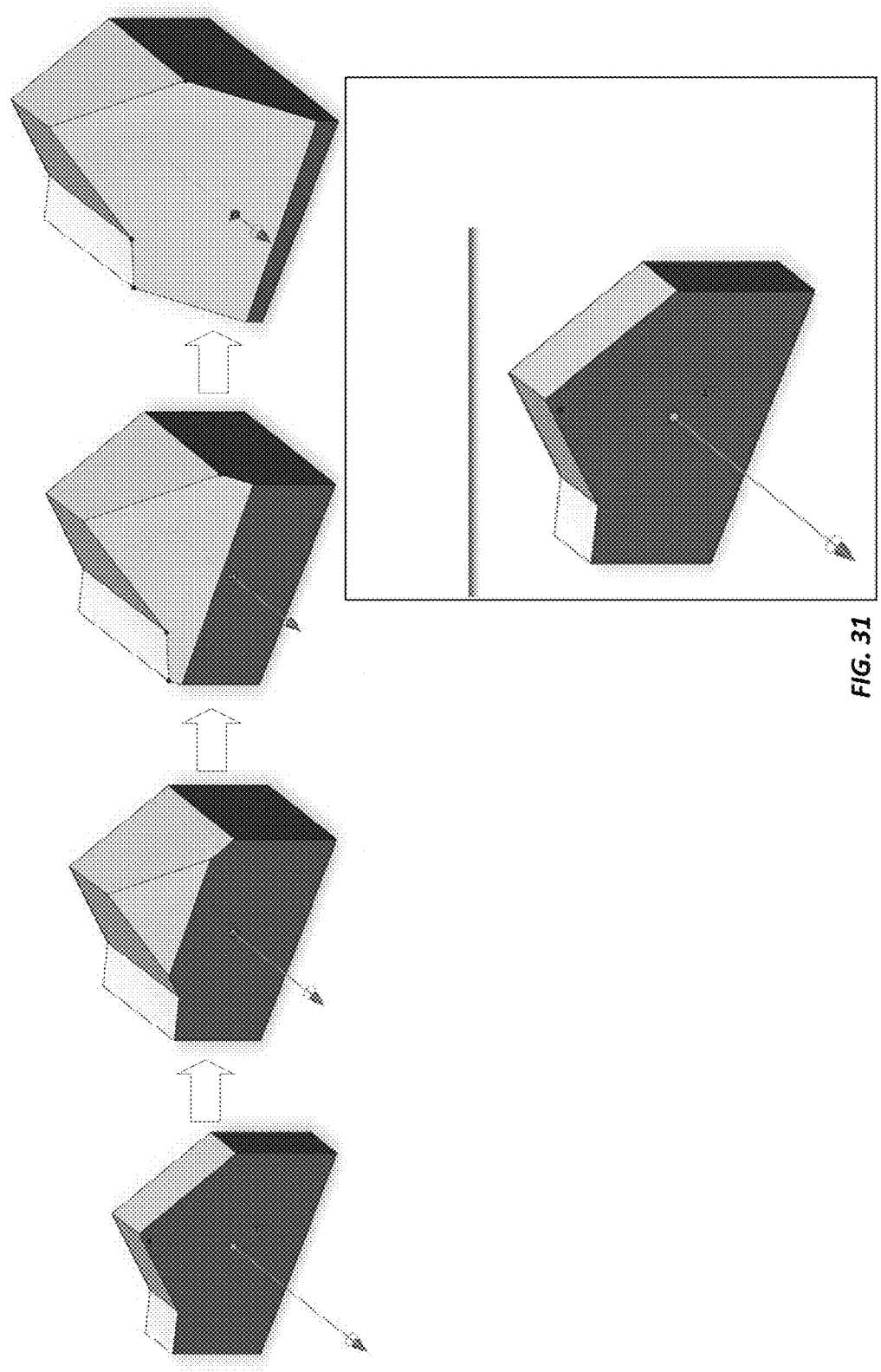
FIG. 31 illustrates aspects of stepwise modifications for edge collapses, according to certain embodiments of the invention.
Figure 32:
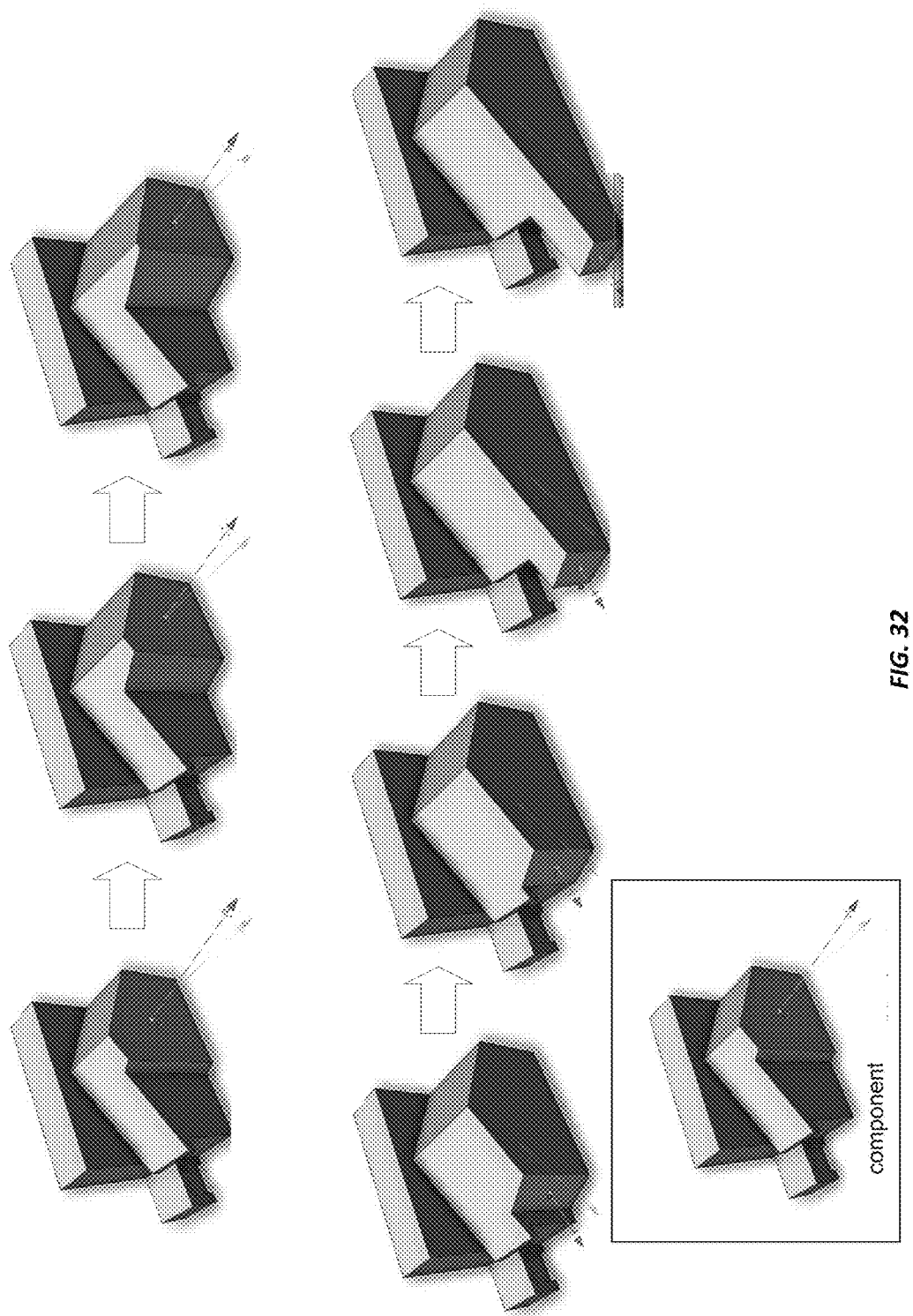
FIG. 32 illustrates aspects of plane modification using an interface tool, according to certain embodiments of the invention.
Figure 33:
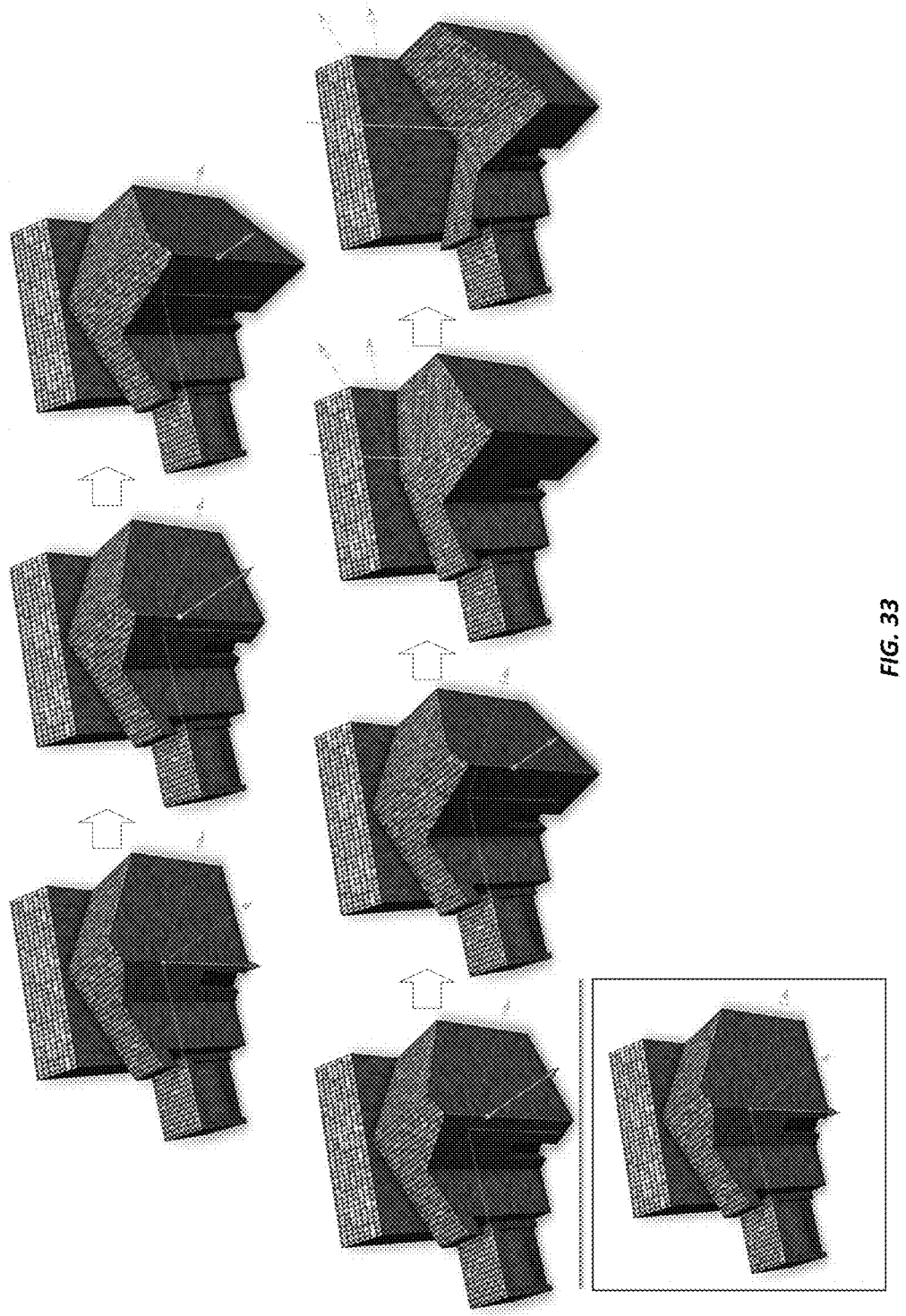
FIG. 33 illustrates aspects of plane modification using an interface tool, according to certain embodiments of the invention.

FIG. 21 illustrates aspects of mesh modification in alternative directions for a polygon with complex geometry, according to certain embodiments of the invention. Various points (e.g., vertices) along the plane are selected for extrusion in the direction shown by the interface tool. Four different modifications are shown, along with selected composite representations.

Examples of Generalized Mesh Updates for Adjacent Faces

The following examples show how adjacent faces are updated during, e.g., an extrusion function on a plane. In some aspects, the goal of the adjacent face modification is to keep the adjacent faces planar by calculating and adding new vertices to the adjacent faces where appropriate. This can be applied to vertices with valences higher than 3.

FIGS. 22-26 illustrate aspects of how faces adjacent to a selected plane are updated during face extrusions, according to certain embodiments of the invention. In each case, the adjacent faces are kept planar throughout the process. FIG. 26 illustrates a polygon having vertices with valences higher than 3.

Examples of Stepwise Modification for Edge Collapses

FIGS. 27-31 illustrate aspects of stepwise modifications for edge collapses, according to certain embodiments of the invention. Edge collapses are handled locally without requiring Boolean operations. An advantage of stepwise modification is that using this technique prevents self-intersections from occurring. The edge collapses are indicated by blue spheres (dots) in the figures.

Examples of the PushPull++ Interface Tool

According to certain embodiments, a PushPull++ tool allows faces and edges to be selected and transformed in different directions by, e.g., hovering over corresponding arrows that protrude from a face selected for modification. Blue arrows indicate directions using high thresholds. FIGS. 31-34 illustrate aspects of plane modification using an interface tool, according to certain embodiments of the invention.

Figure 35A:
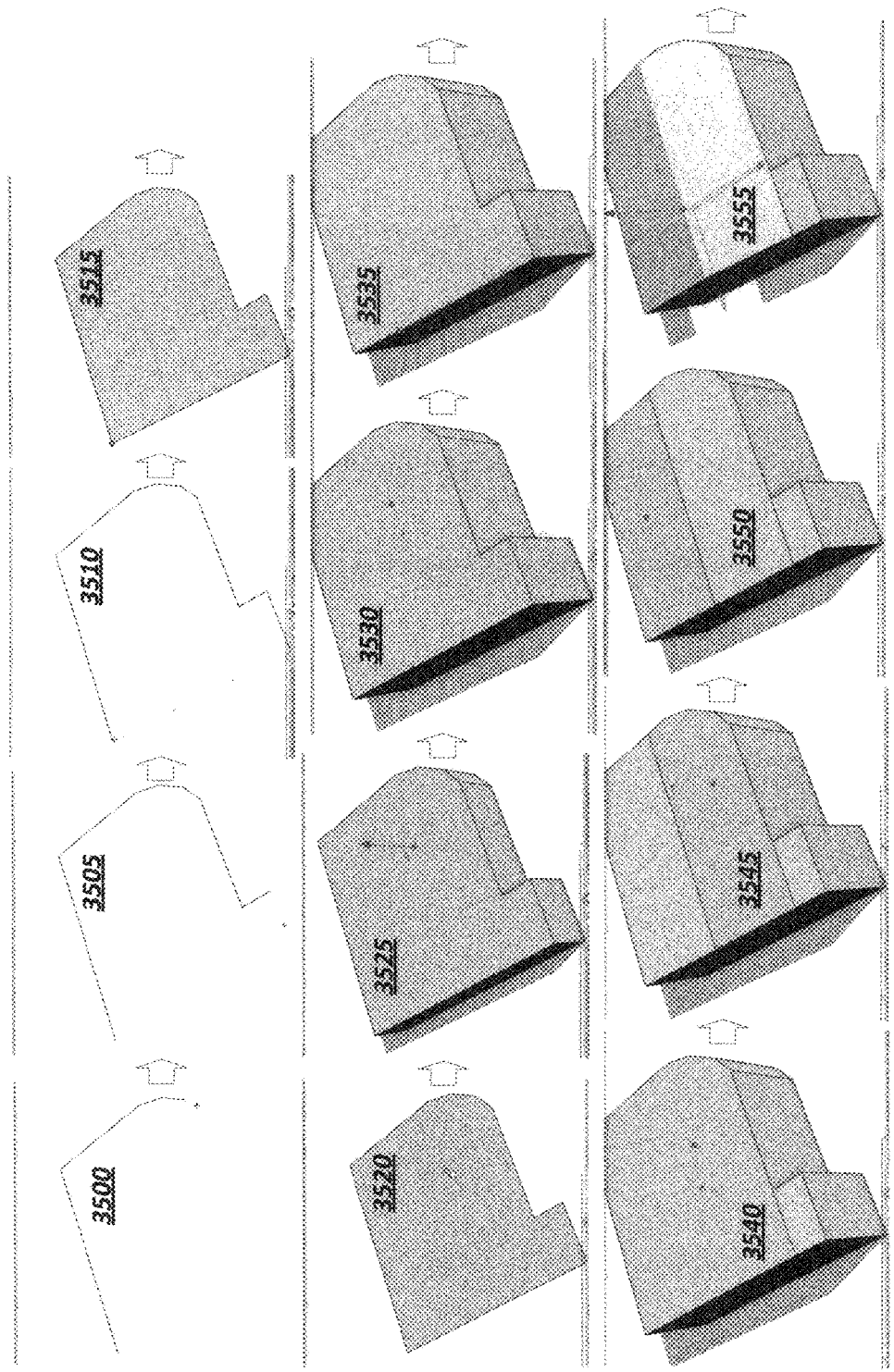
FIGS. 35A-35B illustrate an example of creating a polygon mesh using a PushPull tool, according to certain embodiments of the invention.
Figure 35B:
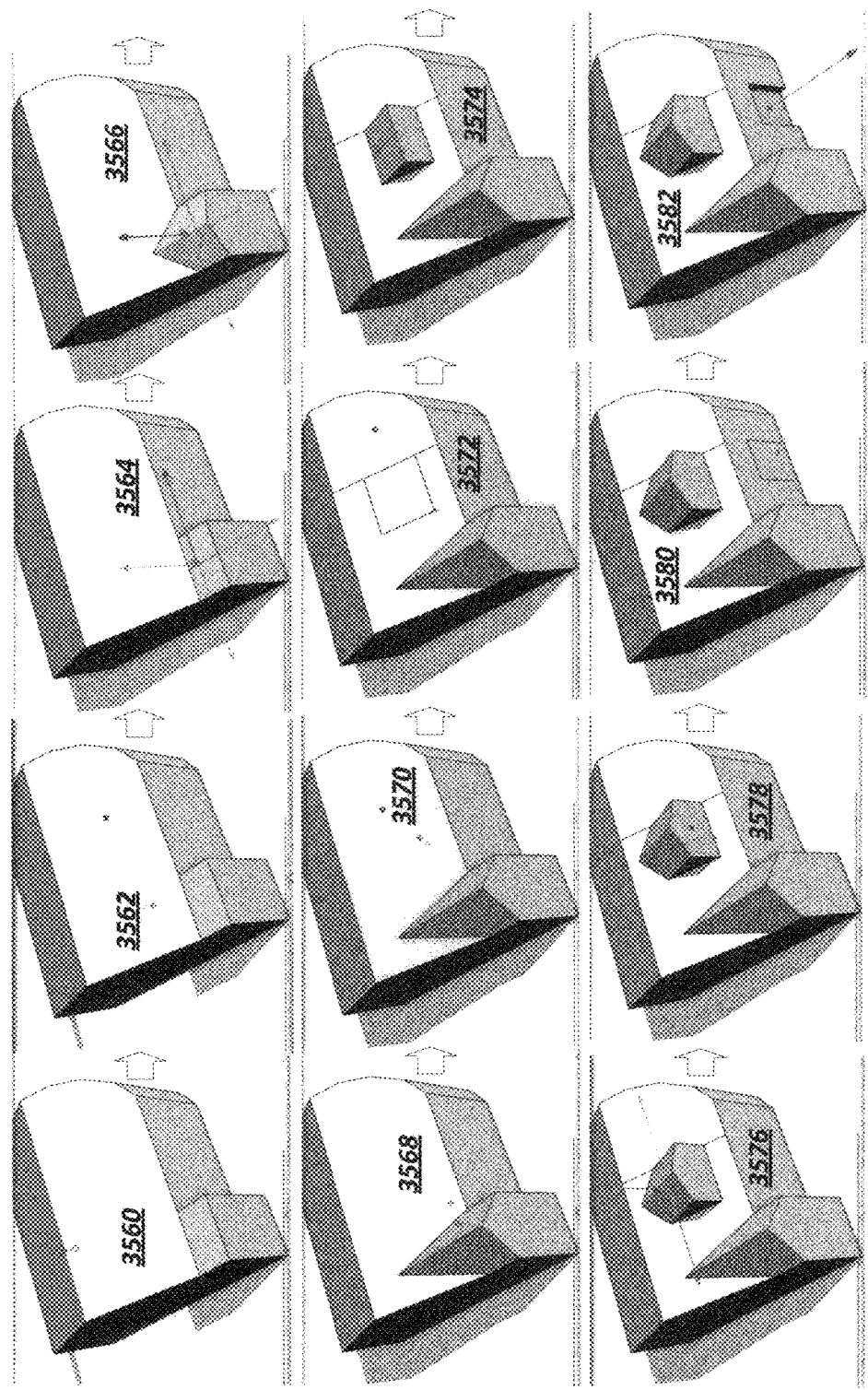

FIGS. 35A-35B illustrate an example of creating a polygon mesh using a PushPull++ tool, according to certain embodiments of the invention. As shown in the sequence of events across both figures, a user can split faces and use PushPull++ operations without having to switch tools. Tracking edges (3550-3555) allow the user to rapidly create slanted surfaces. The figures presented in this section are intended to provide clear illustrations of the concepts discussed herein and are not intended to represent all of the possible combination, permutations, and applications of the methods and techniques for mesh modification described herein. Many other implementations of the mesh modeling concepts are possible, as would be appreciated by one of ordinary skill in the art with the benefit of this disclosure.

Sample Embodiments of System Architectures

Figure 36:
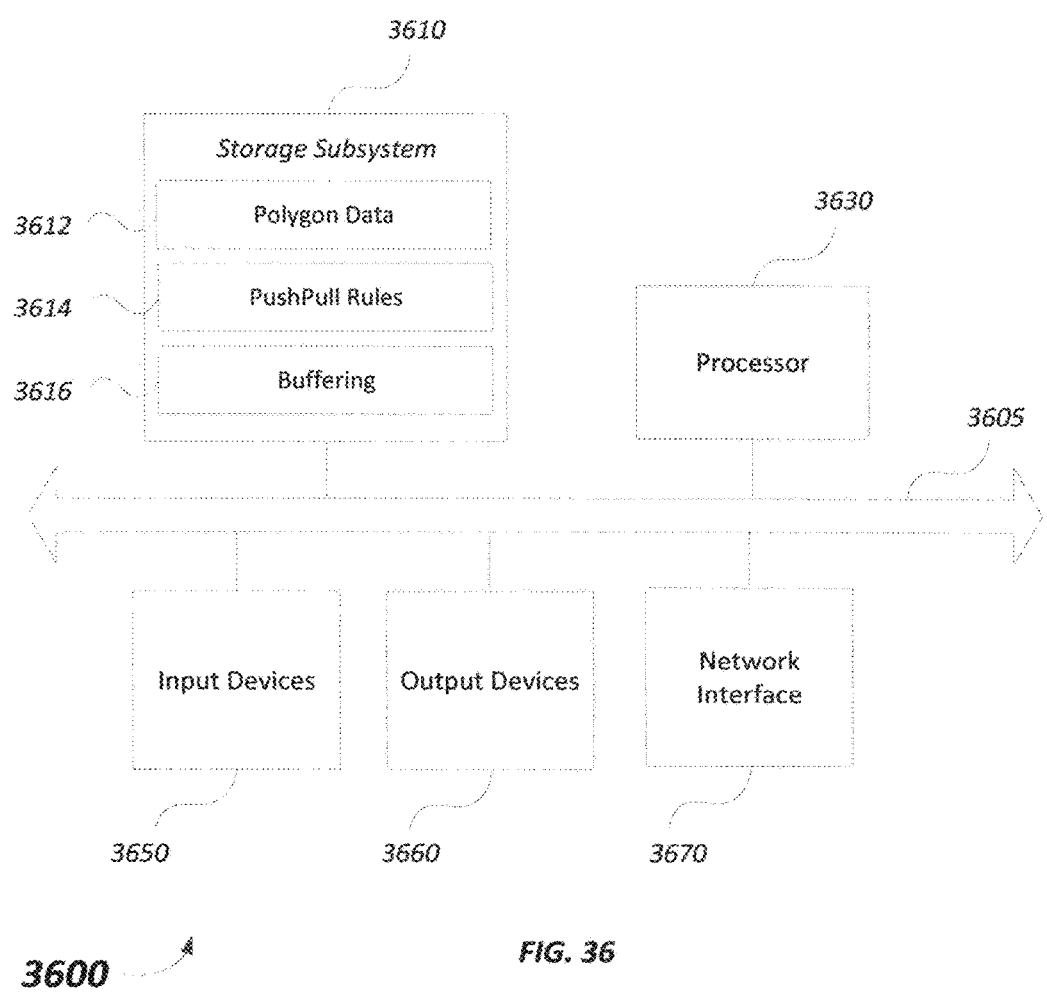
FIG. 36 illustrates a computer system for performing PushPull operations in a mesh modeling application, according to certain embodiments of the invention.

FIG. 36 illustrates a computer system 3600 for performing PushPull operations in a mesh modeling application, according to certain embodiments of the invention. The mesh modeling, processing, algorithms, and methods described herein can be implemented within a computer system such as computer system 3600 shown here. Computer system 3600 can be implemented as any of various computing devices, including, e.g., server(s), a desktop or laptop computer, tablet computer, smart phone, personal digital assistant (PDA), or any other type of computing device, not limited to any particular form factor. Computer system 3600 can include processing unit(s) 3630, storage subsystem 3610, input devices 3650 (e.g., keyboards, mice, touchscreens, etc.), output devices 3660 (e.g., displays, speakers, tactile output devices, etc.), network interface 3670 (e.g., RF, 4G, EDGE, WiFi, GPS, Ethernet, etc.), and bus 3605 to communicatively couple the various elements of system 3600 to one another.

Processing unit(s) 3630 can include a single processor, multi-core processor, or multiple processors and may execute instructions in hardware, firmware, or software, such as instructions stored in storage subsystem 3610. The storage subsystem 3610 can include various memory units such as a system memory, a read only memory (ROM), and permanent storage device(s) (e.g., magnetic, solid state, or optical media, flash memory, etc.). The ROM can store static data and instructions required by processing unit(s) 3630 and other modules of the system 3600. The system memory can store some or all of the instructions and data that the processor needs at runtime.

In some embodiments, storage subsystem 3610 can store one or more of data or software programs to be executed or controlled by processing unit(s) 3630, such as polygon data 3612 (e.g., vertices, planes, lines, threshold angles, etc.), PushPull rules 3614 (e.g., mechanics of applying mathematical functions to implement polygonal mesh modifications), or buffer data 3616 (e.g., for processing mesh modification calculations). Other storage subsystems can be used, combined, or the like. As mentioned, "software" can refer to sequences of instructions that, when executed by processing unit(s) 3630, cause computer system 3600 to perform certain operations of the software programs. The instructions can be stored as firmware residing in read only memory and/or applications stored in media storage that can be read into memory for processing by processing unit(s) 3630. Software can be implemented as a single program or a collection of separate programs and can be stored in non-volatile storage and copied in whole or in part to volatile working memory during program execution. From storage subsystem 3610, processing unit(s) 3630 can retrieve program instructions to execute in order to execute various operations (e.g., interpolations) described herein.

It will be appreciated that computer system 3600 is illustrative and that variations and modifications are possible. Computer system 3600 can have other capabilities not specifically described here in detail (e.g., GIS technologies). Further, while computer system 3600 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Aspects of system 3600 may be implemented in many different configurations. In some embodiments, system 3600 may be configured as a distributed system where one or more components of system 3600 are distributed over one or more networks in the cloud. FIG. 37 depicts a simplified diagram of a distributed system 3700 for providing a system and method for performing PushPull operations in a mesh modeling application, according to an embodiment of the invention. In the embodiment depicted in FIG. 37, system 3700 is provided on a server 3702 that is communicatively coupled with one or more remote client devices 3710, 3720, 3730 via network 3706.

Network 3706 may include one or more communication networks, which could be the Internet, a local area network (LAN), a wide area network (WAN), a wireless or wired network, an Intranet, a private network, a public network, a switched network, or any other suitable communication network or combination thereof. Network 3706 may include many interconnected systems and communication links including but not restricted to hardwire links, optical links, satellite or other wireless communications links, wave propagation links, or any communication protocol. Various communication protocols may be used to facilitate communication of information via network 3706, including but not restricted to TCP/IP, HTTP protocols, extensible markup language (XML), wireless application protocol (WAP), protocols under development by industry standard organizations, vendor-specific protocols, customized protocols, and others as would be appreciated by one of ordinary skill in the art. In the configuration depicted in FIG. 37, aspects of system 800 may be displayed on any of client devices 3710, 3720, 3730.

In the configuration depicted in FIG. 37, system 3700 is remotely located from client devices 3710, 3720, 3730. In some embodiments, server 3702 may perform the methods of determining (or interpolating) a population over a geographic area described herein. In some embodiments, the services provided by server 3702 may be offered as web-based or cloud services or under a Software as a Service (SaaS) model, as would be appreciated by one of ordinary skill in the art.

The various methods and embodiments described herein can be implemented in a system architecture, including aspects of those shown in FIGS. 36-37. The various methods and embodiments described above can be a computer-program product tangibly embodied in a non-transitory computer-readable storage medium, including instructions configured to cause a data processing system to perform said methods and embodiments. Any combination of the various embodiments described throughout this document are possible, as would be appreciated by one of ordinary skill in the art with the benefit of this disclosure.

While the invention has been described with respect to specific embodiments, one of ordinary skill in the art will recognize that numerous modifications are possible. Thus, although the invention has been described with respect to specific embodiments, it will be appreciated that the invention is intended to cover all modifications and equivalents within the scope of the following claims.

The above disclosure provides examples and aspects relating to various embodiments within the scope of claims, appended hereto or later added in accordance with applicable law. However, these examples are not limiting as to how any disclosed aspect may be implemented.

All the features disclosed in this specification (including any accompanying claims, abstract, and drawings) can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. § 112, sixth paragraph. In particular, the use of "step of" in the claims herein is not intended to invoke the provisions of 35 U.S.C. § 112, sixth paragraph.

What is claimed is:

1. A computer-implemented method comprising:
   receiving a first input corresponding to a selection of a face ($f_m$) on a multi-faced, three dimensional (3D) polygonal mesh rendered on a display, wherein $f_m$ has a plurality of vertices;
   receiving a second input corresponding to a modified target plane ($p_m$) to be extended from $f_m$;
   for each vertex (v) of $f_m$:
     determining faces ($F_{aff}$) connected to v to change by extending $f_m$ to $p_m$;
     computing new vertices ($V_{new}$) for $F_{aff}$ based on $p_m$;
     replacing v with the corresponding $V_{new}$;
   for each face ($f_i$) in $F_{aff}$:
     finding vertices $V_{sel}$ to insert;
     determining a next face $f_n$ relative to $f_i$;
     determining a previous face $f_p$ relative to $f_i$;
     inserting the vertices $V_{sel}$ after v in $f_i$ when $f_n$ is not in $F_{aff}$;
     inserting the vertices $V_{sel}$ before v in $f_i$ when $f_p$ is not in $F_{aff}$; and
   rendering the updated polygonal mesh on the display.

2. The computer-implemented method of claim 1 further comprising:
   replacing v in $f_i$ with $V_{sel}$ when $f_n$ and $f_p$ are in $F_{aff}$.

3. The computer-implemented method of claim 1 wherein the determined faces ($F_{aff}$) excludes ($f_m$).

4. The computer-implemented method of claim 1 wherein when $f_i$ intersects $p_m$ then add $f_i$ to $F_{aff}$.

5. The computer-implemented method of claim 1 wherein ($F_{aff}$) is a fan ($F_{fan}$) of faces.

6. The computer-implemented method of claim 5 wherein determining all affected faces ($F_{aff}$) in $F_{fan}$ includes adding the first, last, and all faces intersecting $p_m$ to $F_{aff}$.

7. The computer-implemented method of claim 1 wherein computing new vertices ($V_{new}$) further comprises intersecting every successive triple of faces in $F_{aff}$ to get the intersection points $V_{new}$.

8. The computer-implemented method of claim 1 wherein finding vertices $V_{sel}$ to insert further comprises:
adding a first vertex of $V_{new}$ to $V_{sel}$ when $f_i$ is the first face; and
adding the last vertex of $V_{new}$ to $V_{sel}$ when $f_i$ is the last face; and otherwise, adding the previous vertex $v(i-1)$ and the current vertex $v_i$ of $V_{new}$ to $V_{sel}$.

9. A computer-implemented system, comprising:
one or more processors; and
one or more non-transitory computer-readable storage mediums containing instructions configured to cause the one or more processors to perform operations including:
receiving a first input corresponding to a selection of a face ($f_m$) on a multi-faced, three dimensional (3D) polygonal mesh rendered on a display, wherein $f_m$ has a plurality of vertices;
receiving a second input corresponding to a modified target plane ($p_m$) to be extended from $f_m$;
for each vertex (v) of $f_m$:
determining faces ($F_{aff}$) connected to v to change by extending $f_m$ to $p_m$;
computing new vertices ($V_{new}$) for $F_{aff}$ based on $p_m$;
replacing v with the corresponding $V_{new}$;
for each face ($f_i$) in $F_{aff}$:
finding vertices $V_{sel}$ to insert;
determining a next face $f_n$ relative to $f_i$;
determining a previous face $f_p$ relative to $f_i$;
inserting the vertices $V_{sel}$ after v in $f_i$ when $f_n$ is not in $F_{aff}$;
inserting the vertices $V_{sel}$ before v in $f_i$ when $f_p$ is not in $F_{aff}$; and
rendering the updated polygonal mesh on the display.

10. The computer-implemented system of claim 9 wherein the one or more non-transitory computer-readable storage mediums further contain instructions configured to cause the one or more processors to perform operations including:
replacing v in $f_i$ with $V_{sel}$ when $f_n$ and $f_p$ are in $F_{aff}$.

11. The computer-implemented system of claim 9 wherein the determined faces ($F_{aff}$) excludes ($f_m$).

12. The computer-implemented system of claim 9 wherein when $f_i$ intersects $p_m$ then add $f_i$ to $F_{aff}$.

13. The computer-implemented system of claim 9 wherein ($F_{aff}$) is a fan ($F_{fan}$) of faces.

14. The computer-implemented system of claim 13 wherein determining all affected faces ($F_{aff}$) in $F_{fan}$ includes adding the first, last, and all faces intersecting $p_m$ to $F_{aff}$.

15. The computer-implemented system of claim 9 wherein computing new vertices ($V_{new}$) further comprises intersecting every successive triple of faces in $F_{aff}$ to get the intersection points $V_{new}$.

16. The computer-implemented system of claim 9 wherein finding vertices $V_{sel}$ to insert further comprises:
adding a first vertex of $V_{new}$ to $V_{sel}$ when $f_i$ is the first face; and
adding the last vertex of $V_{new}$ to $V_{sel}$ when $f_i$ is the last face; and otherwise, adding the previous vertex $v(i-1)$ and the current vertex $v_i$ of $V_{new}$ to $V_{sel}$.

17. A computer-program product tangibly embodied in a non-transitory computer-readable storage medium including instructions configured to cause a processor to:
receive a first input corresponding to a selection of a face ($f_m$) on a multi-faced, three dimensional (3D) polygonal mesh rendered on a display, wherein $f_m$ has a plurality of vertices;
receive a second input corresponding to a modified target plane ($p_m$) to be extended from $f_m$;
for each vertex (v) of $f_m$:
determine faces ($F_{aff}$) connected to v to change by extending $f_m$ to $p_m$;
compute new vertices ($V_{new}$) for $F_{aff}$ based on $p_m$;
replace v with the corresponding $V_{new}$;
for each face ($f_i$) in $F_{aff}$:
find vertices $V_{sel}$ to insert;
determine a next face $f_n$ relative to $f_i$;
determine a previous face $f_p$ relative to $f_i$;
insert the vertices $V_{sel}$ after v in $f_i$ when $f_n$ is not in $F_{aff}$;
insert the vertices $V_{sel}$ before v in $f_i$ when $f_p$ is not in $F_{aff}$; and
render the updated polygonal mesh on the display.

18. The computer-program product of claim 17 wherein the instructions are further configured to cause a processor to:
replace v in $f_i$ with $V_{sel}$ when $f_n$ and $f_p$ are in $F_{aff}$.

19. The computer-program product of claim 17 wherein the determined faces ($F_{aff}$) excludes ($f_m$).

20. The computer-program product of claim 17 wherein when $f_i$ intersects $p_m$ then add $f_i$ to $F_{aff}$.

\* \* \* \* \*